United States Patent
Jhang et al.

(10) Patent No.: US 10,437,013 B2
(45) Date of Patent: Oct. 8, 2019

(54) OPTICAL IMAGING LENS

(71) Applicant: GENIUS ELECTRONIC OPTICAL CO., LTD., Taichung (TW)

(72) Inventors: Jia-Sin Jhang, Taichung (TW); Yanbin Chen, Xiamen (CN); Tianfang Gao, Xiamen (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 580 days.

(21) Appl. No.: 15/145,330

(22) Filed: May 3, 2016

(65) Prior Publication Data

US 2017/0269333 A1    Sep. 21, 2017

(30) Foreign Application Priority Data

Mar. 18, 2016   (CN) .......................... 2016 1 0156998

(51) Int. Cl.
*G02B 13/00* (2006.01)
*G02B 9/34* (2006.01)
*G02B 9/60* (2006.01)

(52) U.S. Cl.
CPC ............ *G02B 13/004* (2013.01); *G02B 9/34* (2013.01); *G02B 9/60* (2013.01); *G02B 13/0045* (2013.01)

(58) Field of Classification Search
USPC ............... 359/713–715, 745–747, 754–758, 359/763–766, 771–778
See application file for complete search history.

(56) References Cited

U.S. PATENT DOCUMENTS

2016/0291288 A1* 10/2016 Huang ..................... G02B 9/34

FOREIGN PATENT DOCUMENTS

| CN | 202256843 U | 5/2012 |
| CN | 202583578 U | 12/2012 |
| CN | 102955225 A | 3/2013 |

OTHER PUBLICATIONS

Office Action for Chinese Application No. 201610156998.3 dated Jan. 29, 2018, 6 pages.

* cited by examiner

*Primary Examiner* — Darryl J Collins
*Assistant Examiner* — Gary W O'Neill
(74) *Attorney, Agent, or Firm* — Huffman Law Group, PC; James W. Huffman

(57) ABSTRACT

Present embodiments provide for an optical imaging lens system. The optical imaging lens system may comprise at least four lens elements positioned sequentially from an object side to an image side. By controlling the convex or concave shape of the surfaces of the lens elements and designing parameters satisfying at least three inequalities, the optical imaging lens system may exhibit better optical characteristics and the total length of the optical imaging lens system may be shortened.

19 Claims, 74 Drawing Sheets

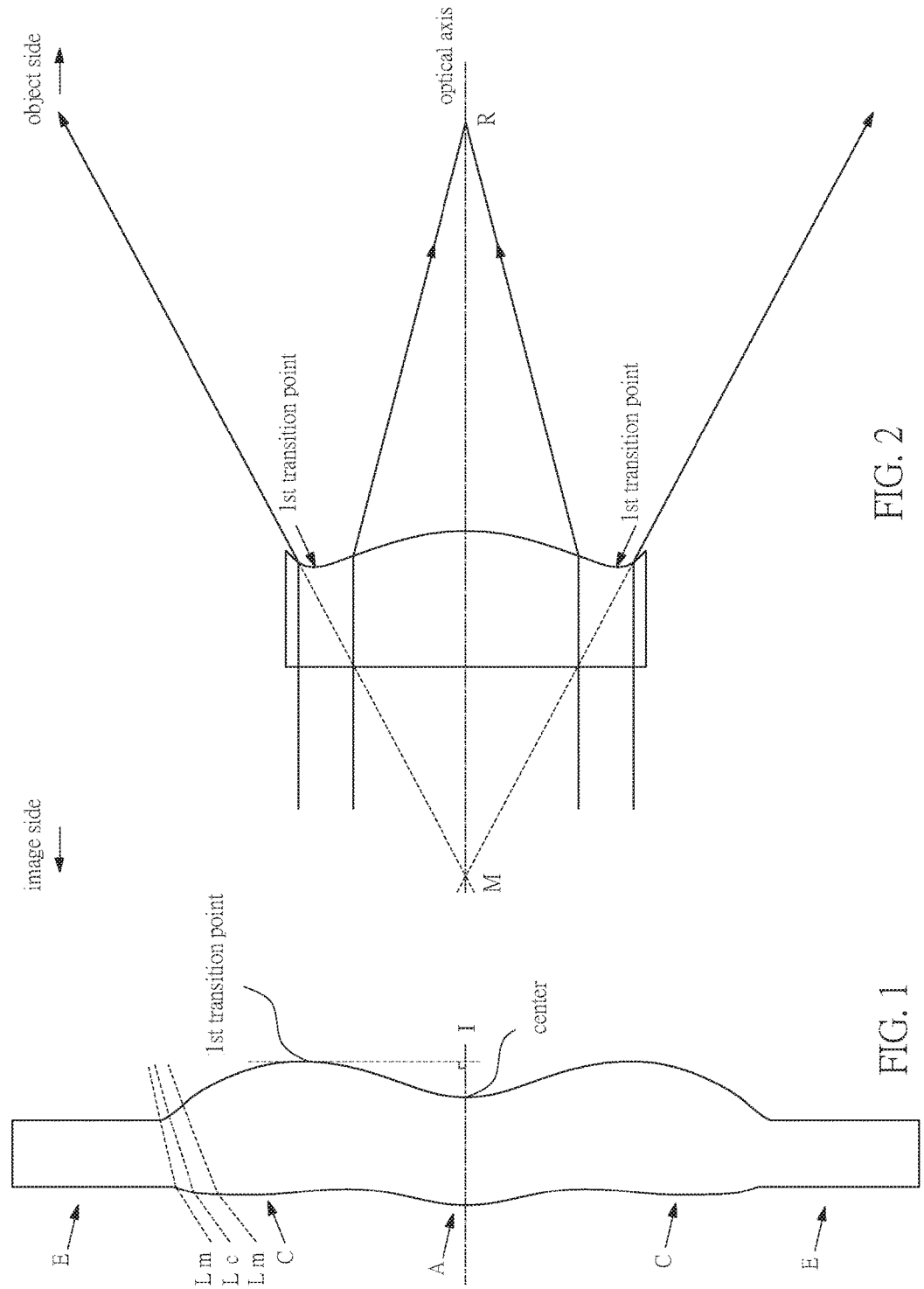

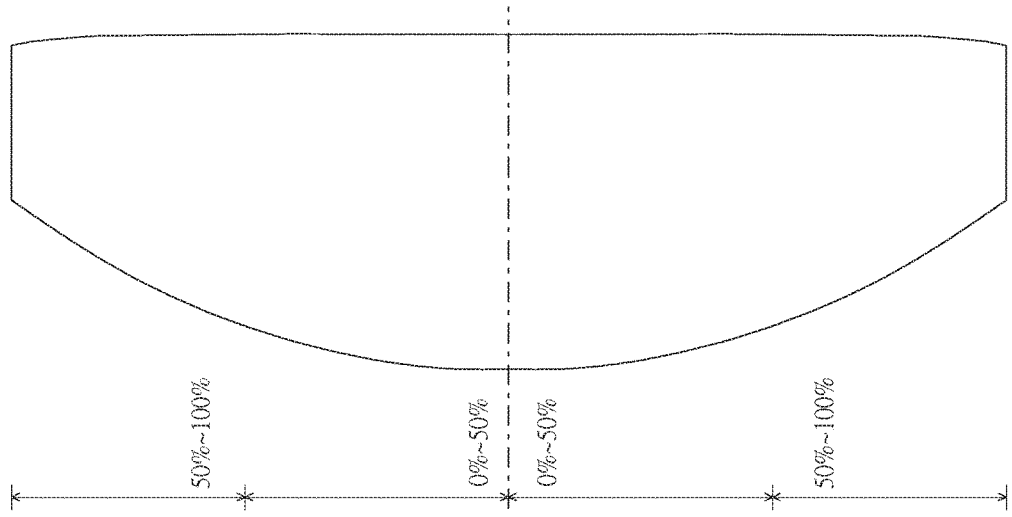
FIG. 5
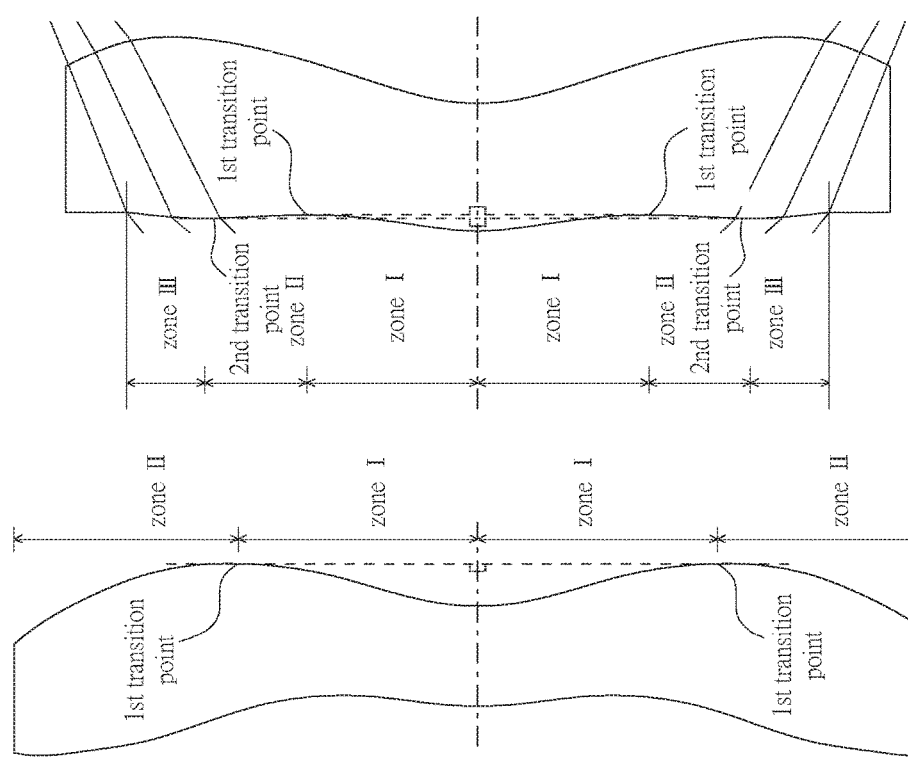
FIG. 4
FIG. 3

| EFL(Effective focus length)= 7.070mm, HFOV(Half angular field of view)= 18.684deg., System length=6.3803mm, Image height= 2.4mm, Fno=2.390 ||||||||
|---|---|---|---|---|---|---|---|
| Surface # | | Radius | Thickness | Refractive index | Abbe number | Focus | Material |
| - | Object | ∞ | | | | | |
| 100 | Aperture stop | ∞ | 0.050 | | | | |
| 111 | 1st lens element | 1.874 | 0.945 | 1.545 | 55.987 | 3.385 | plastic |
| 112 | | -116.989 | 0.074 | | | | |
| 121 | 2nd lens lement | 4.762 | 0.230 | 1.642 | 22.409 | -5.976 | plastic |
| 122 | | 2.094 | 2.605 | | | | |
| 131 | 3rd lens element | -5.910 | 0.836 | 1.642 | 22.409 | 11.370 | plastic |
| 132 | | -3.460 | 0.148 | | | | |
| 141 | 4th lens element | -2.069 | 0.329 | 1.535 | 55.690 | -4.767 | plastic |
| 142 | | -11.413 | 0.400 | | | | |
| 161 | IR cut filter | ∞ | 0.210 | 1.517 | 64.167 | | glass |
| 162 | | ∞ | 0.604 | | | | |
| 170 | Image plane | ∞ | 0.000 | | | | |

FIG. 8

| Aspherical parameters | | | | |
|---|---|---|---|---|
| Surface # | 111 | 112 | 121 | 122 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -6.018371E-03 | 1.369107E-02 | -6.589450E-03 | -1.557121E-02 |
| $a_6$ | 5.321540E-03 | -1.830071E-02 | -3.281717E-02 | 7.866862E-03 |
| $a_8$ | -2.799966E-03 | 8.991068E-03 | 2.941659E-02 | 6.447957E-03 |
| $a_{10}$ | 8.097285E-05 | -1.348826E-03 | -5.976352E-03 | 5.020352E-03 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 131 | 132 | 141 | 142 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -3.809231E-02 | -8.529780E-03 | -2.935985E-02 | -6.696074E-02 |
| $a_6$ | -2.410257E-02 | -3.111689E-04 | 6.160241E-02 | 3.015171E-02 |
| $a_8$ | 1.333176E-03 | -1.403122E-02 | -3.853729E-02 | -5.709146E-03 |
| $a_{10}$ | -3.877934E-03 | 3.482032E-03 | 1.029802E-02 | -5.994690E-05 |
| $a_{12}$ | 0.000000E+00 | 0.000000E+00 | -8.567288E-04 | 7.064822E-05 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 9

| EFL(Effective focus length)= 7.072mm, HFOV(Half angular field of view)= 18.125deg., System length=6.384mm, Image height= 2.4mm, Fno=2.369 ||||||||
|---|---|---|---|---|---|---|---|
| Surface # | | Radius | Thickness | Refractive index | Abbe number | Focus | Material |
| - | Object | ∞ | | | | | |
| 200 | Aperture stop | ∞ | 0.048 | | | | |
| 211 | 1st lens element | 2.194 | 0.874 | 1.545 | 55.987 | 3.991 | plastic |
| 212 | | -282.573 | 0.093 | | | | |
| 221 | 2nd lens lement | -9.971 | 0.589 | 1.661 | 20.401 | -14.530 | plastic |
| 222 | | 342.221 | 2.446 | | | | |
| 231 | 3rd lens element | -1.640 | 0.282 | 1.545 | 55.987 | -9.332 | plastic |
| 232 | | -2.565 | 0.735 | | | | |
| 241 | 4th lens element | -18.543 | 0.365 | 1.661 | 20.401 | -11.311 | plastic |
| 242 | | 12.798 | 0.400 | | | | |
| 261 | IR cut filter | ∞ | 0.210 | 1.517 | 64.167 | | glass |
| 262 | | ∞ | 0.390 | | | | |
| 270 | Image plane | ∞ | 0.000 | | | | |

FIG. 12

| Aspherical parameters | | | | |
|---|---|---|---|---|
| Surface # | 211 | 212 | 221 | 222 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -7.828575E-03 | -3.750559E-02 | -2.375832E-02 | 5.867540E-03 |
| $a_6$ | 1.802231E-03 | 1.221866E-02 | 1.185786E-02 | 2.816927E-03 |
| $a_8$ | -1.096325E-03 | -1.319360E-03 | -1.538182E-03 | -1.376823E-03 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 231 | 232 | 241 | 242 |
| K | 0.000000E+00 | 0.000000E+00 | -1.636359E+02 | -1.197299E+03 |
| $a_2$ | 0.000000E+00 | 0.000000E+00 | 0.000000E+00 | 0.000000E+00 |
| $a_4$ | -4.804994E-02 | -2.745164E-02 | -1.974190E-02 | -3.853759E-02 |
| $a_6$ | -8.066447E-02 | -1.761504E-02 | 3.380884E-03 | 5.679406E-03 |
| $a_8$ | 4.170203E-02 | 1.161484E-02 | 1.993543E-04 | 4.509625E-04 |
| $a_{10}$ | 0.000000E+00 | 0.000000E+00 | -4.130544E-05 | -1.018504E-04 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 13

| EFL(Effective focus length)= 7.069mm, HFOV(Half angular field of view)= 18.617deg., System length=6.382mm, Image height= 2.4mm, Fno=2.389 ||||||||
|---|---|---|---|---|---|---|---|
| Surface # | | Radius | Thickness | Refractive index | Abbe number | Focus | Material |
| - | Object | ∞ | | | | | |
| 300 | Aperture stop | ∞ | 0.049 | | | | |
| 311 | 1st lens element | 2.012 | 0.899 | 1.545 | 55.987 | 3.259 | plastic |
| 312 | | -13.049 | 0.222 | | | | |
| 321 | 2nd lens lement | 31.874 | 0.200 | 1.661 | 20.401 | -5.734 | plastic |
| 322 | | 3.403 | 2.335 | | | | |
| 331 | 3rd lens element | -8.746 | 0.250 | 1.545 | 55.987 | -4.382 | plastic |
| 332 | | 3.330 | 0.111 | | | | |
| 341 | 4th lens element | 4.279 | 0.937 | 1.661 | 20.401 | 10.883 | plastic |
| 342 | | 9.527 | 0.400 | | | | |
| 361 | IR cut filter | ∞ | 0.210 | 1.517 | 64.167 | | glass |
| 362 | | ∞ | 0.818 | | | | |
| 370 | Image plane | ∞ | 0.000 | | | | |

FIG. 16

| Aspherical parameters | | | | |
|---|---|---|---|---|
| Surface # | 311 | 312 | 321 | 322 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -3.828430E-03 | 6.385980E-03 | 1.258343E-03 | 3.594671E-03 |
| $a_6$ | -7.392548E-04 | 3.372396E-03 | 1.160469E-02 | 1.098361E-02 |
| $a_8$ | 6.230845E-05 | -9.044821E-04 | -4.101674E-03 | -2.423124E-03 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 331 | 332 | 341 | 342 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -6.811441E-02 | -1.624203E-01 | -1.541870E-01 | -8.242515E-02 |
| $a_6$ | -6.432641E-02 | 4.200551E-02 | 5.234964E-02 | 1.628723E-02 |
| $a_8$ | 2.650374E-02 | -2.246373E-02 | -9.755310E-03 | -4.458555E-04 |
| $a_{10}$ | -1.845420E-02 | 4.929245E-03 | 7.325964E-04 | -4.865774E-04 |
| $a_{12}$ | 0.000000E+00 | 0.000000E+00 | 3.082389E-05 | 5.928829E-05 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 17

| EFL(Effective focus length)= 7.066mm, HFOV(Half angular field of view)= 18.715deg., System length=6.387mm, Image height= 2.4mm, Fno=2.383 ||||||||
|---|---|---|---|---|---|---|---|
| Surface # | | Radius | Thickness | Refractive index | Abbe number | Focus | Material |
| - | Object | ∞ | | | | | |
| 400 | Aperture stop | ∞ | 0.047 | | | | |
| 411 | 1st lens element | 2.068 | 0.891 | 1.545 | 55.987 | 3.432 | plastic |
| 412 | | -16.999 | 0.039 | | | | |
| 421 | 2nd lens lement | -18.567 | 0.466 | 1.661 | 20.401 | -7.327 | plastic |
| 422 | | 6.690 | 2.774 | | | | |
| 431 | 3rd lens element | -3.310 | 0.481 | 1.545 | 55.987 | -4.387 | plastic |
| 432 | | 9.128 | 0.216 | | | | |
| 441 | 4th lens element | 9.537 | 0.524 | 1.661 | 20.401 | 20.004 | plastic |
| 442 | | 32.786 | 0.400 | | | | |
| 461 | IR cut filter | ∞ | 0.210 | 1.517 | 64.167 | | glass |
| 462 | | ∞ | 0.386 | | | | |
| 470 | Image plane | ∞ | 0.000 | | | | |

FIG. 20

| Aspherical parameters | | | | |
|---|---|---|---|---|
| Surface # | 411 | 412 | 421 | 422 |
| K | 0.000000E-00 | 0.000000E-00 | 0.000000E+00 | 0.000000E+00 |
| $a_2$ | 0.000000E-00 | 0.000000E-00 | 0.000000E+00 | 0.000000E+00 |
| $a_4$ | 1.697789E-03 | 1.329768E-02 | 1.680821E-02 | 2.351391E-02 |
| $a_6$ | -2.031914E-03 | -1.947992E-04 | 2.552826E-03 | -7.118126E-04 |
| $a_8$ | 1.682728E-04 | -2.477530E-04 | -7.962681E-04 | 2.406342E-03 |
| $a_{10}$ | 0.000000E-00 | 0.000000E-00 | 0.000000E+00 | 0.000000E+00 |
| $a_{12}$ | 0.000000E-00 | 0.000000E-00 | 0.000000E+00 | 0.000000E+00 |
| $a_{14}$ | 0.000000E-00 | 0.000000E-00 | 0.000000E+00 | 0.000000E+00 |
| $a_{16}$ | 0.000000E-00 | 0.000000E-00 | 0.000000E+00 | 0.000000E+00 |
| Surface # | 431 | 432 | 441 | 442 |
| K | 0.000000E-00 | 0.000000E-00 | 1.565735E+01 | 2.081814E+02 |
| $a_2$ | 0.000000E-00 | 0.000000E-00 | 0.000000E+00 | 0.000000E+00 |
| $a_4$ | -1.088045E-01 | -1.129483E-01 | -2.832879E-02 | -2.137389E-02 |
| $a_6$ | -6.982688E-02 | -1.386445E-02 | -2.567004E-03 | 6.181696E-03 |
| $a_8$ | 1.351009E-02 | 7.111506E-03 | 6.114093E-04 | -2.702603E-03 |
| $a_{10}$ | 0.000000E-00 | 0.000000E-00 | 3.072004E-05 | 2.989976E-04 |
| $a_{12}$ | 0.000000E-00 | 0.000000E-00 | 0.000000E+00 | 0.000000E+00 |
| $a_{14}$ | 0.000000E-00 | 0.000000E-00 | 0.000000E+00 | 0.000000E+00 |
| $a_{16}$ | 0.000000E-00 | 0.000000E-00 | 0.000000E+00 | 0.000000E+00 |

FIG. 21

| \multicolumn{8}{c}{EFL(Effective focus length)= 8.732mm, HFOV(Half angular field of view)= 15.313deg., System length=8.000 mm, Image height= 2.4mm, Fno=2.397} |
|---|---|---|---|---|---|---|---|
| Surface # | | Radius | Thickness | Refractive index | Abbe number | Focus | Material |
| - | Object | ∞ | | | | | |
| 500 | Aperture stop | ∞ | -0.032 | | | | |
| 511 | 1st lens element | 2.544 | 1.213 | 1.545 | 55.987 | 3.978 | plastic |
| 512 | | -12.380 | 0.066 | | | | |
| 521 | 2nd lens lement | -42.108 | 0.239 | 1.661 | 20.401 | -9.173 | plastic |
| 522 | | 7.167 | 2.641 | | | | |
| 531 | 3rd lens element | -3.364 | 0.289 | 1.545 | 55.987 | -6.140 | plastic |
| 532 | | 1207.381 | 0.203 | | | | |
| 541 | 4th lens element | -285.790 | 1.546 | 1.661 | 20.401 | 42.277 | plastic |
| 542 | | -25.699 | 0.400 | | | | |
| 561 | IR cut filter | ∞ | 0.210 | 1.517 | 64.167 | | glass |
| 562 | | ∞ | 1.194 | | | | |
| 570 | Image plane | ∞ | 0.000 | | | | |

FIG. 24

| Aspherical parameters | | | | |
|---|---|---|---|---|
| Surface # | 511 | 512 | 521 | 522 |
| K | 0.000000E-00 | 0.000000E+00 | 0.000000E+00 | 0.000000E+00 |
| $a_2$ | 0.000000E-00 | 0.000000E+00 | 0.000000E+00 | 0.000000E+00 |
| $a_4$ | -2.221639E-03 | 2.477821E-03 | -3.853283E-04 | -1.021070E-03 |
| $a_6$ | -2.700842E-04 | 5.423012E-04 | 3.878300E-06 | -1.132760E-03 |
| $a_8$ | -8.659691E-06 | -1.698333E-04 | -2.022601E-04 | 1.725476E-05 |
| $a_{10}$ | 0.000000E-00 | 0.000000E+00 | 0.000000E+00 | 0.000000E+00 |
| $a_{12}$ | 0.000000E-00 | 0.000000E+00 | 0.000000E+00 | 0.000000E+00 |
| $a_{14}$ | 0.000000E-00 | 0.000000E+00 | 0.000000E+00 | 0.000000E+00 |
| $a_{16}$ | 0.000000E-00 | 0.000000E+00 | 0.000000E+00 | 0.000000E+00 |
| Surface # | 531 | 532 | 541 | 542 |
| K | 0.000000E-00 | 0.000000E+00 | 0.000000E+00 | -1.069201E+03 |
| $a_2$ | 0.000000E-00 | 0.000000E+00 | 0.000000E+00 | 0.000000E+00 |
| $a_4$ | -2.237051E-02 | -3.489493E-02 | -4.980183E-02 | -3.261437E-02 |
| $a_6$ | -1.852831E-02 | -1.918748E-02 | -1.174967E-02 | 2.654907E-03 |
| $a_8$ | 3.934323E-04 | 4.108611E-03 | 3.102709E-03 | -2.248099E-04 |
| $a_{10}$ | 0.000000E-00 | 0.000000E+00 | -5.785030E-04 | 2.357767E-06 |
| $a_{12}$ | 0.000000E-00 | 0.000000E+00 | 0.000000E+00 | 0.000000E+00 |
| $a_{14}$ | 0.000000E-00 | 0.000000E+00 | 0.000000E+00 | 0.000000E+00 |
| $a_{16}$ | 0.000000E-00 | 0.000000E+00 | 0.000000E+00 | 0.000000E+00 |

FIG. 25

| \multicolumn{7}{c|}{EFL(Effective focus length)= 7.042mm, HFOV(Half angular field of view)= 18.773deg., System length=6.381 mm, Image height= 2.4mm, Fno=2.386} |
|---|---|---|---|---|---|---|
| Surface # | | Radius | Thickness | Refractive index | Abbe number | Focus | Material |
| - | Object | ∞ | | | | | |
| 600 | Aperture stop | ∞ | 0.050 | | | | |
| 611 | 1st lens element | 1.855 | 1.618 | 1.545 | 55.987 | 3.042 | plastic |
| 612 | | -11.044 | 0.110 | | | | |
| 621 | 2nd lens lement | -34.168 | 0.182 | 1.642 | 22.409 | -3.921 | plastic |
| 622 | | 2.747 | 2.052 | | | | |
| 631 | 3rd lens element | 14.736 | 0.275 | 1.535 | 55.690 | -5.130 | plastic |
| 632 | | 2.304 | 0.200 | | | | |
| 641 | 4th lens element | 6.943 | 0.935 | 1.642 | 22.409 | 12.784 | plastic |
| 642 | | 40.855 | 0.400 | | | | |
| 661 | IR cut filter | ∞ | 0.210 | 1.517 | 64.167 | | glass |
| 662 | | ∞ | 0.400 | | | | |
| 670 | Image plane | ∞ | 0.000 | | | | |

FIG. 28

| Aspherical parameters | | | | |
|---|---|---|---|---|
| Surface # | 611 | 612 | 621 | 622 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -3.224670E-03 | 3.661570E-02 | 3.367429E-02 | 2.537958E-02 |
| $a_6$ | 6.402892E-04 | -3.352354E-02 | -6.099893E-02 | -2.075054E-03 |
| $a_8$ | -2.575760E-04 | 2.153634E-02 | 5.402686E-02 | 1.467314E-02 |
| $a_{10}$ | -9.642653E-05 | -5.639188E-03 | -1.729048E-02 | 6.595109E-03 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 631 | 632 | 641 | 642 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -2.178062E-01 | -2.191158E-01 | -3.348301E-02 | -6.765523E-02 |
| $a_6$ | 1.365134E-02 | 5.579646E-02 | 2.239602E-02 | 3.704441E-02 |
| $a_8$ | 7.577679E-03 | -7.748379E-03 | -6.293883E-03 | -9.055893E-03 |
| $a_{10}$ | -3.461800E-04 | 3.942441E-04 | 8.724155E-04 | 1.088065E-03 |
| $a_{12}$ | 0.000000E+00 | 0.000000E+00 | -4.998197E-05 | -5.459651E-05 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 29

| \multicolumn{7}{|c|}{EFL(Effective focus length)= 7.042mm, HFOV(Half angular field of view)= 18.629deg., System length=6.368 mm, Image height= 2.4mm, Fno=2.393} |
|---|---|---|---|---|---|---|
| Surface # | | Radius | Thickness | Refractive index | Abbe number | Focus | Material |
| - | Object | ∞ | | | | | |
| 700 | Aperture stop | ∞ | 0.062 | | | | |
| 711 | 1st lens element | 1.848 | 0.869 | 1.545 | 55.987 | 3.493 | plastic |
| 712 | | 48.321 | 0.133 | | | | |
| 721 | 2nd lens lement | 5.762 | 0.223 | 1.642 | 22.409 | -6.166 | plastic |
| 722 | | 2.322 | 2.546 | | | | |
| 731 | 3rd lens element | -8.663 | 0.278 | 1.535 | 55.690 | -5.359 | plastic |
| 732 | | 4.352 | 0.078 | | | | |
| 741 | 4th lens element | 3.235 | 0.676 | 1.642 | 22.409 | 11.963 | plastic |
| 742 | | 5.099 | 0.400 | | | | |
| 761 | IR cut filter | ∞ | 0.210 | 1.517 | 64.167 | | glass |
| 762 | | ∞ | 0.955 | | | | |
| 770 | Image plane | ∞ | 0.000 | | | | |

FIG. 32

| Aspherical parameters | | | | |
|---|---|---|---|---|
| Surface # | 711 | 712 | 721 | 722 |
| K | 0.000000E+00 | 0.000000E+00 | 0.000000E-00 | 0.000000E-00 |
| $a_2$ | 0.000000E+00 | 0.000000E+00 | 0.000000E-00 | 0.000000E-00 |
| $a_4$ | -8.216768E-03 | 3.641889E-02 | 8.026439E-02 | 6.279841E-02 |
| $a_6$ | 7.382405E-03 | -3.681236E-02 | -9.723433E-02 | -4.429271E-02 |
| $a_8$ | -4.994741E-03 | 1.624190E-02 | 5.981369E-02 | 3.336812E-02 |
| $a_{10}$ | 6.595619E-04 | -2.404056E-03 | -1.194193E-02 | 1.032834E-03 |
| $a_{12}$ | 0.000000E+00 | 0.000000E+00 | 0.000000E-00 | 0.000000E-00 |
| $a_{14}$ | 0.000000E+00 | 0.000000E+00 | 0.000000E-00 | 0.000000E-00 |
| $a_{16}$ | 0.000000E+00 | 0.000000E+00 | 0.000000E-00 | 0.000000E-00 |
| Surface # | 731 | 732 | 741 | 742 |
| K | 0.000000E+00 | 0.000000E+00 | 0.000000E-00 | 0.000000E-00 |
| $a_2$ | 0.000000E+00 | 0.000000E+00 | 0.000000E-00 | 0.000000E-00 |
| $a_4$ | 4.082934E-02 | -1.759706E-02 | -1.550605E-01 | -1.142861E-01 |
| $a_6$ | -1.114130E-01 | -5.258555E-02 | 6.058942E-02 | 3.224350E-02 |
| $a_8$ | 3.397374E-02 | 1.881167E-02 | -1.334090E-02 | -3.142071E-03 |
| $a_{10}$ | -4.269545E-03 | -2.139770E-03 | 1.621506E-03 | -2.735502E-04 |
| $a_{12}$ | 0.000000E+00 | 0.000000E+00 | -1.355126E-04 | 3.759161E-05 |
| $a_{14}$ | 0.000000E+00 | 0.000000E+00 | 0.000000E-00 | 0.000000E-00 |
| $a_{16}$ | 0.000000E+00 | 0.000000E+00 | 0.000000E-00 | 0.000000E-00 |

FIG. 33

| EFL(Effective focus length)= 5.149mm, HFOV(Half angular field of view)= 24.073deg., System length=5.370 mm, Image height= 2.4mm, Fno=2.385 ||||||||
|---|---|---|---|---|---|---|---|
| Surface # | | Radius | Thickness | Refractive index | Abbe number | Focus | Material |
| - | Object | ∞ | | | | | |
| 800 | Aperture stop | ∞ | 1.060 | | | | |
| 811 | 1st lens element | 1.802 | 0.792 | 1.545 | 55.987 | 3.824 | plastic |
| 812 | | 11.075 | 0.131 | | | | |
| 821 | 2nd lens lement | -7.577 | 0.299 | 1.661 | 20.401 | -12.026 | plastic |
| 822 | | -141.250 | 1.430 | | | | |
| 831 | 3rd lens element | 5.208 | 0.264 | 1.545 | 55.987 | -41.760 | plastic |
| 832 | | 4.164 | 0.060 | | | | |
| 841 | 4th lens element | 2.780 | 0.281 | 1.661 | 20.401 | 6653.123 | plastic |
| 842 | | 2.669 | 0.400 | | | | |
| 861 | IR cut filter | ∞ | 0.210 | 1.517 | 64.167 | | glass |
| 862 | | ∞ | 1.503 | | | | |
| 870 | Image plane | ∞ | 0.000 | | | | |

FIG. 36

| Aspherical parameters | | | | |
|---|---|---|---|---|
| Surface # | 811 | 812 | 821 | 822 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -5.983845E-03 | -5.068547E-03 | -1.964111E-03 | 5.880421E-03 |
| $a_6$ | 1.041962E-02 | -1.148988E-02 | 4.758267E-03 | 1.253404E-02 |
| $a_8$ | -9.756229E-03 | -5.121100E-04 | 8.842777E-03 | 1.045561E-02 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 831 | 832 | 841 | 842 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -1.492567E-01 | -1.138647E-01 | -3.079443E-02 | -3.680585E-02 |
| $a_6$ | -5.907799E-02 | -5.225076E-02 | 5.693183E-03 | 9.444766E-03 |
| $a_8$ | -1.592630E-02 | 1.918029E-02 | 2.732373E-04 | -2.274545E-03 |
| $a_{10}$ | 0.000000E+00 | 0.000000E+00 | -5.116478E-04 | -3.915807E-05 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 37

| \multicolumn{7}{c}{EFL(Effective focus length)= 4.090mm, HFOV(Half angular field of view)= 22.660deg., System length=4.097 mm, Image height= 2.4mm, Fno=2.394} |||||||
|---|---|---|---|---|---|---|---|
| Surface # | | Radius | Thickness | Refractive index | Abbe number | Focus | Material |
| - | Object | ∞ | | | | | |
| 900 | Aperture stop | ∞ | 0.196 | | | | |
| 911 | 1st lens element | 1.219 | 0.856 | 1.545 | 55.987 | 2.029 | plastic |
| 912 | | -9.156 | 0.126 | | | | |
| 921 | 2nd lens element | -8.414 | 0.239 | 1.642 | 22.409 | -2.561 | plastic |
| 922 | | 2.088 | 0.981 | | | | |
| 931 | 3rd lens element | 8.940 | 0.284 | 1.535 | 55.690 | -4.255 | plastic |
| 932 | | 1.798 | 0.063 | | | | |
| 941 | 4th lens element | 1.678 | 0.549 | 1.642 | 22.409 | 5.117 | plastic |
| 942 | | 2.965 | 0.285 | | | | |
| 961 | IR cut filter | ∞ | 0.210 | 1.517 | 64.167 | | glass |
| 962 | | ∞ | 0.504 | | | | |
| 970 | Image plane | ∞ | 0.000 | | | | |

FIG. 40

| Aspherical parameters | | | | |
|---|---|---|---|---|
| Surface # | 911 | 912 | 921 | 922 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -5.027672E-03 | 3.863175E-02 | 5.359511E-02 | 1.160065E-01 |
| $a_6$ | -2.396259E-02 | -8.556918E-02 | -8.934259E-02 | 1.247549E-01 |
| $a_8$ | 4.327726E-02 | 2.006177E-01 | 3.402637E-01 | 1.012714E-01 |
| $a_{10}$ | -4.224183E-02 | -2.112658E-01 | -4.245282E-01 | 1.732951E-01 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 931 | 932 | 941 | 942 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -4.436865E-02 | -1.705424E-01 | -3.233946E-01 | -2.391601E-01 |
| $a_6$ | -3.643347E-01 | -1.855058E-01 | 1.827099E-01 | 1.063933E-01 |
| $a_8$ | 1.956230E-01 | 1.565187E-01 | -4.891346E-02 | 3.737992E-03 |
| $a_{10}$ | -4.067655E-02 | -4.577374E-02 | 3.931036E-04 | -1.487685E-02 |
| $a_{12}$ | 0.000000E+00 | 0.000000E+00 | 5.430125E-04 | 2.639180E-03 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 41

| | EFL(Effective focus length)= 4.237mm, HFOV(Half angular field of view)= 23.899deg., System length=4.448 mm, Image height= 2.4mm, Fno=2.401 |

| Surface # | | Radius | Thickness | Refractive index | Abbe number | Focus | Material |
|---|---|---|---|---|---|---|---|
| - | Object | ∞ | | | | | |
| 1000 | Aperture stop | ∞ | 0.284 | | | | |
| 1011 | 1st lens element | 1.395 | 0.948 | 1.545 | 55.987 | 2.214 | plastic |
| 1012 | | -6.892 | 0.139 | | | | |
| 1021 | 2nd lens lement | -8.452 | 0.239 | 1.642 | 22.409 | -2.851 | plastic |
| 1022 | | 2.388 | 0.991 | | | | |
| 1031 | 3rd lens element | 5.109 | 0.367 | 1.535 | 55.690 | -5.629 | plastic |
| 1032 | | 1.851 | 0.066 | | | | |
| 1041 | 4th lens element | 1.855 | 0.683 | 1.642 | 22.409 | 6.335 | plastic |
| 1042 | | 2.898 | 0.314 | | | | |
| 1061 | IR cut filter | ∞ | 0.210 | 1.517 | 64.167 | | glass |
| 1062 | | ∞ | 0.491 | | | | |
| 1070 | Image plane | ∞ | 0.000 | | | | |

FIG. 44

| Aspherical parameters | | | | |
|---|---|---|---|---|
| Surface # | 1011 | 1012 | 1021 | 1022 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -5.816564E-03 | 3.052405E-02 | 3.873410E-02 | 6.741223E-02 |
| $a_6$ | -1.472657E-02 | -6.771769E-02 | -4.693125E-02 | 4.918950E-02 |
| $a_8$ | 1.703836E-02 | 9.303000E-02 | 1.642082E-01 | 1.195219E-01 |
| $a_{10}$ | -2.102807E-02 | -8.150009E-02 | -1.606174E-01 | -1.143938E-02 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 1031 | 1032 | 1041 | 1042 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -1.307921E-02 | -1.030066E-01 | -2.436289E-01 | -1.869654E-01 |
| $a_6$ | -2.266711E-01 | -1.215405E-01 | 1.142185E-01 | 6.543336E-02 |
| $a_8$ | 1.139416E-01 | 7.530656E-02 | -2.524850E-02 | 2.617154E-03 |
| $a_{10}$ | -3.241567E-02 | -1.757762E-02 | 1.371027E-04 | -6.201297E-03 |
| $a_{12}$ | 0.000000E+00 | 0.000000E+00 | 2.345555E-04 | 8.837847E-04 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 45

| EFL(Effective focus length)= 7.070mm, HFOV(Half angular field of view)= 18.484deg., System length=6.384 mm, Image height= 2.4mm, Fno=2.397 ||||||||
|---|---|---|---|---|---|---|---|
| Surface # | | Radius | Thickness | Refractive index | Abbe number | Focus | Material |
| - | Object | ∞ | | | | | |
| 1100 | Aperture stop | ∞ | 0.048 | | | | |
| 1111 | 1st lens element | 1.851 | 1.296 | 1.545 | 55.987 | 3.188 | plastic |
| 1112 | | -22.194 | 0.047 | | | | |
| 1121 | 2nd lens element | 128.005 | 0.588 | 1.642 | 22.409 | -6.369 | plastic |
| 1122 | | 3.987 | 1.144 | | | | |
| 1131 | 3rd lens element | -6.663 | 0.277 | 1.535 | 55.690 | -6.123 | plastic |
| 1132 | | 6.575 | 0.337 | | | | |
| 1141 | 4th lens element | -12.637 | 1.459 | 1.642 | 22.409 | -17.044 | plastic |
| 1142 | | 90.895 | 0.400 | | | | |
| 1161 | IR cut filter | ∞ | 0.210 | 1.517 | 64.167 | | glass |
| 1162 | | ∞ | 0.624 | | | | |
| 1170 | Image plane | ∞ | 0.000 | | | | |

FIG. 48

| Aspherical parameters | | | | |
|---|---|---|---|---|
| Surface # | 1111 | 1112 | 1121 | 1122 |
| K | 0.000000E-00 | 0.000000E+00 | 0.000000E+00 | 0.000000E-00 |
| $a_2$ | 0.000000E-00 | 0.000000E+00 | 0.000000E+00 | 0.000000E-00 |
| $a_4$ | -5.884166E-03 | 8.300391E-03 | -1.769331E-03 | -1.140229E-02 |
| $a_6$ | 2.273588E-03 | 6.822149E-03 | 1.214201E-03 | 1.688702E-02 |
| $a_8$ | -8.670263E-04 | -7.276629E-03 | -6.036978E-03 | -2.073563E-02 |
| $a_{10}$ | 1.314041E-04 | 9.637961E-04 | 1.033936E-03 | 9.609774E-03 |
| $a_{12}$ | 0.000000E-00 | 0.000000E+00 | 0.000000E+00 | 0.000000E-00 |
| $a_{14}$ | 0.000000E-00 | 0.000000E+00 | 0.000000E+00 | 0.000000E-00 |
| $a_{16}$ | 0.000000E-00 | 0.000000E+00 | 0.000000E+00 | 0.000000E-00 |
| Surface # | 1131 | 1132 | 1141 | 1142 |
| K | 0.000000E-00 | 0.000000E+00 | 0.000000E+00 | 0.000000E-00 |
| $a_2$ | 0.000000E-00 | 0.000000E+00 | 0.000000E+00 | 0.000000E-00 |
| $a_4$ | -1.043128E-01 | -7.554601E-02 | -5.982711E-02 | -5.992313E-02 |
| $a_6$ | -8.312214E-02 | -2.449144E-02 | 1.707024E-02 | 1.680449E-02 |
| $a_8$ | 1.717498E-02 | 1.895190E-02 | -1.138853E-02 | -4.894883E-03 |
| $a_{10}$ | 1.454823E-02 | -5.812707E-03 | -3.036401E-03 | 7.032862E-04 |
| $a_{12}$ | -1.752593E-02 | 2.967968E-03 | 2.894114E-03 | -3.786520E-05 |
| $a_{14}$ | 0.000000E-00 | 0.000000E+00 | 0.000000E+00 | 0.000000E-00 |
| $a_{16}$ | 0.000000E-00 | 0.000000E+00 | 0.000000E+00 | 0.000000E-00 |

FIG. 49

| \multicolumn{7}{c}{EFL(Effective focus length)= 7.952mm, HFOV(Half angular field of view)= 16.424deg., System length=6.396 mm, Image height= 2.4mm, Fno=2.689} | | | | | | |
|---|---|---|---|---|---|---|
| Surface # | | Radius | Thickness | Refractive index | Abbe number | Focus | Material |
| - | Object | ∞ | | | | | |
| 1200 | Aperture stop | ∞ | 0.042 | | | | |
| 1211 | 1st lens element | 2.036 | 1.127 | 1.545 | 55.987 | 3.778 | plastic |
| 1212 | | 120.128 | 0.053 | | | | |
| 1221 | 2nd lens lement | -22.704 | 0.827 | 1.642 | 22.409 | -25.198 | plastic |
| 1222 | | 58.761 | 1.199 | | | | |
| 1231 | 3rd lens element | -13.372 | 0.131 | 1.545 | 55.987 | -4.374 | plastic |
| 1232 | | 2.919 | 1.219 | | | | |
| 1241 | 4th lens element | -4.458 | 0.841 | 1.545 | 55.987 | -7.326 | plastic |
| 1242 | | 41.720 | 0.400 | | | | |
| 1261 | IR cut filter | ∞ | 0.210 | 1.517 | 64.167 | | glass |
| 1262 | | ∞ | 0.388 | | | | |
| 1270 | Image plane | ∞ | 0.000 | | | | |

FIG. 52

| Aspherical parameters | | | | |
|---|---|---|---|---|
| Surface # | 1211 | 1212 | 1221 | 1222 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -4.858167E-03 | -5.701374E-02 | -4.734959E-02 | 4.087936E-03 |
| $a_6$ | -7.046811E-04 | 2.995933E-02 | 2.771945E-02 | 4.271040E-03 |
| $a_8$ | 1.651470E-04 | -1.002779E-02 | -9.757785E-03 | -5.048018E-03 |
| $a_{10}$ | -2.207773E-04 | 1.168024E-03 | 1.122833E-03 | 6.664224E-04 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 1231 | 1232 | 1241 | 1242 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 6.569058E-02 | 1.470620E-01 | -6.344521E-02 | -1.188277E-01 |
| $a_6$ | -1.820809E-01 | -1.620621E-01 | 2.865761E-02 | 2.890252E-02 |
| $a_8$ | 6.590299E-02 | 7.181692E-02 | -3.203140E-05 | -3.664328E-03 |
| $a_{10}$ | -3.113717E-02 | -1.276118E-02 | -1.134867E-03 | -2.671505E-04 |
| $a_{12}$ | 0.000000E+00 | 0.000000E+00 | 1.277421E-04 | 9.593486E-05 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 53

| EFL(Effective focus length)= 7.070mm, HFOV(Half angular field of view)= 18.553deg., System length=6.380 mm, Image height= 2.4mm, Fno=2.396 ||||||||
|---|---|---|---|---|---|---|---|
| Surface # | | Radius | Thickness | Refractive index | Abbe number | Focus | Material |
| - | Object | ∞ | | | | | |
| 1300 | Aperture stop | ∞ | 0.050 | | | | |
| 1311 | 1st lens element | 1.907 | 0.966 | 1.545 | 55.987 | 3.224 | plastic |
| 1312 | | -18.874 | 0.057 | | | | |
| 1321 | 2nd lens element | -19.692 | 0.230 | 1.642 | 22.409 | -6.052 | plastic |
| 1322 | | 4.913 | 1.203 | | | | |
| 1331 | 3rd lens element | 2.328 | 0.348 | 1.535 | 55.690 | -11.162 | plastic |
| 1332 | | 1.589 | 1.817 | | | | |
| 1341 | 4th lens element | 20.813 | 0.734 | 1.642 | 22.409 | -15.057 | plastic |
| 1342 | | 6.546 | 0.400 | | | | |
| 1361 | IR cut filter | ∞ | 0.210 | 1.517 | 64.167 | | glass |
| 1362 | | ∞ | 0.417 | | | | |
| 1370 | Image plane | ∞ | 0.000 | | | | |

FIG. 56

| Aspherical parameters | | | | |
|---|---|---|---|---|
| Surface # | 1311 | 1312 | 1321 | 1322 |
| K | 0.000000E+00 | 0.000000E-00 | 0.000000E+00 | 0.000000E+00 |
| $a_2$ | 0.000000E+00 | 0.000000E-00 | 0.000000E+00 | 0.000000E+00 |
| $a_4$ | -6.559423E-03 | 4.512000E-03 | 9.163302E-03 | -6.424032E-04 |
| $a_6$ | 2.174669E-03 | 6.420163E-03 | 4.244467E-03 | 5.859658E-03 |
| $a_8$ | -1.465744E-03 | -5.330070E-03 | -7.193862E-03 | -8.585424E-03 |
| $a_{10}$ | 2.602791E-04 | 9.946908E-04 | 1.596469E-03 | 2.306614E-03 |
| $a_{12}$ | 0.000000E+00 | 0.000000E-00 | 0.000000E+00 | 0.000000E+00 |
| $a_{14}$ | 0.000000E+00 | 0.000000E-00 | 0.000000E+00 | 0.000000E+00 |
| $a_{16}$ | 0.000000E+00 | 0.000000E-00 | 0.000000E+00 | 0.000000E+00 |
| Surface # | 1331 | 1332 | 1341 | 1342 |
| K | 0.000000E+00 | 0.000000E-00 | 0.000000E+00 | 0.000000E+00 |
| $a_2$ | 0.000000E+00 | 0.000000E-00 | 0.000000E+00 | 0.000000E+00 |
| $a_4$ | -1.044947E-01 | -9.508425E-02 | -4.466542E-02 | -6.816894E-02 |
| $a_6$ | -4.701161E-02 | -5.874324E-02 | 2.050235E-02 | 2.064643E-02 |
| $a_8$ | -2.229491E-02 | 3.016235E-02 | -5.092691E-03 | -4.134344E-03 |
| $a_{10}$ | 3.328398E-02 | -5.387623E-03 | 5.970281E-04 | 4.046777E-04 |
| $a_{12}$ | -1.569266E-02 | -4.590807E-04 | -2.645478E-05 | -1.587195E-05 |
| $a_{14}$ | 0.000000E+00 | 0.000000E-00 | 0.000000E+00 | 0.000000E+00 |
| $a_{16}$ | 0.000000E+00 | 0.000000E-00 | 0.000000E+00 | 0.000000E+00 |

FIG. 57

| EFL(Effective focus length)= 9.000mm, HFOV(Half angular field of view)= 18.172deg., System length=7.952mm, Image height= 2.944mm, Fno=2.391 ||||||||
|---|---|---|---|---|---|---|---|
| Surface # | | Radius | Thickness | Refractive index | Abbe number | Focus | Material |
| - | Object | ∞ | | | | | |
| 1400 | Aperture stop | ∞ | 0.048 | | | | |
| 1411 | 1st lens element | 2.476 | 1.374 | 1.545 | 55.987 | 3.758 | plastic |
| 1412 | | -9.660 | 0.178 | | | | |
| 1421 | 2nd lens lement | -8.476 | 0.240 | 1.642 | 22.409 | -6.232 | plastic |
| 1422 | | 7.783 | 2.129 | | | | |
| 1431 | 3rd lens element | -11.805 | 0.295 | 1.535 | 55.690 | -28.213 | plastic |
| 1432 | | -54.080 | 1.423 | | | | |
| 1441 | 4th lens element | -3.265 | 0.321 | 1.545 | 55.987 | -5.624 | plastic |
| 1442 | | 53.821 | 0.049 | | | | |
| 1451 | 5th lens element | 8.888 | 0.831 | 1.642 | 22.409 | 13.278 | plastic |
| 1452 | | -251.045 | 0.400 | | | | |
| 1461 | IR cut filter | ∞ | 0.210 | 1.517 | 64.167 | | glass |
| 1462 | | ∞ | 0.500 | | | | |
| 1470 | Image plane | ∞ | 0.000 | | | | |

FIG. 60

| Aspherical parameters | | | | | |
|---|---|---|---|---|---|
| Surface # | 1411 | 1412 | 1421 | 1422 | 1431 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -7.489541E-04 | 1.184819E-02 | 1.257896E-02 | 4.932233E-03 | -6.392603E-02 |
| $a_6$ | 9.337322E-05 | -1.320674E-03 | 8.563498E-04 | 1.889021E-03 | 1.511718E-02 |
| $a_8$ | -1.052282E-04 | 3.052808E-04 | -1.152542E-03 | -5.320684E-06 | -4.327186E-03 |
| $a_{10}$ | 4.951313E-05 | -9.640060E-05 | 1.878164E-04 | -1.332207E-04 | 1.658321E-03 |
| $a_{12}$ | -5.217396E-06 | 1.075975E-05 | 1.819630E-05 | -1.123328E-05 | -5.901483E-04 |
| $a_{14}$ | 0.000000E+00 | 0.000000E+00 | -3.967366E-06 | 3.002372E-05 | 0.000000E+00 |
| $a_{16}$ | 0.000000E+00 | 0.000000E+00 | 0.000000E+00 | 0.000000E+00 | 0.000000E+00 |
| Surface # | 1432 | 1441 | 1442 | 1451 | 1452 |
| K | 0.000000E+00 | 1.058660E-01 | 0.000000E+00 | 4.447768E+00 | 0.000000E+00 |
| $a_2$ | 0.000000E+00 | 0.000000E+00 | 0.000000E+00 | 0.000000E+00 | 0.000000E+00 |
| $a_4$ | -4.324263E-02 | 5.741333E-03 | -7.297549E-03 | -3.163618E-02 | -3.297237E-02 |
| $a_6$ | 1.702888E-02 | 2.491136E-03 | 1.580213E-04 | 4.483542E-03 | 4.328230E-03 |
| $a_8$ | 1.533290E-03 | -3.076014E-05 | 4.694533E-05 | -4.129700E-04 | -3.154601E-04 |
| $a_{10}$ | -1.258796E-03 | -2.184580E-05 | -3.032920E-05 | 1.846931E-06 | 2.418451E-06 |
| $a_{12}$ | 1.503700E-04 | 1.519806E-06 | 1.405184E-06 | 2.065052E-07 | 8.078747E-07 |
| $a_{14}$ | 0.000000E+00 | -3.126418E-08 | -6.338142E-09 | 6.128636E-08 | 8.472300E-09 |
| $a_{16}$ | 0.000000E+00 | 0.000000E+00 | 0.000000E+00 | 1.002474E-08 | 1.750812E-09 |

FIG. 61

| EFL(Effective focus length)=8.518mm, HFOV(Half angular field of view)= 18.985deg., System length=8.000mm, Image height= 2.944mm, Fno=2.343 ||||||||
|---|---|---|---|---|---|---|---|
| Surface # | | Radius | Thickness | Refractive index | Abbe number | Focus | Material |
| - | Object | ∞ | | | | | |
| 1500 | Aperture stop | ∞ | 0.089 | | | | |
| 1511 | 1st lens element | 2.435 | 1.217 | 1.545 | 55.987 | 3.916 | plastic |
| 1512 | | -14.509 | 0.097 | | | | |
| 1521 | 2nd lens lement | -40.457 | 0.453 | 1.642 | 22.409 | -7.127 | plastic |
| 1522 | | 5.231 | 2.437 | | | | |
| 1531 | 3rd lens element | -609.994 | 0.329 | 1.545 | 55.987 | -16.330 | plastic |
| 1532 | | 9.055 | 0.524 | | | | |
| 1541 | 4th lens element | -13.061 | 1.350 | 1.661 | 20.401 | 13.845 | plastic |
| 1542 | | -5.630 | 0.096 | | | | |
| 1551 | 5th lens element | -3.582 | 0.387 | 1.535 | 55.690 | -7.556 | plastic |
| 1552 | | -31.872 | 0.400 | | | | |
| 1561 | IR cut filter | ∞ | 0.210 | 1.517 | 64.167 | | glass |
| 1562 | | ∞ | 0.500 | | | | |
| 1570 | Image plane | ∞ | 0.000 | | | | |

FIG. 64

| Aspherical parameters | | | | | |
|---|---|---|---|---|---|
| Surface # | 1511 | 1512 | 1521 | 1522 | 1531 |
| K | -5.801667E-02 | -9.690809E+01 | 5.058228E+02 | 3.899057E+00 | -1.213390E+00 |
| $a_2$ | 0.000000E+00 | 0.000000E+00 | 0.000000E+00 | 0.000000E+00 | 0.000000E+00 |
| $a_4$ | -1.523888E-03 | 6.406715E-03 | 1.085654E-02 | 4.975626E-03 | -7.483683E-02 |
| $a_6$ | 9.391782E-04 | 3.348776E-04 | 1.149137E-03 | 2.577656E-03 | 2.504609E-02 |
| $a_8$ | -3.166069E-04 | -3.568528E-04 | -5.108540E-04 | 1.784683E-04 | -7.605780E-03 |
| $a_{10}$ | -5.570980E-06 | -1.985508E-06 | -1.539358E-05 | -7.910326E-05 | -2.703474E-03 |
| $a_{12}$ | 1.581824E-05 | 5.053390E-06 | -5.856072E-06 | -4.179522E-05 | 8.831479E-04 |
| $a_{14}$ | 6.779001E-06 | -1.729839E-06 | 3.857317E-06 | 6.144555E-06 | 7.130130E-05 |
| $a_{16}$ | -2.753996E-06 | -2.828026E-07 | 2.253802E-06 | 2.015071E-05 | -8.250573E-06 |
| Surface # | 1532 | 1541 | 1542 | 1551 | 1552 |
| K | -6.723237E+02 | 3.033149E+01 | -2.427268E+01 | 5.093481E-01 | 9.294625E+01 |
| $a_2$ | 0.000000E+00 | 0.000000E+00 | 0.000000E+00 | 0.000000E+00 | 0.000000E+00 |
| $a_4$ | -4.119153E-02 | -2.655701E-02 | -1.571567E-02 | 1.342371E-02 | -1.098481E-02 |
| $a_6$ | 9.315527E-03 | 1.346741E-03 | -9.576892E-05 | -2.484700E-04 | 2.779649E-03 |
| $a_8$ | -2.623595E-03 | 2.099997E-04 | 1.063283E-06 | 4.015475E-06 | -4.682219E-04 |
| $a_{10}$ | -7.005419E-04 | -1.779548E-04 | 3.284957E-06 | -8.465086E-06 | 4.074105E-05 |
| $a_{12}$ | 3.258949E-05 | -1.195828E-04 | -3.532252E-06 | 4.456482E-09 | -2.514182E-06 |
| $a_{14}$ | 6.408107E-05 | -1.637670E-05 | -5.734429E-07 | 7.210297E-08 | 8.054252E-09 |
| $a_{16}$ | 1.029101E-06 | 1.150858E-05 | 1.626384E-07 | 2.174458E-08 | 5.472476E-09 |

FIG. 65

| EFL(Effective focus length)= 8.698mm, HFOV(Half angular field of view)= 18.701deg., System length=8.000mm, Image height= 2.944mm, Fno=2.392 ||||||||
|---|---|---|---|---|---|---|---|
| Surface # | | Radius | Thickness | Refractive index | Abbe number | Focus | Material |
| - | Object | ∞ | | | | | |
| 1600 | Aperture stop | ∞ | 0.050 | | | | |
| 1611 | 1st lens element | 2.419 | 1.262 | 1.545 | 55.987 | 3.892 | plastic |
| 1612 | | -14.313 | 0.048 | | | | |
| 1621 | 2nd lens lement | 40.998 | 0.218 | 1.642 | 22.409 | -6.667 | plastic |
| 1622 | | 3.896 | 2.748 | | | | |
| 1631 | 3rd lens element | -8.537 | 0.300 | 1.545 | 55.987 | -11.374 | plastic |
| 1632 | | 23.110 | 0.431 | | | | |
| 1641 | 4th lens element | 6.973 | 0.538 | 1.661 | 20.401 | 13.676 | plastic |
| 1642 | | 28.784 | 0.172 | | | | |
| 1651 | 5th lens element | -12.205 | 0.419 | 1.535 | 55.690 | -12.507 | plastic |
| 1652 | | 15.088 | 0.400 | | | | |
| 1661 | IR cut filter | ∞ | 0.210 | 1.517 | 64.167 | | glass |
| 1662 | | ∞ | 1.256 | | | | |
| 1670 | Image plane | ∞ | 0.000 | | | | |

FIG. 68

| \multicolumn{6}{c}{Aspherical parameters} |
|---|---|---|---|---|---|
| Surface # | 1611 | 1612 | 1621 | 1622 | 1631 |
| K | 1.476749E-03 | -9.290108E+01 | 3.359695E+01 | 4.570927E-01 | 1.391168E+01 |
| $a_2$ | 0.000000E+00 | 0.000000E+00 | 0.000000E+00 | 0.000000E+00 | 0.000000E+00 |
| $a_4$ | -1.578387E-03 | 7.255038E-03 | 3.889744E-03 | -7.576078E-04 | -1.698279E-02 |
| $a_6$ | 3.753957E-04 | -1.864878E-04 | 1.422546E-03 | 3.190539E-03 | -1.679979E-02 |
| $a_8$ | -2.176493E-04 | -2.145309E-04 | -2.687213E-04 | -2.134219E-04 | 5.778411E-03 |
| $a_{10}$ | 2.993436E-05 | 1.873138E-05 | -8.407723E-05 | 1.996640E-04 | -2.858261E-03 |
| $a_{12}$ | 5.442453E-06 | 4.665127E-06 | -1.786210E-06 | -3.322971E-05 | 2.242326E-04 |
| $a_{14}$ | 5.703493E-07 | -9.883885E-07 | 7.368978E-06 | -4.328609E-05 | 1.304416E-04 |
| $a_{16}$ | -5.573511E-07 | -1.666081E-07 | -2.903845E-07 | 1.927236E-05 | -6.010793E-05 |
| Surface # | 1632 | 1641 | 1642 | 1651 | 1652 |
| K | -9.391948E-01 | -4.025173E+01 | -9.483101E+02 | 2.222300E+01 | -8.964975E+01 |
| $a_2$ | 0.000000E+00 | 0.000000E+00 | 0.000000E+00 | 0.000000E+00 | 0.000000E+00 |
| $a_4$ | -3.089099E-02 | -4.885421E-02 | -4.441025E-02 | -1.313645E-02 | -1.679073E-02 |
| $a_6$ | 7.960282E-04 | 3.175387E-03 | 3.326983E-03 | 2.009784E-03 | 1.932634E-03 |
| $a_8$ | -7.087004E-04 | 3.380653E-04 | 7.717542E-05 | 2.645012E-05 | -3.764681E-04 |
| $a_{10}$ | 4.986253E-05 | -7.088859E-05 | -1.992249E-05 | -4.704836E-05 | 2.361356E-05 |
| $a_{12}$ | -3.386474E-05 | -2.554260E-06 | -4.546486E-06 | -5.682361E-06 | -1.492442E-06 |
| $a_{14}$ | -6.194254E-06 | 4.781036E-07 | -8.726795E-09 | 8.439876E-08 | 8.684285E-08 |
| $a_{16}$ | 2.685959E-06 | -2.767692E-08 | 1.483629E-07 | 1.970376E-07 | -7.712367E-09 |

FIG. 69

| | EFL(Effective focus length)= 8.891mm, HFOV(Half angular field of view)= 18.354deg., System length=7.928mm, Image height= 2.944mm, Fno=2.378 |
|---|---|---|---|---|---|---|---|
| Surface # | | Radius | Thickness | Refractive index | Abbe number | Focus | Material |
| - | Object | ∞ | | | | | |
| 1700 | Aperture stop | ∞ | 0.050 | | | | |
| 1711 | 1st lens element | 2.457 | 1.462 | 1.545 | 55.987 | 3.553 | plastic |
| 1712 | | -7.299 | 0.060 | | | | |
| 1721 | 2nd lens element | -8.771 | 0.244 | 1.642 | 22.409 | -6.441 | plastic |
| 1722 | | 8.035 | 1.773 | | | | |
| 1731 | 3rd lens element | -12.552 | 0.338 | 1.545 | 55.987 | -8.076 | plastic |
| 1732 | | 6.867 | 0.293 | | | | |
| 1741 | 4th lens element | -22.993 | 0.462 | 1.642 | 22.409 | 23.823 | plastic |
| 1742 | | -9.303 | 1.424 | | | | |
| 1751 | 5th lens element | -7.130 | 0.798 | 1.545 | 55.987 | -12.560 | plastic |
| 1752 | | 189.214 | 0.400 | | | | |
| 1761 | IR cut filter | ∞ | 0.210 | 1.517 | 64.167 | | glass |
| 1762 | | ∞ | 0.465 | | | | |
| 1770 | Image plane | ∞ | 0.000 | | | | |

FIG. 72

| Aspherical parameters | | | | | |
|---|---|---|---|---|---|
| Surface # | 1711 | 1712 | 1721 | 1722 | 1731 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.489264E-03 | 4.027415E-03 | -3.217120E-03 | -6.433884E-03 | -3.196716E-02 |
| $a_6$ | -4.685716E-05 | 9.337689E-04 | 2.740251E-03 | 1.565148E-03 | -1.337881E-02 |
| $a_8$ | -8.015756E-05 | -1.515872E-04 | -4.131810E-04 | -3.287617E-04 | -9.877511E-04 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1732 | 1741 | 1742 | 1751 | 1752 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | 1.050815E-02 | -1.134082E-03 | -1.294062E-02 | -2.274259E-02 | -3.376997E-02 |
| $a_6$ | -1.171901E-02 | 4.845342E-03 | 3.081881E-03 | 4.362321E-03 | 4.286988E-03 |
| $a_8$ | 8.419195E-04 | -2.386601E-03 | 2.135796E-04 | -1.605972E-04 | -3.845997E-04 |
| $a_{10}$ | 0.000000E+00 | 0.000000E+00 | 0.000000E+00 | -2.891906E-06 | 1.548860E-05 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 73

| EFL(Effective focus length)= 8.921mm, HFOV(Half angular field of view)= 18.264deg., System length=7.618 mm, Image height= 2.944mm, Fno=2.377 | | | | | | | |
|---|---|---|---|---|---|---|---|
| Surface # | | Radius | Thickness | Refractive index | Abbe number | Focus | Material |
| - | Object | ∞ | | | | | |
| 1800 | Aperture stop | ∞ | 0.050 | | | | |
| 1811 | 1st lens element | 2.529 | 1.273 | 1.545 | 55.987 | 3.559 | plastic |
| 1812 | | -6.915 | 0.060 | | | | |
| 1821 | 2nd lens lement | -9.441 | 0.230 | 1.642 | 22.409 | -6.538 | plastic |
| 1822 | | 7.743 | 2.522 | | | | |
| 1831 | 3rd lens element | -5.147 | 0.270 | 1.545 | 55.987 | -10.124 | plastic |
| 1832 | | -75.642 | 0.988 | | | | |
| 1841 | 4th lens element | -8.739 | 0.411 | 1.642 | 22.409 | 27.611 | plastic |
| 1842 | | -5.978 | 0.450 | | | | |
| 1851 | 5th lens element | -7.517 | 0.420 | 1.545 | 55.987 | -7.049 | plastic |
| 1852 | | 8.051 | 0.400 | | | | |
| 1861 | IR cut filter | ∞ | 0.210 | 1.517 | 64.167 | | glass |
| 1862 | | ∞ | 0.384 | | | | |
| 1870 | Image plane | ∞ | 0.000 | | | | |

FIG. 76

| Aspherical parameters | | | | | |
|---|---|---|---|---|---|
| Surface # | 1811 | 1812 | 1821 | 1822 | 1831 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.909814E-03 | 4.112325E-03 | -3.346252E-03 | -5.580948E-03 | -3.164257E-02 |
| $a_6$ | -7.666321E-05 | 9.404561E-04 | 2.701814E-03 | 1.706965E-03 | -1.869231E-02 |
| $a_8$ | -7.368172E-05 | -1.608147E-04 | -4.112003E-04 | -3.372273E-04 | -2.856147E-03 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1832 | 1841 | 1842 | 1851 | 1852 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -5.884828E-03 | -1.298288E-02 | -1.312506E-02 | -2.134623E-02 | -3.196626E-02 |
| $a_6$ | -1.064119E-02 | 7.073592E-03 | 2.281479E-03 | 4.526031E-03 | 4.430399E-03 |
| $a_8$ | 1.100110E-03 | -1.381954E-03 | -5.823185E-05 | -1.579590E-04 | -4.034412E-04 |
| $a_{10}$ | 0.000000E+00 | 0.000000E+00 | 0.000000E+00 | -7.474847E-06 | 1.152836E-05 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 77

| EFL(Effective focus length)= 8.780mm, HFOV(Half angular field of view)= 18.548deg., System length=7.949mm, Image height= 2.944mm, Fno=2.400 ||||||||
|---|---|---|---|---|---|---|---|
| Surface # | | Radius | Thickness | Refractive index | Abbe number | Focus | Material |
| - | Object | ∞ | | | | | |
| 1900 | Aperture stop | ∞ | 0.050 | | | | |
| 1911 | 1st lens element | 2.469 | 1.466 | 1.545 | 55.987 | 3.558 | plastic |
| 1912 | | -7.222 | 0.060 | | | | |
| 1921 | 2nd lens lement | -8.852 | 0.274 | 1.642 | 22.409 | -6.410 | plastic |
| 1922 | | 7.906 | 1.836 | | | | |
| 1931 | 3rd lens element | -12.827 | 0.321 | 1.545 | 55.987 | -8.344 | plastic |
| 1932 | | 7.134 | 0.256 | | | | |
| 1941 | 4th lens element | -33.356 | 0.598 | 1.642 | 22.409 | 23.740 | plastic |
| 1942 | | -10.594 | 1.366 | | | | |
| 1951 | 5th lens element | -6.264 | 0.814 | 1.545 | 55.987 | -11.405 | plastic |
| 1952 | | 1221.791 | 0.400 | | | | |
| 1961 | IR cut filter | ∞ | 0.210 | 1.517 | 64.167 | | glass |
| 1962 | | ∞ | 0.350 | | | | |
| 1970 | Image plane | ∞ | 0.000 | | | | |

FIG. 80

| Aspherical parameters | | | | | |
|---|---|---|---|---|---|
| Surface # | 1911 | 1912 | 1921 | 1922 | 1931 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.505451E-03 | 4.232743E-03 | -3.145976E-03 | -6.230997E-03 | -3.347152E-02 |
| $a_6$ | -5.057290E-05 | 9.615657E-04 | 2.752765E-03 | 1.662432E-03 | -1.494483E-02 |
| $a_8$ | -7.240332E-05 | -1.528572E-04 | -4.087863E-04 | -3.113620E-04 | 6.883495E-05 |
| $a_{10}$ | 2.213678E-06 | -1.404478E-06 | 1.804447E-06 | 1.191745E-05 | -1.398828E-04 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1932 | 1941 | 1942 | 1951 | 1952 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | 8.502740E-03 | -4.516354E-03 | -1.573680E-02 | -2.292926E-02 | -3.169111E-02 |
| $a_6$ | -1.217756E-02 | 3.251326E-03 | 2.126990E-03 | 4.411095E-03 | 3.930603E-03 |
| $a_8$ | -1.851339E-05 | -2.444967E-03 | 1.638078E-04 | -1.616678E-04 | -4.033024E-04 |
| $a_{10}$ | -6.720660E-05 | -3.034629E-04 | 3.405852E-05 | -3.179060E-06 | 1.581615E-05 |
| $a_{12}$ | 0.000000E+00 | 0.000000E+00 | 0.000000E+00 | 7.877317E-08 | 2.499007E-07 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 81

| EFL(Effective focus length)= 9.144mm, HFOV(Half angular field of view)= 17.689deg., System length=7.835mm, Image height= 2.944mm, Fno=2.399 | | | | | | | |
|---|---|---|---|---|---|---|---|
| Surface # | | Radius | Thickness | Refractive index | Abbe number | Focus | Material |
| - | Object | ∞ | | | | | |
| 2000 | Aperture stop | ∞ | 0.050 | | | | |
| 2011 | 1st lens element | 2.537 | 1.305 | 1.545 | 55.987 | 3.608 | plastic |
| 2012 | | -7.227 | 0.177 | | | | |
| 2021 | 2nd lens element | -8.645 | 0.230 | 1.642 | 22.409 | -6.027 | plastic |
| 2022 | | 7.184 | 2.468 | | | | |
| 2031 | 3rd lens element | -11.684 | 0.270 | 1.545 | 55.987 | -12.797 | plastic |
| 2032 | | 17.544 | 0.259 | | | | |
| 2041 | 4th lens element | -8.670 | 0.425 | 1.642 | 22.409 | -436.398 | plastic |
| 2042 | | -9.117 | 1.195 | | | | |
| 2051 | 5th lens element | -6.265 | 0.550 | 1.545 | 55.987 | -9.273 | plastic |
| 2052 | | 27.282 | 0.400 | | | | |
| 2061 | IR cut filter | ∞ | 0.210 | 1.517 | 64.167 | | glass |
| 2062 | | ∞ | 0.346 | | | | |
| 2070 | Image plane | ∞ | 0.000 | | | | |

FIG. 84

| Aspherical parameters | | | | | |
|---|---|---|---|---|---|
| Surface # | 2011 | 2012 | 2021 | 2022 | 2031 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -2.342016E-03 | 4.013376E-03 | -2.911326E-03 | -6.205221E-03 | -4.288009E-02 |
| $a_6$ | -1.015825E-04 | 8.959916E-04 | 2.786624E-03 | 1.586885E-03 | -1.664547E-02 |
| $a_8$ | -7.653387E-05 | -1.585999E-04 | -4.146282E-04 | -3.130139E-04 | -1.655829E-03 |
| $a_{10}$ | 1.180168E-06 | 3.468955E-06 | -3.300826E-06 | 1.068900E-05 | -8.538334E-05 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 2032 | 2041 | 2042 | 2051 | 2052 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | 7.651517E-03 | 4.743030E-03 | -1.845337E-02 | -2.198122E-02 | -3.510408E-02 |
| $a_6$ | -1.078618E-02 | 4.368907E-03 | 2.303732E-03 | 4.374943E-03 | 4.352750E-03 |
| $a_8$ | 8.367865E-04 | -2.333401E-03 | 6.619178E-05 | -1.648360E-04 | -3.813971E-04 |
| $a_{10}$ | -5.593710E-05 | 3.299914E-05 | -2.720488E-05 | -3.728773E-06 | 1.570161E-05 |
| $a_{12}$ | 0.000000E+00 | 0.000000E+00 | 0.000000E+00 | 2.416806E-08 | 1.741415E-07 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 85

| EFL(Effective focus length)= 6.455mm, HFOV(Half angular field of view)= 24.636deg., System length=6.878mm, Image height= 2.944mm, Fno=2.389 |||||||
|---|---|---|---|---|---|---|---|
| Surface # | | Radius | Thickness | Refractive index | Abbe number | Focus | Material |
| - | Object | ∞ | | | | | |
| 2100 | Aperture stop | ∞ | 0.050 | | | | |
| 2111 | 1st lens element | 2.287 | 0.817 | 1.545 | 55.987 | 3.341 | plastic |
| 2112 | | -7.888 | 0.040 | | | | |
| 2121 | 2nd lens lement | -13.808 | 0.268 | 1.642 | 22.409 | -7.276 | plastic |
| 2122 | | 7.202 | 1.893 | | | | |
| 2131 | 3rd lens element | -11.684 | 0.691 | 1.545 | 55.987 | -12.738 | plastic |
| 2132 | | 17.564 | 0.154 | | | | |
| 2141 | 4th lens element | 100.726 | 0.764 | 1.642 | 22.409 | 7.474 | plastic |
| 2142 | | -5.067 | 0.141 | | | | |
| 2151 | 5th lens element | -7.350 | 0.982 | 1.545 | 55.987 | -5.567 | plastic |
| 2152 | | 5.433 | 0.400 | | | | |
| 2161 | IR cut filter | ∞ | 0.210 | 1.517 | 64.167 | | glass |
| 2162 | | ∞ | 0.518 | | | | |
| 2170 | Image plane | ∞ | 0.000 | | | | |

FIG. 88

| Aspherical parameters | | | | | |
|---|---|---|---|---|---|
| Surface # | 2111 | 2112 | 2121 | 2122 | 2131 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -2.020460E-03 | 4.592785E-03 | -3.084968E-03 | -5.334412E-03 | -2.421104E-02 |
| $a_6$ | -4.972987E-04 | 6.363831E-04 | 2.825920E-03 | 1.311898E-03 | -1.305217E-02 |
| $a_8$ | -1.833249E-04 | -1.740793E-04 | -2.271825E-04 | -2.665240E-04 | -3.274256E-03 |
| $a_{10}$ | -4.378450E-05 | -1.107080E-05 | 7.282953E-05 | 4.356544E-05 | 6.798560E-04 |
| $a_{12}$ | -1.918609E-05 | 1.755149E-07 | 1.611990E-05 | 9.217564E-06 | 4.349650E-04 |
| $a_{14}$ | -1.183885E-05 | -9.499094E-06 | 4.030302E-06 | -3.225122E-06 | -1.087922E-04 |
| $a_{16}$ | -7.208374E-06 | -2.881795E-06 | -4.810201E-07 | -8.371001E-06 | -1.711150E-04 |
| Surface # | 2132 | 2141 | 2142 | 2151 | 2152 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | 7.476826E-03 | 1.658683E-03 | -7.195807E-03 | -3.835365E-02 | -4.009031E-02 |
| $a_6$ | -1.052233E-02 | -1.406560E-03 | -6.408118E-04 | 7.900908E-03 | 5.743313E-03 |
| $a_8$ | 2.902971E-04 | -2.804150E-03 | 6.252755E-04 | -1.441037E-04 | -6.080015E-04 |
| $a_{10}$ | -7.843558E-05 | 3.917016E-04 | -7.064265E-05 | -2.112370E-05 | 2.229807E-06 |
| $a_{12}$ | 4.340755E-06 | 1.076447E-05 | 4.262767E-06 | -1.298079E-06 | 1.165672E-06 |
| $a_{14}$ | -3.491994E-06 | -5.637831E-06 | 2.520404E-06 | 1.177115E-07 | 2.404601E-07 |
| $a_{16}$ | -1.486764E-06 | -5.195535E-06 | -4.117644E-07 | -2.568972E-08 | -2.221044E-08 |

FIG. 89

| \multicolumn{7}{|c|}{EFL(Effective focus length)= 7.064mm, HFOV(Half angular field of view)= 22.413deg., System length=5.989mm, Image height= 2.944mm, Fno=3.552} |
|---|---|---|---|---|---|---|
| Surface # | | Radius | Thickness | Refractive index | Abbe number | Focus | Material |
| - | Object | ∞ | | | | | |
| 2200 | Aperture stop | ∞ | 0.050 | | | | |
| 2211 | 1st lens element | 1.964 | 1.172 | 1.545 | 55.987 | 3.130 | plastic |
| 2212 | | -10.413 | 0.060 | | | | |
| 2221 | 2nd lens element | -7.616 | 0.662 | 1.642 | 22.409 | -7.298 | plastic |
| 2222 | | 12.867 | 1.354 | | | | |
| 2231 | 3rd lens element | -4.132 | 0.271 | 1.545 | 55.987 | -15.650 | plastic |
| 2232 | | -8.182 | 0.393 | | | | |
| 2241 | 4th lens element | -8.371 | 0.320 | 1.642 | 22.409 | -74.132 | plastic |
| 2242 | | -10.292 | 0.393 | | | | |
| 2251 | 5th lens element | -2.740 | 0.481 | 1.545 | 55.987 | -2.803 | plastic |
| 2252 | | 3.687 | 0.400 | | | | |
| 2261 | IR cut filter | ∞ | 0.210 | 1.517 | 64.167 | | glass |
| 2262 | | ∞ | 0.273 | | | | |
| 2270 | Image plane | ∞ | 0.000 | | | | |

FIG. 92

| Aspherical parameters | | | | | |
|---|---|---|---|---|---|
| Surface # | 2211 | 2212 | 2221 | 2222 | 2231 |
| K | 0.000000E+00 | 0.000000E+00 | 0.000000E+00 | 0.000000E+00 | 0.000000E-00 |
| $a_2$ | 0.000000E+00 | 0.000000E+00 | 0.000000E+00 | 0.000000E+00 | 0.000000E-00 |
| $a_4$ | -5.730718E-04 | 4.949209E-03 | -2.441098E-03 | -3.872442E-04 | -1.415609E-01 |
| $a_6$ | -6.203736E-04 | 6.225140E-04 | 4.274369E-03 | 3.605515E-03 | 4.985583E-02 |
| $a_8$ | -3.146965E-04 | -1.631501E-03 | 2.471161E-03 | -1.031337E-05 | -4.286200E-02 |
| $a_{10}$ | -1.163121E-04 | -2.516254E-03 | 2.215298E-04 | 1.279931E-03 | -1.731523E-02 |
| $a_{12}$ | -8.111968E-05 | 1.032282E-03 | -7.834886E-04 | 2.509629E-03 | 9.692907E-04 |
| $a_{14}$ | -1.260722E-04 | -1.618753E-03 | 1.259159E-03 | 1.660095E-03 | 4.750455E-03 |
| $a_{16}$ | -2.993911E-04 | -5.791982E-05 | -8.605280E-04 | 1.681137E-03 | 2.881593E-03 |
| Surface # | 2232 | 2241 | 2242 | 2251 | 2252 |
| K | 0.000000E+00 | 0.000000E+00 | 0.000000E+00 | 0.000000E+00 | 0.000000E-00 |
| $a_2$ | 0.000000E+00 | 0.000000E+00 | 0.000000E+00 | 0.000000E+00 | 0.000000E-00 |
| $a_4$ | -3.794787E-03 | -8.509203E-02 | -2.884346E-02 | -3.376329E-02 | -1.474663E-01 |
| $a_6$ | -2.194258E-02 | 5.201797E-02 | -1.917712E-03 | 7.802970E-03 | 3.588250E-02 |
| $a_8$ | -2.472284E-04 | -1.190070E-02 | -5.532252E-04 | 3.546307E-04 | -2.572977E-03 |
| $a_{10}$ | 1.105751E-03 | -4.618596E-03 | -7.202460E-05 | 5.281341E-05 | -3.218294E-04 |
| $a_{12}$ | 5.780293E-04 | -8.052793E-04 | 7.152623E-07 | -5.448100E-06 | -8.004036E-06 |
| $a_{14}$ | 1.331597E-04 | 9.508429E-05 | 7.573652E-06 | 5.594150E-08 | 3.340384E-06 |
| $a_{16}$ | -1.587801E-05 | 1.505729E-04 | 5.471128E-06 | -2.869272E-07 | 4.666287E-07 |

FIG. 93

| \multicolumn{8}{c}{EFL(Effective focus length)= 9.015mm, HFOV(Half angular field of view)= 18.214deg., System length=7.998 mm, Image height= 2.944mm, Fno=2.389} |||||||| 
|---|---|---|---|---|---|---|---|
| Surface # | | Radius | Thickness | Refractive index | Abbe number | Focus | Material |
| - | Object | ∞ | | | | | |
| 2300 | Aperture stop | ∞ | 0.000 | | | | |
| 2311 | 1st lens element | 2.318 | 1.486 | 1.545 | 55.987 | 3.704 | plastic |
| 2312 | | -12.321 | 0.050 | | | | |
| 2321 | 2nd lens lement | -18.646 | 0.236 | 1.642 | 22.409 | -6.663 | plastic |
| 2322 | | 5.639 | 1.534 | | | | |
| 2331 | 3rd lens element | -5.424 | 0.295 | 1.545 | 55.987 | -13.717 | plastic |
| 2332 | | -20.013 | 1.708 | | | | |
| 2341 | 4th lens element | -9.369 | 0.520 | 1.661 | 20.401 | -72.417 | plastic |
| 2342 | | -11.885 | 0.057 | | | | |
| 2351 | 5th lens element | -31.974 | 0.603 | 1.535 | 55.690 | -21.681 | plastic |
| 2352 | | 18.408 | 0.400 | | | | |
| 2361 | IR cut filter | ∞ | 0.210 | 1.517 | 64.167 | | glass |
| 2362 | | ∞ | 0.898 | | | | |
| 2370 | Image plane | ∞ | 0.000 | | | | |

FIG. 96

| Aspherical parameters | | | | | |
|---|---|---|---|---|---|
| Surface # | 2311 | 2312 | 2321 | 2322 | 2331 |
| K | 0.000000E+00 | 0.000000E+00 | 0.000000E+00 | 0.000000E+00 | 1.200872E+01 |
| $a_2$ | 0.000000E+00 | 0.000000E+00 | 0.000000E+00 | 0.000000E+00 | 0.000000E+00 |
| $a_4$ | -2.196580E-03 | 5.174384E-03 | 1.193450E-03 | -5.478286E-04 | -1.784313E-03 |
| $a_6$ | 4.933308E-04 | 3.703540E-04 | 8.694682E-04 | 1.825960E-03 | -6.259892E-03 |
| $a_8$ | -1.756948E-04 | -1.385911E-04 | -1.517497E-04 | -4.770843E-04 | 4.201248E-03 |
| $a_{10}$ | 1.529343E-05 | 2.352727E-06 | -8.354033E-06 | 9.280933E-05 | -1.771563E-03 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 2332 | 2341 | 2342 | 2351 | 2352 |
| K | -2.240193E+01 | 5.533314E+00 | 6.292443E+00 | 1.438177E+02 | 4.355093E+01 |
| $a_2$ | 0.000000E+00 | 0.000000E+00 | 0.000000E+00 | 0.000000E+00 | 0.000000E+00 |
| $a_4$ | 2.941083E-03 | -2.961337E-02 | -4.618576E-02 | -3.674505E-02 | -2.033567E-02 |
| $a_6$ | 5.778230E-03 | 6.055188E-04 | 2.785881E-03 | 1.104857E-03 | 3.454061E-04 |
| $a_8$ | -1.027116E-03 | 5.924672E-04 | 2.427589E-04 | 3.385085E-04 | -2.466785E-04 |
| $a_{10}$ | 1.969347E-05 | -2.124086E-05 | 2.495271E-05 | 9.103671E-06 | 3.496617E-05 |
| $a_{12}$ | 0.000000E+00 | 0.000000E+00 | 0.000000E+00 | -4.274430E-07 | -1.947189E-06 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 97

| Embodiment | 1st | 2nd | 3rd | 4th | 5th | 6th | 7th |
|---|---|---|---|---|---|---|---|
| EFL | 7.07 | 7.07 | 7.069 | 7.066 | 8.732 | 7.042 | 7.042 |
| Fno | 2.39 | 2.369 | 2.389 | 2.383 | 2.397 | 2.386 | 2.393 |
| HFOV | 18.68 | 18.13 | 18.617 | 18.72 | 15.31 | 18.77 | 18.63 |
| T1 | 0.945 | 0.874 | 0.899 | 0.891 | 1.213 | 1.618 | 0.869 |
| G12 | 0.074 | 0.093 | 0.222 | 0.039 | 0.066 | 0.11 | 0.133 |
| T2 | 0.23 | 0.589 | 0.2 | 0.466 | 0.239 | 0.182 | 0.223 |
| G23 | 2.605 | 2.446 | 2.335 | 2.774 | 2.641 | 2.052 | 2.546 |
| T3 | 0.836 | 0.282 | 0.25 | 0.481 | 0.289 | 0.275 | 0.278 |
| G34 | 0.148 | 0.735 | 0.111 | 0.216 | 0.203 | 0.2 | 0.078 |
| T4 | 0.329 | 0.365 | 0.937 | 0.524 | 1.546 | 0.935 | 0.676 |
| G4F | 0.4 | 0.4 | 0.4 | 0.4 | 0.4 | 0.4 | 0.4 |
| TF | 0.21 | 0.21 | 0.21 | 0.21 | 0.21 | 0.21 | 0.21 |
| GFP | 0.604 | 0.39 | 0.818 | 0.386 | 1.194 | 0.4 | 0.955 |
| TTL | 6.38 | 6.384 | 6.382 | 6.387 | 8 | 6.381 | 6.368 |
| TL | 5.166 | 5.384 | 4.954 | 5.391 | 6.196 | 5.371 | 4.803 |
| TL/G23 | 1.983 | 2.201 | 2.122 | 1.944 | 2.346 | 2.618 | 1.887 |
| Fno/(G12+G34) | 10.78 | 2.861 | 7.161 | 9.352 | 8.907 | 7.69 | 11.32 |
| Fno/G23 | 0.917 | 0.969 | 1.023 | 0.859 | 0.908 | 1.163 | 0.94 |
| Fno/(G12+G23) | 0.892 | 0.933 | 0.934 | 0.847 | 0.886 | 1.104 | 0.893 |
| TTL/(G23+G34) | 2.318 | 2.007 | 2.609 | 2.136 | 2.813 | 2.834 | 2.427 |
| (T1+T2)/(G12+G34) | 5.299 | 1.766 | 3.294 | 5.327 | 5.394 | 5.8 | 5.167 |
| Fno/(T1+G12+T2) | 1.914 | 1.523 | 1.808 | 1.707 | 1.58 | 1.249 | 1.953 |
| Fno/T1 | 2.529 | 2.712 | 2.658 | 2.673 | 1.977 | 1.475 | 2.754 |
| Fno/(T1+T2) | 2.034 | 1.62 | 2.174 | 1.755 | 1.651 | 1.326 | 2.191 |
| G34/(T2+T3) | 0.139 | 0.843 | 0.247 | 0.228 | 0.385 | 0.439 | 0.155 |
| (G12+G34)/(T2+T3) | 0.208 | 0.95 | 0.742 | 0.269 | 0.51 | 0.68 | 0.422 |
| (G12+G23+G34)/Fno | 1.183 | 1.382 | 1.117 | 1.271 | 1.214 | 0.99 | 1.152 |
| (G23–G34)/Fno | 1.152 | 1.343 | 1.024 | 1.255 | 1.187 | 0.944 | 1.096 |
| G34/T2 | 0.643 | 1.247 | 0.555 | 0.464 | 0.851 | 1.103 | 0.349 |
| EFL/Fno | 2.958 | 2.984 | 2.959 | 2.966 | 3.643 | 2.951 | 2.943 |
| G23/T2 | 11.34 | 4.152 | 11.66 | 5.953 | 11.05 | 11.3 | 11.4 |
| (G12–G23)/T2 | 11.66 | 4.311 | 12.771 | 6.037 | 11.33 | 11.9 | 12 |
| (T1–T2)/T1 | 1.243 | 1.674 | 1.223 | 1.523 | 1.197 | 1.112 | 1.257 |
| TTL/Fno | 2.67 | 2.695 | 2.672 | 2.68 | 3.338 | 2.674 | 2.662 |
| EFL/(T2–T3) | 6.635 | 8.112 | 15.715 | 7.463 | 16.55 | 15.43 | 14.05 |

FIG. 98A

| Embodiment | 8th | 9th | 10th | 11th | 12th | 13th |
|---|---|---|---|---|---|---|
| EFL | 5.149 | 4.09 | 4.237 | 7.07 | 7.952 | 7.07 |
| Fno | 2.385 | 2.394 | 2.401 | 2.397 | 2.689 | 2.396 |
| HFOV | 24.07 | 22.66 | 23.9 | 18.484 | 16.424 | 18.553 |
| T1 | 0.792 | 0.856 | 0.948 | 1.296 | 1.127 | 0.966 |
| G12 | 0.131 | 0.126 | 0.139 | 0.047 | 0.053 | 0.057 |
| T2 | 0.299 | 0.239 | 0.239 | 0.588 | 0.827 | 0.23 |
| G23 | 1.43 | 0.981 | 0.991 | 1.144 | 1.199 | 1.203 |
| T3 | 0.264 | 0.284 | 0.367 | 0.277 | 0.131 | 0.348 |
| G34 | 0.06 | 0.063 | 0.066 | 0.337 | 1.219 | 1.817 |
| T4 | 0.281 | 0.549 | 0.683 | 1.459 | 0.841 | 0.734 |
| G4F | 0.4 | 0.285 | 0.314 | 0.4 | 0.4 | 0.4 |
| TF | 0.21 | 0.21 | 0.21 | 0.21 | 0.21 | 0.21 |
| GFP | 1.503 | 0.504 | 0.491 | 0.624 | 0.388 | 0.417 |
| TTL | 5.37 | 4.097 | 4.448 | 6.384 | 6.396 | 6.38 |
| TL | 3.257 | 3.098 | 3.434 | 5.149 | 5.398 | 5.354 |
| TL/G23 | 2.278 | 3.159 | 3.466 | 4.499 | 4.502 | 4.45 |
| Fno/(G12+G34) | 12.49 | 12.66 | 11.7 | 6.233 | 2.113 | 1.279 |
| Fno/G23 | 1.668 | 2.441 | 2.424 | 2.094 | 2.243 | 1.991 |
| Fno/(G12+G23) | 1.528 | 2.163 | 2.126 | 2.011 | 2.148 | 1.902 |
| TTL/(G23+G34) | 3.604 | 3.924 | 4.209 | 4.308 | 2.645 | 2.113 |
| (T1+T2)/(G12+G34) | 5.712 | 5.79 | 5.788 | 4.9 | 1.536 | 0.638 |
| Fno/(T1+G12+T2) | 1.952 | 1.961 | 1.81 | 1.241 | 1.34 | 1.914 |
| Fno/T1 | 3.011 | 2.796 | 2.532 | 1.849 | 2.385 | 2.481 |
| Fno/(T1+T2) | 2.186 | 2.186 | 2.022 | 1.272 | 1.376 | 2.004 |
| G34/(T2+T3) | 0.107 | 0.121 | 0.109 | 0.39 | 1.272 | 3.144 |
| (G12+G34)/(T2+T3) | 0.339 | 0.362 | 0.338 | 0.445 | 1.328 | 3.242 |
| (G12+G23+G34)/Fno | 0.68 | 0.489 | 0.498 | 0.638 | 0.919 | 1.284 |
| (G23+G34)/Fno | 0.625 | 0.436 | 0.44 | 0.618 | 0.899 | 1.261 |
| G34/T2 | 0.201 | 0.265 | 0.276 | 0.574 | 1.475 | 7.906 |
| EFL/Fno | 2.159 | 1.708 | 1.765 | 2.95 | 2.957 | 2.951 |
| G23/T2 | 4.783 | 4.101 | 4.142 | 1.947 | 1.45 | 5.235 |
| (G12+G23)/T2 | 5.22 | 4.627 | 4.723 | 2.027 | 1.514 | 5.481 |
| (T1+T2)/T1 | 1.378 | 1.279 | 1.252 | 1.454 | 1.733 | 1.238 |
| TTL/Fno | 2.252 | 1.711 | 1.852 | 2.664 | 2.378 | 2.663 |
| EFL/(T2+T3) | 9.143 | 7.818 | 6.985 | 8.174 | 8.298 | 12.234 |

FIG. 98B

| Embodiment | 14th | 15th | 16th | 17th | 18th | 19th | 20th | 21th | 22th | 23th |
|---|---|---|---|---|---|---|---|---|---|---|
| EFL | 9 | 8.518 | 8.698 | 8.891 | 8.921 | 8.78 | 9.144 | 6.455 | 7.064 | 9.015 |
| Fno | 2.391 | 2.343 | 2.392 | 2.378 | 2.377 | 2.4 | 2.399 | 2.389 | 3.552 | 2.389 |
| HFOV | 18.02 | 18.99 | 18.701 | 18.35 | 18.26 | 18.55 | 17.69 | 24.64 | 22.41 | 18.21 |
| T1 | 1.374 | 1.217 | 1.262 | 1.462 | 1.273 | 1.466 | 1.305 | 0.817 | 1.172 | 1.486 |
| G1 | 0.178 | 0.097 | 0.048 | 0.06 | 0.06 | 0.06 | 0.177 | 0.04 | 0.06 | 0.05 |
| T2 | 0.24 | 0.453 | 0.218 | 0.244 | 0.23 | 0.274 | 0.23 | 0.268 | 0.662 | 0.236 |
| G2 | 2.129 | 2.437 | 2.748 | 1.773 | 2.522 | 1.836 | 2.468 | 1.893 | 1.354 | 1.534 |
| T3 | 0.295 | 0.329 | 0.3 | 0.338 | 0.27 | 0.321 | 0.27 | 0.691 | 0.271 | 0.295 |
| G3 | 1.423 | 0.524 | 0.431 | 0.293 | 0.988 | 0.256 | 0.259 | 0.154 | 0.393 | 1.708 |
| T4 | 0.321 | 1.35 | 0.538 | 0.462 | 0.411 | 0.598 | 0.425 | 0.764 | 0.32 | 0.52 |
| G4 | 0.049 | 0.096 | 0.172 | 1.424 | 0.45 | 1.366 | 1.195 | 0.141 | 0.393 | 0.057 |
| T5 | 0.831 | 0.387 | 0.419 | 0.798 | 0.42 | 0.814 | 0.55 | 0.982 | 0.481 | 0.603 |
| G5 | 0.4 | 0.4 | 0.4 | 0.4 | 0.4 | 0.4 | 0.4 | 0.4 | 0.4 | 0.4 |
| TF | 0.21 | 0.21 | 0.21 | 0.21 | 0.21 | 0.21 | 0.21 | 0.21 | 0.21 | 0.21 |
| GFP | 0.5 | 0.5 | 1.256 | 0.465 | 0.384 | 0.35 | 0.346 | 0.518 | 0.273 | 0.898 |
| TL | 6.842 | 6.89 | 6.134 | 6.853 | 6.624 | 6.989 | 6.879 | 5.75 | 5.106 | 6.489 |
| TTL | 7.952 | 8 | 8 | 7.928 | 7.618 | 7.949 | 7.835 | 6.878 | 5.989 | 7.998 |
| TL/G2 | 3.213 | 2.828 | 2.232 | 3.866 | 2.627 | 3.807 | 2.788 | 3.037 | 3.772 | 4.229 |
| Fno/(G1+G3) | 1.493 | 3.77 | 4.999 | 6.743 | 2.268 | 7.604 | 5.499 | 12.31 | 7.839 | 1.359 |
| Fno/G2 | 1.123 | 0.961 | 0.87 | 1.342 | 0.942 | 1.308 | 0.972 | 1.262 | 2.624 | 1.557 |
| Fno/(G1+G2) | 1.036 | 0.925 | 0.855 | 1.298 | 0.921 | 1.266 | 0.907 | 1.236 | 2.513 | 1.508 |
| TTL/(G2+G3) | 2.238 | 2.701 | 2.517 | 3.839 | 2.17 | 3.801 | 2.874 | 3.36 | 3.429 | 2.467 |
| (T1+T2)/(G1+G3) | 1.008 | 2.687 | 3.091 | 4.836 | 1.434 | 5.51 | 3.518 | 5.594 | 4.047 | 0.98 |
| Fno/(T1+G1+T2) | 1.334 | 1.326 | 1.567 | 1.347 | 1.52 | 1.334 | 1.401 | 2.122 | 1.876 | 1.348 |
| Fno/T1 | 1.74 | 1.925 | 1.896 | 1.627 | 1.866 | 1.638 | 1.839 | 2.923 | 3.031 | 1.607 |
| Fno/(T1+T2) | 1.481 | 1.403 | 1.617 | 1.394 | 1.581 | 1.38 | 1.563 | 2.2 | 1.937 | 1.387 |
| G3/(T2+T3) | 2.657 | 0.671 | 0.832 | 0.503 | 1.976 | 0.43 | 0.518 | 0.161 | 0.422 | 3.218 |
| (G1+G3)/(T2+T3) | 2.99 | 0.794 | 0.925 | 0.606 | 2.096 | 0.531 | 0.872 | 0.202 | 0.486 | 3.311 |
| (G1+G2+G3)/Fno | 1.56 | 1.305 | 1.349 | 0.894 | 1.502 | 0.896 | 1.21 | 0.874 | 0.509 | 1.378 |
| (G2+G3)/Fno | 1.486 | 1.264 | 1.329 | 0.868 | 1.477 | 0.871 | 1.136 | 0.857 | 0.492 | 1.357 |
| G3/T2 | 5.918 | 1.159 | 1.98 | 1.2 | 4.297 | 0.934 | 1.126 | 0.574 | 0.594 | 7.233 |
| EFL/Fno | 3.764 | 3.636 | 3.636 | 3.739 | 3.753 | 3.658 | 3.811 | 2.703 | 1.989 | 3.774 |
| G2/T2 | 8.855 | 5.384 | 12.634 | 7.267 | 10.97 | 6.708 | 10.73 | 7.051 | 2.046 | 6.498 |
| (G1+G2)/T2 | 9.595 | 5.598 | 12.854 | 7.513 | 11.23 | 6.927 | 11.5 | 7.2 | 2.136 | 6.708 |
| (T1+T2)/T1 | 1.175 | 1.372 | 1.172 | 1.167 | 1.181 | 1.187 | 1.176 | 1.329 | 1.565 | 1.159 |
| TTL/Fno | 3.326 | 3.415 | 3.345 | 3.334 | 3.205 | 3.311 | 3.266 | 2.879 | 1.686 | 3.348 |
| EFL/(T2+T3) | 16.8 | 10.89 | 16.811 | 15.29 | 17.84 | 14.76 | 18.27 | 6.731 | 7.577 | 16.98 |

FIG. 99

OPTICAL IMAGING LENS

INCORPORATION BY REFERENCE

This application claims priority from P.R.C. Patent Application No. 201610156998.3, filed on Mar. 18, 2016, the contents of which are hereby incorporated by reference in their entirety for all purposes.

TECHNICAL FIELD

The present disclosure relates to an optical imaging lens system, and particularly, relates to an optical imaging lens system having at least four lens elements.

BACKGROUND

The ever-increasing demand for smaller sized mobile devices, such as cell phones, digital cameras, tablet computer, personal digital assistant (PDA), etc. has triggered a corresponding and growing need for a smaller sized photography module, comprising elements such as an optical imaging lens system, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens system mounted therein. When reducing the size of the optical imaging lens system, however, achieving good optical characteristics may present a challenging problem.

The size of a traditional miniature telescope may be about 50 mm, and the f-number may be over 4. In light of these industry norms, these features may impose limitations installing an optical imaging lens system therein. To solve this problem, there is a need for an optical imaging lens system with good optical characteristics, large f-number, and condensed sizes. Achieving such an optical imaging lens system is not a simple task and may require the proportional reduction in size of each element therein, and may further involve other considerations, such as material nature, production difficulty, assembly yield, and so forth, each of which may be crucial to the application of the design.

SUMMARY

The present disclosure may advantageously provide for an optical imaging lens system. By controlling the convex or concave shape of the surfaces and at least three inequalities, the length of the optical imaging lens system may be shortened, and meanwhile the good optical characteristics and system functionality may be sustained. Further, the f-number of the optical imaging lens system may be increased, so that the optical imaging lens system may be adapted to be applied in a miniature telescope.

In some embodiments, an optical imaging lens system may comprise, sequentially from an object side to an image side along an optical axis, at least first, second, third, and fourth lens elements; each of the first, second, third, and fourth lens elements having refracting power, an object-side surface facing toward the object side and an image-side surface facing toward the image side and a central thickness defined along the optical axis. In some embodiments, an optional fifth lens element may be provided behind the fourth lens element.

In the specification, parameters used here are: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the central thickness of the fourth lens element, represented by T4, an air gap between the fourth lens element and the fifth lens element along the optical axis, represented by G45, the central thickness of the fifth lens element, represented by T5, a distance between the image-side surface of the fourth lens element and the object-side surface of a filtering unit along the optical axis, represented by G4F, a distance between the image-side surface of the fifth lens element and the object-side surface of a filtering unit along the optical axis, represented by G5F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, the refracting power of the first lens element, represented by n1, the refracting power of the second lens element, represented by n2, the refracting power of the third lens element, represented by n3, the refracting power of the fourth lens element, represented by n4, the refracting power of the fifth lens element, represented by n5, the refracting power of the filtering unit, represented by nf, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an effective focal length of the optical imaging lens system, represented by EFL, a distance between the object-side surface of the first lens element and an image-side surface of the fourth lens element along the optical axis, represented by TL, a distance between the object-side surface of the first lens element and an image plane along the optical axis, represented by TTL, a sum of the central thicknesses of all lens elements in the optical imaging lens system, represented by ALT, a sum of all air gaps between the lens elements along the optical axis in the optical imaging lens system, represented by Gaa, and a back focal length of the optical imaging lens system, which is defined as the distance from the image-side surface of the last lens element to the image plane along the optical axis, represented by BFL.

In an aspect of the present disclosure, in the optical imaging lens system, the object-side surface of the first lens element may comprise a convex portion in a vicinity of a periphery of the first lens element, the second lens element has negative refracting power, the object-side surface of the third lens element may comprise a concave portion in a vicinity in a vicinity of a periphery of the third lens element, and the image-side surface of the fourth lens element may comprise a convex portion in a vicinity of a periphery of the fourth lens element, wherein the optical imaging lens system satisfies three inequalities:

| | |
|---|---|
| $HFOV \leq 25°$ | Inequality (1); |
| $TTL \leq 8$ mm | Inequality (2); and |
| $TL/G23 \leq 4.5$ | Inequality (3). |

In some embodiments, other inequality(s), such as those relating to the ratio among parameters could be taken into consideration. For example:

$$Fno/(G12+G34) \leq 14.4 \quad \text{Inequality (4);}$$

$$Fno/G23 \leq 3.6 \quad \text{Inequality (5);}$$

$$Fno/(G12+G23) \leq 3.2 \quad \text{Inequality (6);}$$

$$TTL/(G23+G34) \leq 4.3 \quad \text{Inequality (7);}$$

$$(T1+T2)/(G12+G34) \leq 5.8 \quad \text{Inequality (8);}$$

$$Fno/(T1+G12+T2) \leq 2 \quad \text{Inequality (9);}$$

$$Fno/T1 \leq 3.8 \quad \text{Inequality (10);}$$

$$Fno/(T1+T2) \leq 2.2 \quad \text{Inequality (11);}$$

$$0.1 \leq G34/(T2+T3) \quad \text{Inequality (12);}$$

$$0.2 \leq (G12+G34)/(T2+T3) \quad \text{Inequality (13);}$$

$$0.4 \leq (G12+G23+G34)/Fno \quad \text{Inequality (14);}$$

$$0.4 \leq (G23+G34)/Fno \quad \text{Inequality (15);}$$

$$0.2 \leq G34/T2 \quad \text{Inequality (16);}$$

$$1.7 \leq EFL/Fno \quad \text{Inequality (17);}$$

$$1.4 \leq G23/T2 \quad \text{Inequality (18);}$$

$$1.5 \leq (G12+G23)/T2 \quad \text{Inequality (19);}$$

$$(T1+T2)/T1 \leq 1.8 \quad \text{Inequality (20);}$$

$$1.7 \leq TTL/Fno \quad \text{Inequality (21); and/or}$$

$$3.9 \leq EFL/(T2+T3) \quad \text{Inequality (22).}$$

Aforementioned embodiments are not limited and could be selectively incorporated in other embodiments described herein.

By controlling the convex or concave shape of the surfaces and at lease three inequalities, the optical imaging lens systems of the present disclosure may advantageously achieve good optical characteristics and effectively shorten the length of the optical imaging lens.

BRIEF DESCRIPTION OF THE DRAWINGS

Embodiments of the present disclosure will be more readily understood from the following detailed description when read in conjunction with the appended drawing, in which:

FIG. 1 is a cross-sectional view of one single lens element according to the present disclosure;

FIG. 2 is a cross-sectional view showing the relation between the shape of a portion and the position where a collimated ray meets the optical axis;

FIG. 3 is a cross-sectional view showing the relation between the shape of a portion and the effective radius of a first example;

FIG. 4 is a cross-sectional view showing the relation between the shape of a portion and the effective radius of a second example;

FIG. 5 is a cross-sectional view showing the relation between the shape of a portion and the effective radius of a third example;

FIG. 8 is a table of optical data for each lens element of a first embodiment of an optical imaging lens system according to the present disclosure;

FIG. 9 is a table of aspherical data of a first embodiment of the optical imaging lens system according to the present disclosure;

FIG. 12 is a table of optical data for each lens element of the optical imaging lens system of a second embodiment of the present disclosure;

FIG. 13 is a table of aspherical data of a second embodiment of the optical imaging lens system according to the present disclosure;

FIG. 16 is a table of optical data for each lens element of the optical imaging lens system of a third embodiment of the present disclosure;

FIG. 17 is a table of aspherical data of a third embodiment of the optical imaging lens system according to the present disclosure;

FIG. 20 is a table of optical data for each lens element of the optical imaging lens system of a fourth embodiment of the present disclosure;

FIG. 21 is a table of aspherical data of a fourth embodiment of the optical imaging lens system according to the present disclosure;

FIG. 24 is a table of optical data for each lens element of the optical imaging lens system of a fifth embodiment of the present disclosure;

FIG. 25 is a table of aspherical data of a fifth embodiment of the optical imaging lens system according to the present disclosure;

FIG. 28 is a table of optical data for each lens element of the optical imaging lens system of a sixth embodiment of the present disclosure;

FIG. 29 is a table of aspherical data of a sixth embodiment of the optical imaging lens system according to the present disclosure;

FIG. 32 is a table of optical data for each lens element of a seventh embodiment of an optical imaging lens system according to the present disclosure;

FIG. 33 is a table of aspherical data of a seventh embodiment of the optical imaging lens system according to the present disclosure;

FIG. 36 is a table of optical data for each lens element of the optical imaging lens system of a eighth embodiment of the present disclosure;

FIG. 37 is a table of aspherical data of a eighth embodiment of the optical imaging lens system according to the present disclosure;

FIG. 40 is a table of optical data for each lens element of the optical imaging lens system of a ninth embodiment of the present disclosure;

FIG. 41 is a table of aspherical data of a ninth embodiment of the optical imaging lens system according to the present disclosure;

FIG. 44 is a table of optical data for each lens element of the optical imaging lens system of a tenth embodiment of the present disclosure;

FIG. 45 is a table of aspherical data of a tenth embodiment of the optical imaging lens system according to the present disclosure;

FIG. 48 is a table of optical data for each lens element of the optical imaging lens system of a eleventh embodiment of the present disclosure;

FIG. 49 is a table of aspherical data of a eleventh embodiment of the optical imaging lens system according to the present disclosure;

FIG. 52 is a table of optical data for each lens element of the optical imaging lens system of a twelfth embodiment of the present disclosure;

FIG. 53 is a table of aspherical data of a twelfth embodiment of the optical imaging lens system according to the present disclosure;

FIG. 56 is a table of optical data for each lens element of the optical imaging lens system of a thirteenth embodiment of the present disclosure;

FIG. 57 is a table of aspherical data of a thirteenth embodiment of the optical imaging lens system according to the present disclosure;

FIG. 60 is a table of optical data for each lens element of the optical imaging lens system of a fourteenth embodiment of the present disclosure;

FIG. 61 is a table of aspherical data of a fourteenth embodiment of the optical imaging lens system according to the present disclosure;

FIG. 64 is a table of optical data for each lens element of the optical imaging lens system of a fifteenth embodiment of the present disclosure;

FIG. 65 is a table of aspherical data of a fifteenth embodiment of the optical imaging lens system according to the present disclosure;

FIG. 68 is a table of optical data for each lens element of the optical imaging lens system of a sixteenth embodiment of the present disclosure;

FIG. 69 is a table of aspherical data of a sixteenth embodiment of the optical imaging lens system according to the present disclosure;

FIG. 72 is a table of optical data for each lens element of the optical imaging lens system of a seventeenth embodiment of the present disclosure;

FIG. 73 is a table of aspherical data of a seventeenth embodiment of the optical imaging lens system according to the present disclosure;

FIG. 76 is a table of optical data for each lens element of the optical imaging lens system of a eighteenth embodiment of the present disclosure;

FIG. 77 is a table of aspherical data of a eighteenth embodiment of the optical imaging lens system according to the present disclosure;

FIG. 80 is a table of optical data for each lens element of the optical imaging lens system of a nineteenth embodiment of the present disclosure;

FIG. 81 is a table of aspherical data of a nineteenth embodiment of the optical imaging lens system according to the present disclosure;

FIG. 84 is a table of optical data for each lens element of the optical imaging lens system of a twentieth embodiment of the present disclosure;

FIG. 85 is a table of aspherical data of a twentieth embodiment of the optical imaging lens system according to the present disclosure;

FIG. 88 is a table of optical data for each lens element of the optical imaging lens system of a twenty-first embodiment of the present disclosure;

FIG. 89 is a table of aspherical data of a twenty-first embodiment of the optical imaging lens system according to the present disclosure;

FIG. 92 is a table of optical data for each lens element of the optical imaging lens system of a twenty-second embodiment of the present disclosure;

FIG. 93 is a table of aspherical data of a twenty-second embodiment of the optical imaging lens system according to the present disclosure;

FIG. 96 is a table of optical data for each lens element of the optical imaging lens system of a twenty-third embodiment of the present disclosure;

FIG. 97 is a table of aspherical data of a twenty-third embodiment of the optical imaging lens system according to the present disclosure;

FIG. 98A is a table for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3) of the first to seventh example embodiments;

FIG. 98B is a table for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3) of the eighth to thirteenth example embodiments;

FIG. 99 is a table for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3) of the fourteenth to twenty-third example embodiments.

DETAILED DESCRIPTION

Figure 6:
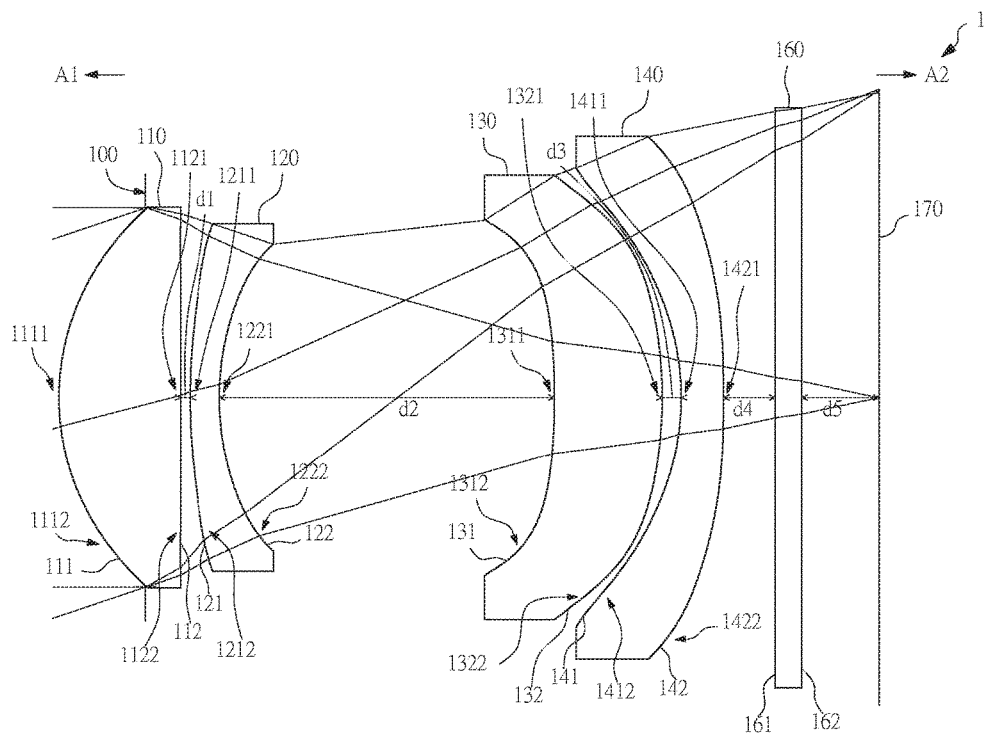
FIG. 6 is a cross-sectional view of a first embodiment of an optical imaging lens system having four lens elements according to the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those aforementioned portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

In the present disclosure, examples of an optical imaging lens system which is a prime lens are provided. Example embodiments of an optical imaging lens system may comprise at least a first lens element, a second lens element, a third lens element, and a fourth lens element, each of the lens elements may comprise refracting power, an object-side surface facing toward an object side and an image-side surface facing toward an image side and a central thickness defined along the optical axis. Some example embodiments of an optical imaging lens system may comprise a further fifth lens element behind the fourth lens element. These lens elements may be arranged sequentially from the object side to the image side along an optical axis. In an example embodiment: the object-side surface of the first lens element may comprise a convex portion in a vicinity of a periphery of the first lens element, the second lens element has negative refracting power, the object-side surface of the third lens element may comprise a concave portion in a vicinity in a vicinity of a periphery of the third lens element, and the image-side surface of the fourth lens element may comprise a convex portion in a vicinity of a periphery of the fourth lens element, wherein the optical imaging lens system satisfies three inequalities:

$$HFOV \leq 25° \quad \text{Inequality (1);}$$

$$TTL \leq 8 \text{ mm} \quad \text{Inequality (2); and}$$

$$TL/G23 \leq 4.5 \quad \text{Inequality (3).}$$

In some embodiments, the lens elements may be designed in light of the optical characteristics, the length and f-number of the optical imaging lens. For example, the convex portion in a vicinity of the optical axis formed on the object-side surface of the first lens element may assist in focusing light. Together with the negative refracting power of the second lens element, the aberration occurred in the first lens element may be adjusted effectively. The concave portion in a vicinity of the periphery of the third lens element formed on the object-side surface thereof and the convex portion in a vicinity of the periphery of the fourth lens element formed on the image-side surface thereof may assist in adjusting the image aberration occurred in the first two lens elements and promoting imaging quality effectively. Further satisfying with the Inequality (1), the light intensity of the image may be more even to promote the quality of the image effectively and reduce difficulties faced in design or manufacturing process. Satisfying with Inequality (2) may assist in shortening the length of the optical imaging lens system effectively to be utilized in a condensed electric product, and, in some embodiments, TTL may be limited to within about 1.8~8 mm. Satisfying with Inequality (3) may assist in configuring thickness of each lens element and each air gap with a proper value to avoid from excess values which may be undesirable for a thin size and extremely small values which may be undesirable for assembly process, and, in some embodiments, TL/G23 may be limited to within about 1.7~4.5. Though aforesaid designs, the length of the optical imaging lens system may be reduced and meanwhile the imaging quality of the optical imaging lens system may be ensured.

Additionally, more values of parameters may be controlled to assist in designing optical imaging lenses with good optical characters and a short length. To shorten the length of the optical imaging lens system, the thickness of the lens elements and/or the air gaps between the lens elements are required optionally for shorter distances; however, considering both the difficulty to assembly the optical imaging lens system and imaging quality, the optical imaging lens system may be better configured if it satisfies aforesaid Inequality (4)~Inequality (22). Here, Inequality (7) and Inequality (21) are designed for keeping the ratio of the focus and length of the optical imaging lens system within a proper range to avoid from extremely low ratio which may be undesirable for forming image of an object far away on the image plane and excessive high ratio which may lead to a excessive length. In some embodiments, the value of TTL/(G23+G34) may be within about 2~4.4 and TTL/Fno may be about 1.7~24.4. Inequality (10) is designed for keeping the value of T1 within a proper range as well as controlling the difficulties in the manufacturing process by limiting the aperture stop and T1, and the value of Fno/T1 may be within about 0.4~3.8. Inequality (16) is designed for keeping the value of T2 within a proper range to reduce the aberration occurred in the first lens element by limiting G34 and T2, and the value of G34/T2 may be within about 0.2~7.9. Inequality (17) is designed for increasing the imaging quality, evening the light intensity of the image, controlling the distortion of the image more easily, and/or reducing the difficulties in the design and manufacturing process by limiting the EFL and Fno, and the value of EFL/Fno may be within about 1.7~16.6. Inequality (18) is designed for keeping the value of T2 within a proper range to lower the aberration occurred in the first lens element by limiting G23 and T2, and the value of G23/T2 may be within about 1.4~11.4. Inequalities (4)~(6), (8), (9), (11)(15), (19), (20) and (22) are designed for the reason similar to that of Inequality (3): keeping the value of each length and air gap of the optical imaging lens system within a proper range to avoid from excess values which may be undesirable for a thin size and extremely small values which may be undesirable for assembly process. In some embodiments, the value of TTL/(G12+G34) may be within about 0.4~14.4, the value of Fno/G23 may be within about 0.1~3.6, the value of TTL/(G12+G23) may be within about 0.1~3.2, the value of (T1+T2)/(G12+G34) may be within about 0.6~5.8, the value of Fno/(T1+G12+T2) may be within about 0.2~2, the value of Fno/(T1+T2) may be within about 0.3~2.2, the value of G34/(T2+T3) may be within about 0.1~3.3, the value of (G12+G34)/(T2+T3) may be within about 0.2~3.4, the value of (G12+G23+G34)/Fno may be within about 0.4~6, the value of (G12+G34)/Fno may be within about 0.4~5.8, the value of (G12+G23)/T2 may be within about 1.5~12, the value of (T1+T2)/T1 may be within about 1.1~1.8, and the value of EFL/(T2+T3) may be within about 3.9~17.2.

In light of the unpredictability in an optical system, in the present disclosure, satisfying these inequalities listed above may advantageously shortening the length of the optical imaging lens system, lowering the f-number, enlarging the shot angle, promoting the imaging quality and/or increasing the yield in the assembly process.

When implementing example embodiments, more details about the convex or concave surface could be incorporated for one specific lens element or broadly for plural lens elements to enhance the control for the system performance and/or resolution, or promote the yield. For example, the image-side surface of the second lens element may further comprise a concave portion in a vicinity of the optical axis or a concave portion in a vicinity of a periphery of the second lens element. It is noted that the details listed here could be incorporated in example embodiments if no inconsistency occurs.

Figure 7:
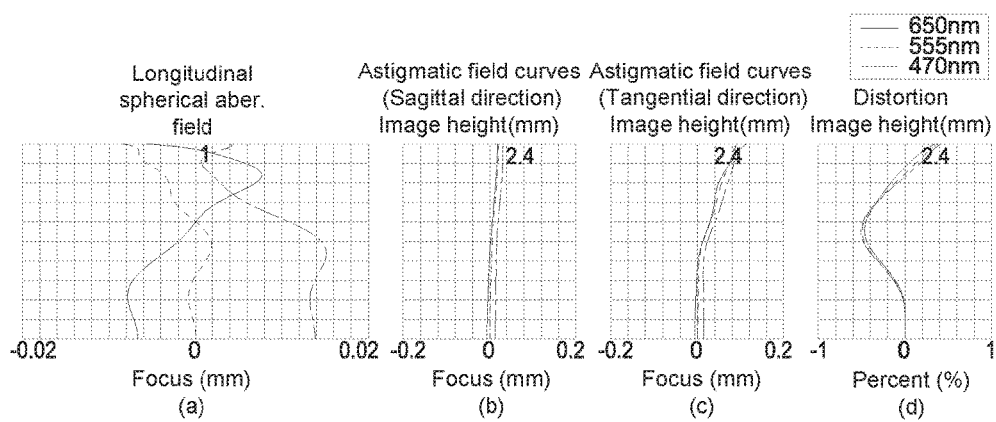
FIG. 7 is a chart of longitudinal spherical aberration and other kinds of optical aberrations of a first embodiment of the optical imaging lens system according to the present disclosure.

Several example embodiments and associated optical data will now be provided for illustrating example embodiments of optical imaging lens system with good optical characteristics, a wide view angle and a low f-number. Reference is now made to FIGS. 6-9. FIG. 6 illustrates an example cross-sectional view of an optical imaging lens system 1 according to a first example embodiment. FIG. 7 shows example charts of longitudinal spherical aberration and other kinds of optical aberrations of the optical imaging lens system 1 according to an example embodiment. FIG. 8 illustrates an example table of optical data of each lens element of the optical imaging lens system 1 according to an example embodiment, in which f is used for representing EFL. FIG. 9 depicts an example table of aspherical data of the optical imaging lens system 1 according to an example embodiment.

As shown in FIG. 6, the optical imaging lens system 1 of the present embodiment may comprise, in order from an object side A1 to an image side A2 along an optical axis, an aperture stop 100, a first lens element 110, a second lens element 120, a third lens element 130 and a fourth lens element 140. A filtering unit 160 and an image plane 170 of an image sensor are positioned at the image side A2 of the optical lens 1. Each of the first, second, third, fourth lens elements 110, 120, 130, 140 and the filtering unit 160 may comprise an object-side surface 111/121/131/141/161 facing toward the object side A1 and an image-side surface 112/122/132/142/162 facing toward the image side A2. The example embodiment of the filtering unit 160 illustrated is an IR cut filter (infrared cut filter) positioned between the fourth lens element 140 and an image plane 170. The filtering unit 160 selectively absorbs light with specific wavelength from the light passing optical imaging lens system 1. For example, IR light is absorbed, and this will prohibit the IR light which is not seen by human eyes from producing an image on the image plane 170.

Please noted that during the normal operation of the optical imaging lens system 1, the distance between any two adjacent lens elements of the first, second, third and fourth lens elements 110, 120, 130, 140 may be an unchanged value, i.e. the optical imaging lens system 1 may be a prime lens.

Some embodiments of each lens element of the optical imaging lens system 1 which may be constructed by plastic material will now be described with reference to the drawings.

An example embodiment of the first lens element 110 has positive refracting power. The object-side surface 111 may be a convex surface comprising a convex portion 1111 in a vicinity of the optical axis and a convex portion 1112 in a vicinity of a periphery of the first lens element 110. The image-side surface 112 may comprise a convex portion 1121 in a vicinity of the optical axis and a concave portion 1122 in a vicinity of the periphery of the first lens element 110.

An example embodiment of the second lens element 120 has negative refracting power. The object-side surface 121 may be a convex surface comprising a convex portion 1211 in a vicinity of the optical axis and a convex portion 1212 in a vicinity of a periphery of the second lens element 120. The image-side surface 122 may be a concave surface comprising a concave portion 1221 in a vicinity of the optical axis and a concave portion 1222 in a vicinity of the periphery of the second lens element 120.

An example embodiment of the third lens element 130 has positive refracting power. The object-side surface 131 may be a concave surface comprising a concave portion 1311 in a vicinity of the optical axis and a concave portion 1312 in a vicinity of a periphery of the third lens element 130. The image-side surface 132 may be a convex surface comprising a convex portion 1321 in a vicinity of the optical axis and a convex portion 1322 in a vicinity of the periphery of the third lens element 130.

An example embodiment of the fourth lens element 140 has negative refracting power. The object-side surface 141 may be a concave surface comprising a concave portion 1411 in a vicinity of the optical axis and a concave portion 1412 in a vicinity of a periphery of the fourth lens element 140. The image-side surface 142 may be a convex surface comprising a convex portion 1421 in a vicinity of the optical axis and a convex portion 1422 in a vicinity of the periphery of the fourth lens element 140.

In example embodiments, air gaps exist between the lens elements 110, 120, 130, 140, the filtering unit 160 and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the filtering unit 160 and the air gap d5 existing between the filtering unit 160 and the image plane 170 of the image sensor. However, in other embodiments, any of the aforementioned air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, and the sum of d1, d2 and d3 is denoted by Gaa.

FIG. 8 depicts the optical characteristics of each lens elements in the optical imaging lens system 1 of the present embodiment, and please refer to FIG. 9 8A for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3) the present embodiment. The distance from the object-side surface 111 of the first lens element 110 to the image plane 170 along the optical axis may be about 6.380 mm, the effective focal length (EFL) may be about 7.070 mm, image height may be about 2.400 mm, half field of view angle (HFOV) may be about 18.684, and f-number (Fno) may be about 2.390. Thus, the optical imaging lens system 1 may be about capable of providing excellent imaging quality for smaller sized mobile devices.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, are all defined by the following aspherical formula:

$$Z(Y) = \frac{Y^2}{R} / \left(1 + \sqrt{1-(1+K)\frac{Y^2}{R^2}}\right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and $a_i$ represents an aspherical coefficient of $i^{th}$ level. The values of each aspherical parameter are shown in FIG. 9.

Please refer to FIG. 7(a), longitudinal spherical aberration of the optical imaging lens system in the present embodiment is shown in the coordinate in which the horizontal axis represents focus and the vertical axis represents field of view, and FIG. 7(b), astigmatism aberration of the optical imaging lens system in the present embodiment in the sagittal direction is shown in the coordinate in which the horizontal axis represents focus and the vertical axis represents image height, and FIG. 7(c), astigmatism aberration in the tangential direction of the optical imaging lens system in the present embodiment is shown in the coordinate in which the horizontal axis represents focus and the vertical axis represents image height, and FIG. 7(d), distortion aberration of the optical imaging lens system in the present embodiment is shown in the coordinate in which the horizontal axis represents percentage and the vertical axis represents image height. From the vertical deviation of each curve shown therein, the offset of the off-axis light relative to the image point may be within about ±0.016 mm. Therefore, the present embodiment improves the longitudinal spherical aberration with respect to different wavelengths. For astigmatism aberration in the sagittal direction, the focus variation with respect to the three wavelengths in the whole field falls within ±0.04 mm, for astigmatism aberration in the tangential direction, the focus variation with respect to the three wavelengths in the whole field falls within ±0.12 mm, and the variation of the distortion aberration may be within about ±1%.

According to the value of the aberrations, it is shown that the optical imaging lens system 1 of the present embodiment, with the length as short as about 6.380 mm and Fno as low as about 2.390, may be capable of providing good imaging quality as well as good optical characteristics for a miniature telescope.

Figure 10:
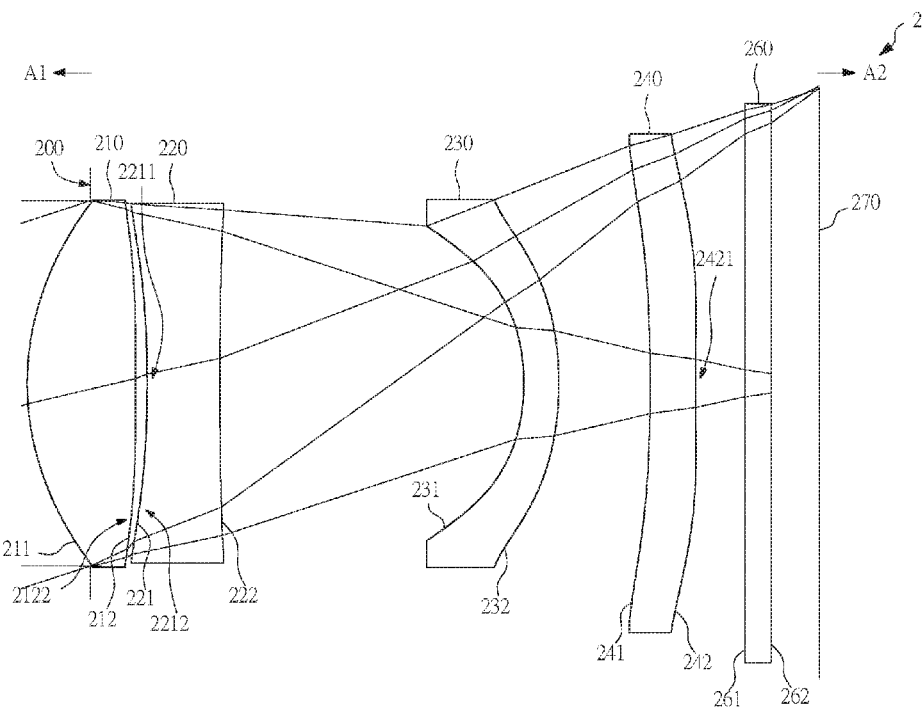
FIG. 10 is a cross-sectional view of a second embodiment of an optical imaging lens system having four lens elements according to the present disclosure.
Figure 11:
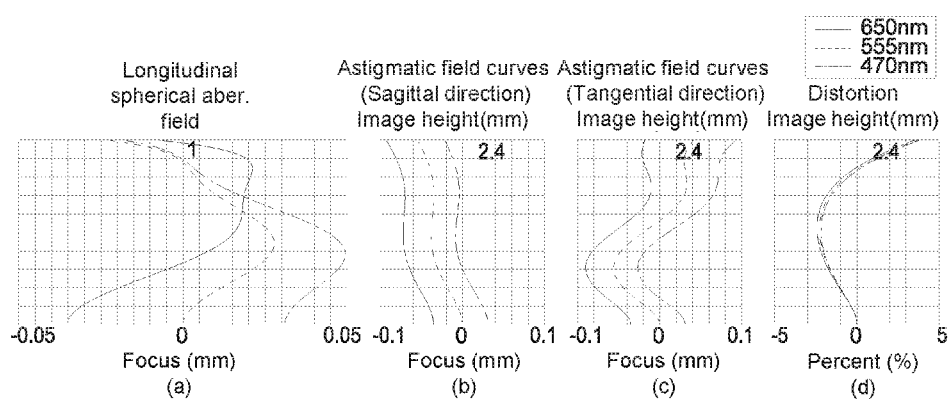
FIG. 11 is a chart of longitudinal spherical aberration and other kinds of optical aberrations of a second embodiment of the optical imaging lens system according to the present disclosure.

Reference is now made to FIGS. 10-13. FIG. 10 illustrates an example cross-sectional view of an optical imaging lens system 2 having four lens elements of the optical imaging lens system according to a second example embodiment. FIG. 11 shows example charts of longitudinal spherical aberration and other kinds of optical aberrations of the optical imaging lens system 2 according to the second example embodiment. FIG. 12 shows an example table of optical data of each lens element of the optical imaging lens system 2 according to the second example embodiment. FIG. 13 shows an example table of aspherical data of the optical imaging lens system 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens system 2 of the present embodiment, in an order from an object side A1 to an image side A2 along an optical axis, may comprise an aperture stop 200, a first lens element 210, a second lens element 220, a third lens element 230 and a fourth lens element 240.

The differences between the second embodiment and the first embodiment are the radius of curvature, thickness of each lens element, the distance of each air gap, aspherical data, related optical parameters, such as back focal length, and the configuration of the concave/convex shape of the object-side surface 221 and the image-side surfaces 212, 242, but the configuration of the concave/convex shape of surfaces, comprising the object-side surfaces 211, 231, 241 facing to the object side A1 and the image-side surfaces 222, 232 facing to the image side A2, are similar to those in the first embodiment. Here, for clearly showing the drawings of the present embodiment, only the surface shapes which are different from that in the first embodiment are labeled. Specifically, the image-side surface 212 may be a convex surface comprising a convex portion 2122 in a vicinity of a periphery of the first lens element 210, the object-side surface 221 may be a concave surface comprising a concave portion 2211 in a vicinity of the optical axis and a concave portion 2212 in a vicinity of a periphery of the second lens element 220, the third lens element 230 has negative refracting power, and the image-side surface 242 may comprise a concave portion 2421 in a vicinity of the optical axis.

Please refer to FIG. 12 for the optical data of each lens element, FIG. 13 for the aspherical data in the optical imaging lens system 2, and FIG. 98A for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 211 of the first lens element 210 to the image plane 270 along the optical axis may be about 6.384 mm, EFL may be about 7.070 mm, the image height may be about 2.400 mm, HFOV may be about 18.125, and Fno may be about 2.369. Compared with the first embodiment, here the HFOV may be greater and Fno may be lower.

As the longitudinal spherical aberration shown in FIG. 11(a), the offset of the off-axis light relative to the image point may be within about ±0.05 mm. As the astigmatism aberration in the sagittal direction shown in FIG. 11(b), the focus variation with respect to the three wavelengths in the whole field falls within ±0.1 mm. As the astigmatism aberration in the tangential direction shown in FIG. 11(c), the focus variation with respect to the three wavelengths in the whole field falls within ±0.1 mm. As shown in FIG. 11(d), the variation of the distortion aberration may be within about ±4%. Compared with the first embodiment, the astigmatism aberration in the tangential direction may be less. According to the value of the aberrations, it is shown that the optical imaging lens system 2 of the present embodiment, with the length as short as about 6.384 mm and Fno as low as about 2.369, may be capable of providing good imaging quality as well as good optical characteristics.

Figure 14:
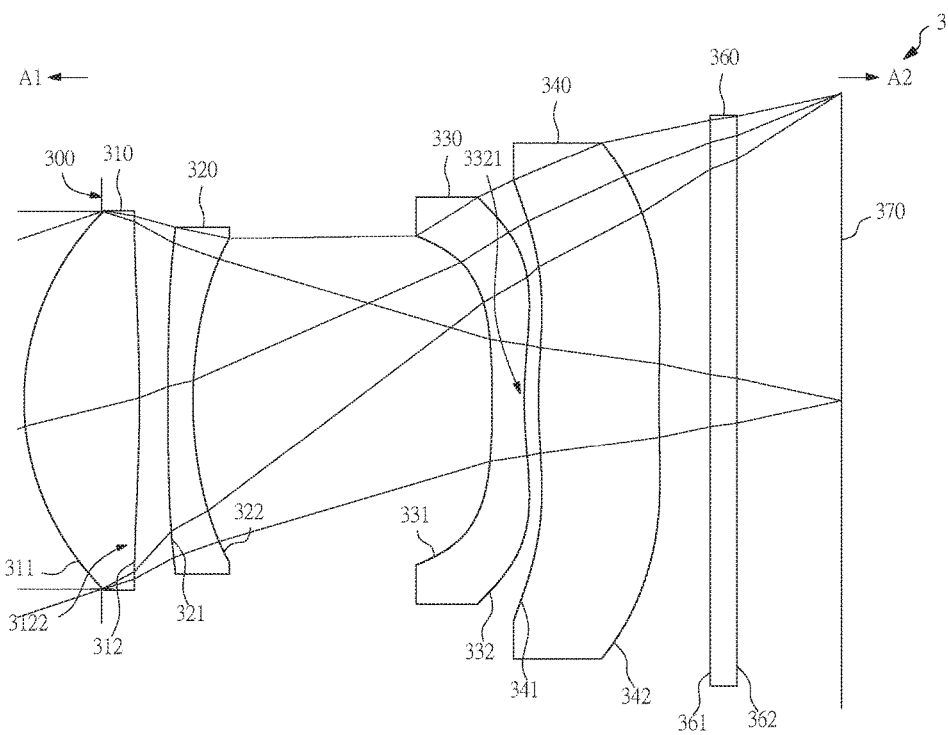
FIG. 14 is a cross-sectional view of a third embodiment of an optical imaging lens system having four lens elements according to the present disclosure.
Figure 15:
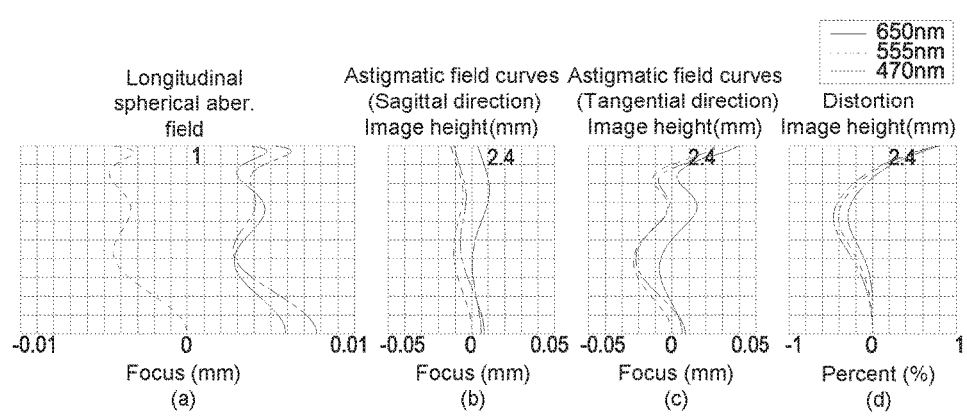
FIG. 15 is a chart of longitudinal spherical aberration and other kinds of optical aberrations of a third embodiment of the optical imaging lens system according the present disclosure.

Reference is now made to FIGS. 14-17. FIG. 14 illustrates an example cross-sectional view of an optical imaging lens system 3 having four lens elements of the optical imaging lens system according to a third example embodiment. FIG. 15 shows example charts of longitudinal spherical aberration and other kinds of optical aberrations of the optical imaging lens system 3 according to the third example embodiment. FIG. 16 shows an example table of optical data of each lens element of the optical imaging lens system 3 according to the third example embodiment. FIG. 17 shows an example table of aspherical data of the optical imaging lens system 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens system 3 of the present embodiment, in an order from an object side A1 to an image side A2 along an optical axis, may comprise an aperture stop 300, a first lens element 310, a second lens element 320, a third lens element 330 and a fourth lens element 340.

The differences between the present embodiment and the first embodiment are the radius of curvature, thickness of each lens element, the distance of each air gap, aspherical data, related optical parameters, such as back focal length, and the configuration of the concave/convex shape of the image-side surfaces 312, 332, but the configuration of the concave/convex shape of surfaces, comprising the object-side surfaces 311, 321, 331, 341 facing to the object side A1 and the image-side surfaces 322, 342 facing to the image side A2, are similar to those in the first embodiment. Here, for clearly showing the drawings of the present embodiment, only the surface shapes which are different from that in the first embodiment are labeled. Specifically, the image-side surface 312 may be a convex surface comprising a convex portion 3122 in a vicinity of a periphery of the first lens element 310, the third lens element 330 has negative refracting power, the image-side surface 332 may comprise a concave portion 3321 in a vicinity of the optical axis, and the forth lens element 340 has positive refracting power.

Please refer to FIG. 16 for the optical data of each lens element, FIG. 17 for the aspherical data in the optical imaging lens system 3, and FIG. 98A for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 311 of the first lens element 310 to the image plane 370 along the optical axis may be about 6.382 mm, EFL may be about 7.069 mm, the image height may be about 2.400 mm, HFOV may be about 18.617, and Fno may be about 2.389. Compared with the first embodiment, here the EFL may be shorter and Fno may be higher.

As the longitudinal spherical aberration shown in FIG. 15(a), the offset of the off-axis light relative to the image point may be within about ±0.008 mm. As the astigmatism aberration in the sagittal direction shown in FIG. 15(b), the focus variation with respect to the three wavelengths in the whole field falls within ±0.03 mm. As the astigmatism aberration in the tangential direction shown in FIG. 15(c), the focus variation with respect to the three wavelengths in the whole field may fall within about ±0.05 mm. As shown in FIG. 15(d), the variation of the distortion aberration may be within about ±1%. Compared with the first embodiment, the longitudinal spherical aberration and astigmatism aberration are less. According to the value of the aberrations, it is shown that the optical imaging lens system 3 of the present embodiment, with the length as short as about 6.382 mm and Fno as low as about 2.389, may be capable of providing good imaging quality as well as good optical characteristics.

Figure 18:
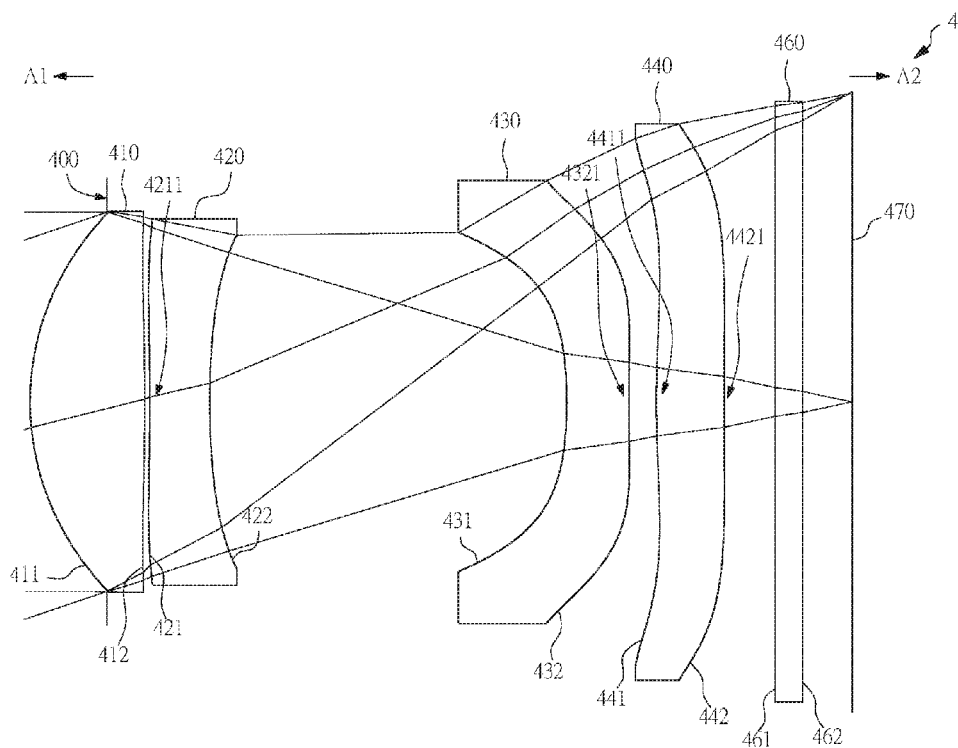
FIG. 18 is a cross-sectional view of a fourth embodiment of an optical imaging lens system having four lens elements according to the present disclosure.
Figure 19:
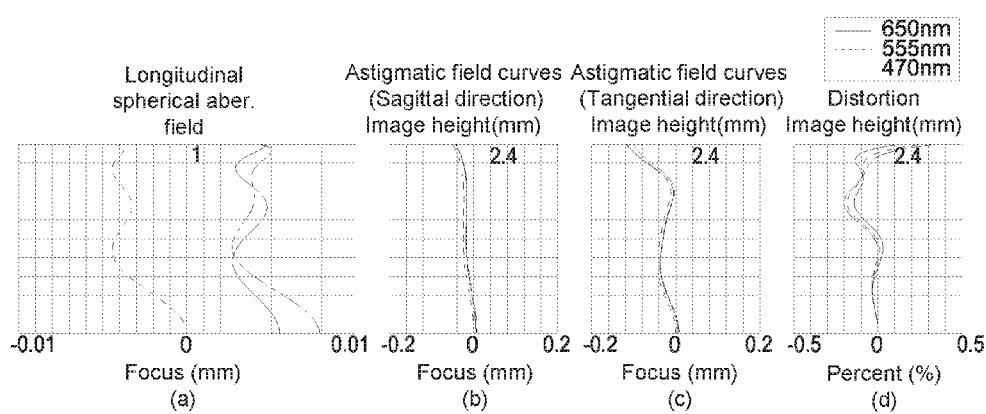
FIG. 19 is a chart of longitudinal spherical aberration and other kinds of optical aberrations of a fourth embodiment of the optical imaging lens system according the present disclosure.

Reference is now made to FIGS. 18-21. FIG. 18 illustrates an example cross-sectional view of an optical imaging lens system 4 having four lens elements of the optical imaging lens system according to a fourth example embodiment. FIG. 19 shows example charts of longitudinal spherical aberration and other kinds of optical aberrations of the optical imaging lens system 4 according to the fourth example embodiment. FIG. 20 shows an example table of optical data of each lens element of the optical imaging lens system 4 according to the fourth example embodiment. FIG. 21 shows an example table of aspherical data of the optical imaging lens system 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens system 4 of the present embodiment, in an order from an object side A1 to an image side A2 along an optical axis, may comprise an aperture stop 400, a first lens element 410, a second lens element 420, a third lens element 430 and a fourth lens element 440.

The differences between the present embodiment and the first embodiment are the radius of curvature, thickness of each lens element, the distance of each air gap, aspherical data, related optical parameters, such as back focal length, and the configuration of the concave/convex shape of the object-side surfaces 421, 441, and the image-side surfaces 432, 442, but the configuration of the concave/convex shape of surfaces, comprising the object-side surfaces 411, 431 facing to the object side A1 and the image-side surfaces 412, 422 facing to the image side A2, are similar to those in the first embodiment. Here, for clearly showing the drawings of the present embodiment, only the surface shapes which are different from that in the first embodiment are labeled. Specifically, the object-side surface 421 may comprise a concave portion 4211 in a vicinity of the optical axis, the third lens element 430 has negative refracting power, the image-side surface 432 may comprise a concave portion 4321 in a vicinity of the optical axis, the fourth lens element 440 has negative refracting power, the object-side surface 441 may comprise a convex portion 4411 in a vicinity of the optical axis, and the image-side surface 442 may comprise a concave portion 4421 in a vicinity of the optical axis.

Please refer to FIG. 20 for the optical data of each lens element, FIG. 21 for the aspherical data in the optical imaging lens system 4, and FIG. 98A for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 411 of the first lens element 410 to the image plane 470 along the optical axis may be about 6.387 mm, EFL may be about 7.066 mm, the image height may be about 2.400 mm, HFOV may be about 18.715, and Fno may be about 2.383. Compared with the first embodiment, here the EFL may be shorter, HFOV may be greater and Fno may be lower.

As the longitudinal spherical aberration shown in FIG. 19(a), the offset of the off-axis light relative to the image point may be within about ±0.008 mm. As the astigmatism aberration in the sagittal direction shown in FIG. 19(b), the focus variation with respect to the three wavelengths in the whole field may fall within about ±0.06 mm. As the astigmatism aberration in the tangential direction shown in FIG. 19(c), the focus variation with respect to the three wavelengths in the whole field may fall within about ±0.12 mm. As shown in FIG. 19(d), the variation of the distortion aberration may fall within about ±0.5%. Compared with the first embodiment, the longitudinal spherical aberration and astigmatism aberration may be less. According to the value of the aberrations, it is shown that the optical imaging lens system 4 of the present embodiment, with the length as short as about 6.387 mm and Fno as low as about 2.383, may be capable of providing good imaging quality as well as good optical characteristics.

Figure 22:
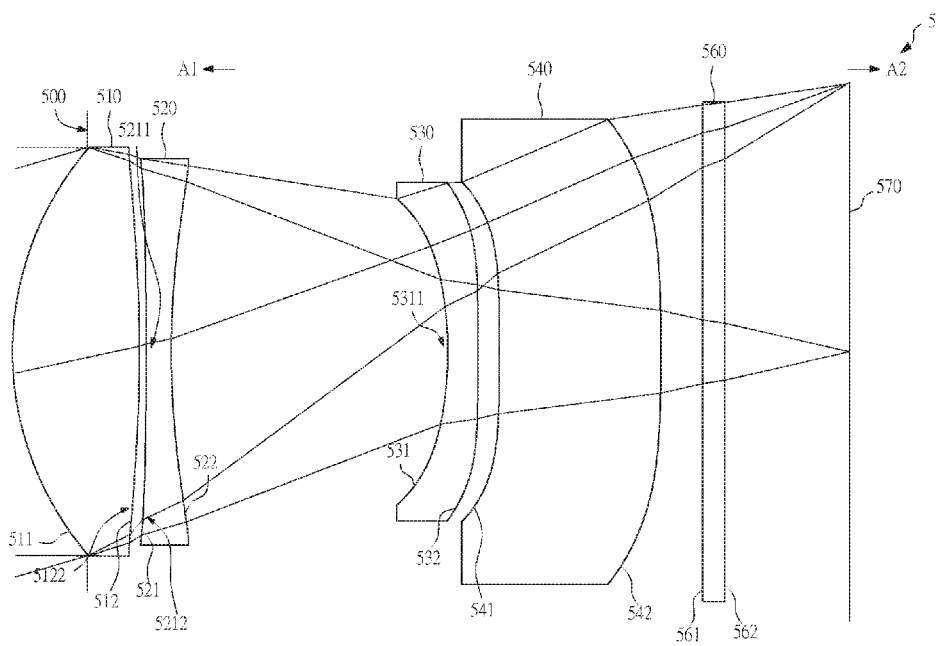
FIG. 22 is a cross-sectional view of a fifth embodiment of an optical imaging lens system having four lens elements according to the present disclosure.
Figure 23:
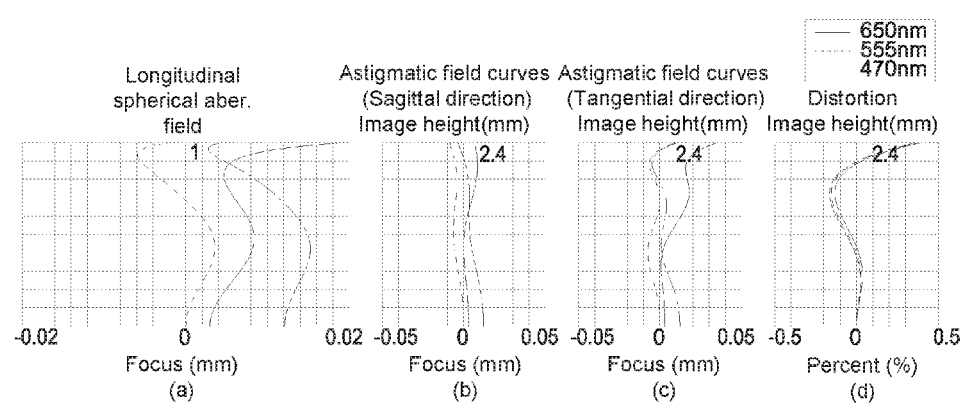
FIG. 23 is a chart of longitudinal spherical aberration and other kinds of optical aberrations of a fifth embodiment of the optical imaging lens system according the present disclosure.

Reference is now made to FIGS. 22-25. FIG. 22 illustrates an example cross-sectional view of an optical imaging lens system 5 having four lens elements of the optical imaging lens system according to a fifth example embodiment. FIG. 23 shows example charts of longitudinal spherical aberration and other kinds of optical aberrations of the optical imaging lens system 5 according to the fifth example embodiment. FIG. 24 shows an example table of optical data of each lens element of the optical imaging lens system 5 according to the fifth example embodiment. FIG. 25 shows an example table of aspherical data of the optical imaging lens system 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens system 5 of the present embodiment, in an order from an object side A1 to an image side A2 along an optical axis, may comprise an aperture stop 500, a first lens element 510, a second lens element 520, a third lens element 530 and a fourth lens element 540.

The differences between the present embodiment and the first embodiment are the radius of curvature, thickness of each lens element, the distance of each air gap, aspherical data, related optical parameters, such as back focal length, and the configuration of the concave/convex shape of the object-side surfaces 521, 531, and the image-side surfaces 512, but the configuration of the concave/convex shape of surfaces, comprising the object-side surfaces 511, 541 facing to the object side A1 and the image-side surfaces 522, 532, 542 facing to the image side A2, are similar to those in the first embodiment. Here, for clearly showing the drawings of the present embodiment, only the surface shapes which are different from that in the first embodiment are labeled. Specifically, the image-side surface 512 may be a convex surface comprising a convex portion 5122 in a vicinity of a periphery of the first lens element 510, the object-side surface 521 may be a concave surface comprising a concave portion 5211 in a vicinity of the optical axis and a concave portion 5212 in a vicinity of a periphery of the second lens element 520, the third lens element 530 may have negative refracting power, the object-side surface 531 may be a concave surface comprising a concave portion 5311 in a vicinity of the optical axis, and the fourth lens element 540 may have positive refracting power.

Please refer to FIG. 24 for the optical data of each lens element, FIG. 25 for the aspherical data in the optical imaging lens system 5, and FIG. 98A for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 511 of the first lens element 510 to the image plane 570 along the optical axis may be about 8.000 mm, EFL may be about 8.732 mm, the image height may be about 2.400 mm, HFOV may be about 15.313, and Fno may be about 2.397. Compared with the first embodiment, the optical imaging lens system 5 may be easier to manufacture.

As the longitudinal spherical aberration shown in FIG. 23(a), the offset of the off-axis light relative to the image point may be within about ±0.02 mm. As the astigmatism aberration in the sagittal direction shown in FIG. 23(b), the focus variation with respect to the three wavelengths in the whole field falls within ±0.01 mm. As the astigmatism aberration in the tangential direction shown in FIG. 23(c), the focus variation with respect to the three wavelengths in the whole field falls within ±0.04 mm. As shown in FIG. 23(d), the variation of the distortion aberration may be within about ±0.5%. Compared with the first embodiment, the astigmatism aberration and distortion aberration are less. According to the value of the aberrations, it is shown that the optical imaging lens system 5 of the present embodiment, with the length as short as about 8.000 mm and Fno as low as about 2.397, may be capable of providing good imaging quality as well as good optical characteristics.

Figure 26:
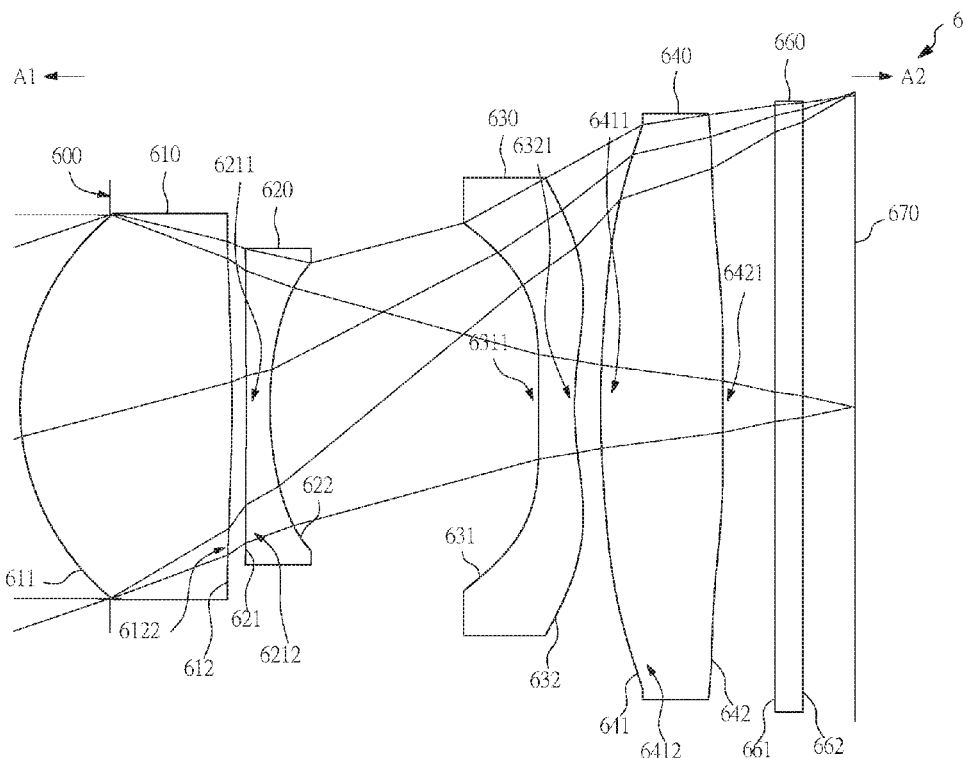
FIG. 26 is a cross-sectional view of a sixth embodiment of an optical imaging lens system having four lens elements according to the present disclosure.
Figure 27:
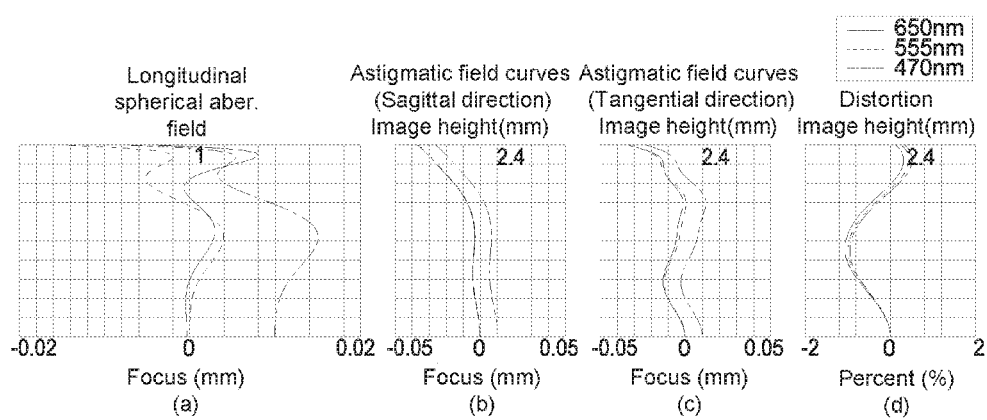
FIG. 27 is a chart of longitudinal spherical aberration and other kinds of optical aberrations of a sixth embodiment of the optical imaging lens system according the present disclosure.

Reference is now made to FIGS. 26-29. FIG. 26 illustrates an example cross-sectional view of an optical imaging lens system 6 having four lens elements of the optical imaging lens system according to a sixth example embodiment. FIG. 27 shows example charts of longitudinal spherical aberration and other kinds of optical aberrations of the optical imaging lens system 6 according to the sixth example embodiment. FIG. 28 shows an example table of optical data of each lens element of the optical imaging lens system 6 according to the sixth example embodiment. FIG. 29 shows an example table of aspherical data of the optical imaging lens system 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens system 6 of the present embodiment, in an order from an object side A1 to an image side A2 along an optical axis, may comprise an aperture stop 600, a first lens element 610, a second lens element 620, a third lens element 630 and a fourth lens element 640.

The differences between the present embodiment and the first embodiment are the radius of curvature, thickness of each lens element, the distance of each air gap, aspherical data, related optical parameters, such as back focal length, and the configuration of the concave/convex shape of the object-side surfaces 611, and the image-side surfaces 622, but the configuration of the concave/convex shape of surfaces, comprising the object-side surfaces 621, 631, 641 facing to the object side A1 and the image-side surfaces 612, 632, 642 facing to the image side A2, are similar to those in the first embodiment. Here, for clearly showing the drawings of the present embodiment, only the surface shapes which are different from that in the first embodiment are labeled. Specifically, the image-side surface 612 may be a convex surface comprising a convex portion 6122 in a vicinity of a periphery of the first lens element 610, the object-side surface 621 may be a concave surface comprising a concave portion 6211 in a vicinity of the optical axis and a concave portion 6212 in a vicinity of a periphery of the second lens element 620, the third lens element 630 has negative refracting power, the object-side surface 631 may comprise a convex portion 6311 in a vicinity of the optical axis, the image-side surface 632 may comprise a concave portion 6321 in a vicinity of the optical axis, the fourth lens element 640 has positive refracting power, the object-side surface 641 may be a convex surface comprising a convex portion 6411 in a vicinity of the optical axis and a convex portion 6412 in a vicinity of a periphery of the fourth lens element 640, and the image-side surface 642 may comprise a concave portion 6421 in a vicinity of the optical axis.

Please refer to FIG. 28 for the optical data of each lens element, FIG. 29 for the aspherical data in the optical imaging lens system 6, and FIG. 98A for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 611 of the first lens element 610 to the image plane 670 along the optical axis may be about 6.381 mm, EFL may be about 7.042 mm, the image height may be about 2.400 mm, HFOV may be about 18.773, and Fno may be about 2.386. Compared with the first embodiment, here the HFOV may be greater and Fno may be lower.

As the longitudinal spherical aberration shown in FIG. 27(a), the offset of the off-axis light relative to the image point may be within about ±0.016 mm. As the astigmatism aberration in the sagittal direction shown in FIG. 27(b), the focus variation with respect to the three wavelengths in the whole field may fall within about ±0.03 mm. As the astigmatism aberration in the tangential direction shown in FIG. 27(c), the focus variation with respect to the three wavelengths in the whole field may fall within about ±0.04 mm. As shown in FIG. 27(d), the variation of the distortion aberration may be within about ±1.2%. Compared with the first embodiment, the astigmatism aberration may be less. According to the value of the aberrations, it is shown that the optical imaging lens system 6 of the present embodiment, with the length as short as about 6.381 mm and Fno as low as about 2.386, may be capable of providing good imaging quality as well as good optical characteristics.

Figure 30:
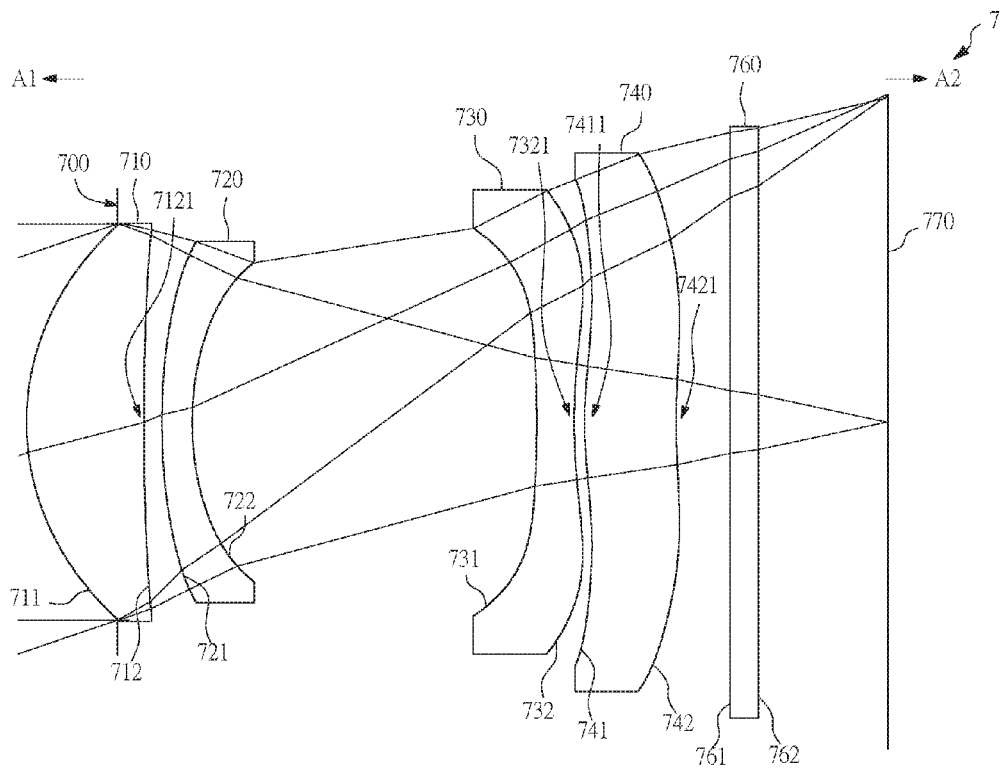
FIG. 30 is a cross-sectional view of a seventh embodiment of an optical imaging lens system having four lens elements according to the present disclosure.
Figure 31:
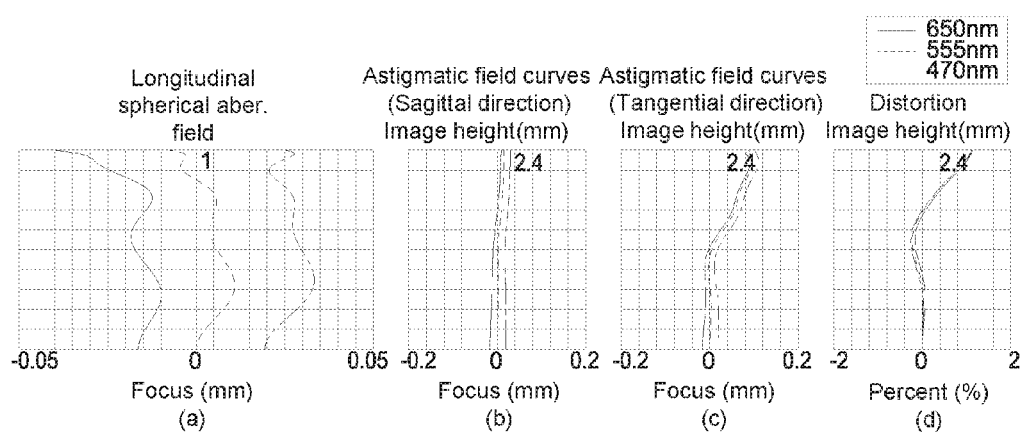
FIG. 31 is a chart of longitudinal spherical aberration and other kinds of optical aberrations of a seventh embodiment of the optical imaging lens system according to the present disclosure.

Reference is now made to FIGS. 30-33. FIG. 30 illustrates an example cross-sectional view of an optical imaging lens system 7 having four lens elements of the optical imaging lens system according to a seventh example embodiment. FIG. 31 shows example charts of longitudinal spherical aberration and other kinds of optical aberrations of the optical imaging lens system 7 according to the seventh example embodiment. FIG. 32 shows an example table of optical data of each lens element of the optical imaging lens system 7 according to the seventh example embodiment. FIG. 33 shows an example table of aspherical data of the optical imaging lens system 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens system 7 of the present embodiment, in an order from an object side A1 to an image side A2 along an optical axis, may comprise an aperture stop 700, a first lens element 710, a second lens element 720, a third lens element 730 and a fourth lens element 740.

The differences between the present embodiment and the first embodiment are the radius of curvature, thickness of each lens element, the distance of each air gap, aspherical data, related optical parameters, such as back focal length, and the configuration of the concave/convex shape of the object-side surfaces 711, 721, 731, and the image-side surfaces 722, but the configuration of the concave/convex shape of surfaces, comprising the object-side surface 741 facing to the object side A1 and the image-side surfaces 712, 732, 742 facing to the image side A2, are similar to those in the first embodiment. Here, for clearly showing the drawings of the present embodiment, only the surface shapes which are different from that in the first embodiment are labeled. Specifically, the image-side surface 712 may be a concave surface comprising a concave portion 7121 in a vicinity of the optical axis, the third lens element 730 has negative refracting power, the image-side surface 732 may comprise a concave portion 7321 in a vicinity of the optical axis, the fourth lens element 740 has positive refracting power, the object-side surface 741 may comprise a convex portion 7411 in a vicinity of the optical axis, and the image-side surface 742 may comprise a concave portion 7421 in a vicinity of the optical axis.

Please refer to FIG. 32 for the optical data of each lens element, FIG. 33 for the aspherical data in the optical imaging lens system 7, and FIG. 98A for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 711 of the first lens element 710 to the image plane 770 along the optical axis may be about 6.368 mm, EFL may be about 7.042 mm, the image height may be about 2.400 mm, HFOV may be about 18.629, and Fno may be about 2.393. Compared with the first embodiment, here both the length and EFL are shorter.

As the longitudinal spherical aberration shown in FIG. 31(a), the offset of the off-axis light relative to the image point may be within about ±0.05 mm. As the astigmatism aberration in the sagittal direction shown in FIG. 31(b), the focus variation with respect to the three wavelengths in the whole field falls within ±0.04 mm. As the astigmatism aberration in the tangential direction shown in FIG. 31(c), the focus variation with respect to the three wavelengths in the whole field may fall within about ±0.12 mm. As shown in FIG. 31(d), the variation of the distortion aberration may be within about ±1.2%. Compared with the first embodiment, the astigmatism aberration may be less. According to the value of the aberrations, it is shown that the optical imaging lens system 7 of the present embodiment, with the length as short may be about 6.368 mm and Fno as low as about 2.393, may be capable of providing good imaging quality as well as good optical characteristics.

Figure 34:
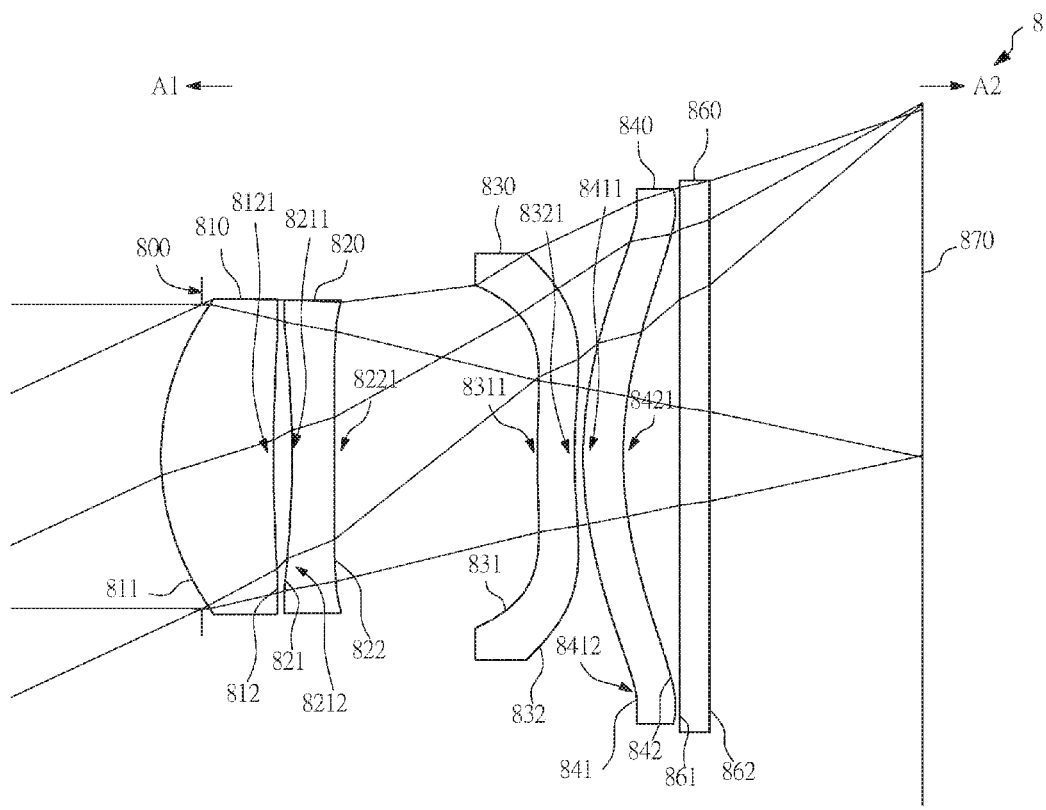
FIG. 34 is a cross-sectional view of a eighth embodiment of an optical imaging lens system having four lens elements according to the present disclosure.
Figure 35:
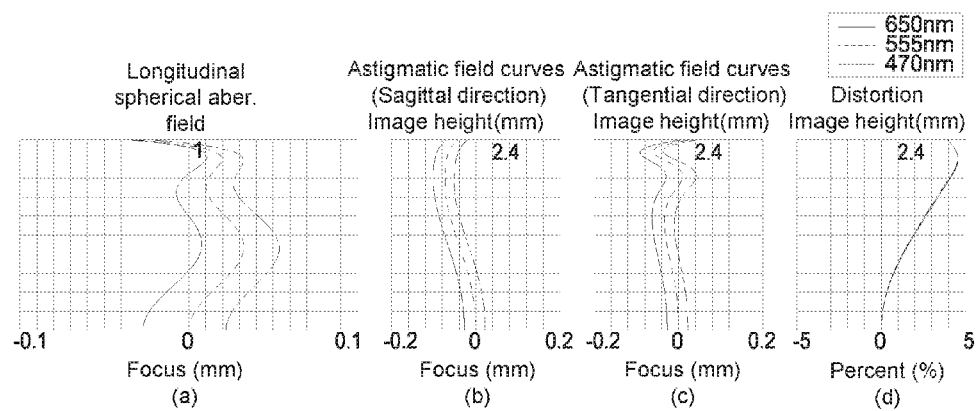
FIG. 35 is a chart of longitudinal spherical aberration and other kinds of optical aberrations of a eighth embodiment of the optical imaging lens system according to the present disclosure.

Reference is now made to FIGS. 34-37. FIG. 34 illustrates an example cross-sectional view of an optical imaging lens system 8 having four lens elements of the optical imaging lens system according to a eighth example embodiment. FIG. 35 shows example charts of longitudinal spherical aberration and other kinds of optical aberrations of the optical imaging lens system 8 according to the eighth example embodiment. FIG. 36 shows an example table of optical data of each lens element of the optical imaging lens system 8 according to the eighth example embodiment. FIG. 37 shows an example table of aspherical data of the optical imaging lens system 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens system 8 of the present embodiment, in an order from an object side A1 to an image side A2 along an optical axis, may comprise an aperture stop 800, a first lens element 810, a second lens element 820, a third lens element 830 and a fourth lens element 840.

The differences between the present embodiment and the first embodiment are the radius of curvature, thickness of each lens element, the distance of each air gap, aspherical data, related optical parameters, such as back focal length, and the configuration of the concave/convex shape of the object-side surface 811, but the configuration of the concave/convex shape of surfaces, comprising the object-side surfaces 821, 831, 841 facing to the object side A1 and the image-side surfaces 812, 822, 832, 842 facing to the image side A2, are similar to those in the first embodiment. Here, for clearly showing the drawings of the present embodiment, only the surface shapes which are different from that in the first embodiment are labeled. Specifically, the image-side surface 812 may be a concave surface comprising a concave portion 8121 in a vicinity of the optical axis, the object-side surface 821 may be a concave surface comprising a concave portion 8211 in a vicinity of the optical axis and a concave portion 8212 in a vicinity of a periphery of the second lens element 820, the image-side surface 822 may comprise a convex portion 8221 in a vicinity of the optical axis, the third lens element 830 has negative refracting power, the object-side surface 831 may comprise a convex portion 8311 in a vicinity of the optical axis, the image-side surface 832 may comprise a concave portion 8321 in a vicinity of the optical axis, the fourth lens element 840 has positive refracting power, the object-side surface 841 may be a convex surface comprising a convex portion 8411 in a vicinity of the optical axis and a convex portion 8412 in a vicinity of a periphery of the fourth lens element 840, and the image-side surface 842 may comprise a concave portion 8421 in a vicinity of the optical axis.

Please refer to FIG. 36 for the optical data of each lens element, FIG. 37 for the aspherical data in the optical imaging lens system 8, and FIG. 98B for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 811 of the first lens element 810 to the image plane 870 along the optical axis may be about 5.370 mm, EFL may be about 5.149 mm, the image height may be about 2.400 mm, HFOV may be about 24.073, and Fno may be about 2.385. Compared with the first embodiment, here both the length and EFL are shorter, HFOV may be greater, and Fno may be lower.

As the longitudinal spherical aberration shown in FIG. 35(a), the offset of the off-axis light relative to the image point may be within about ±0.06 mm. As the astigmatism aberration in the sagittal direction shown in FIG. 35(b), the focus variation with respect to the three wavelengths in the whole field falls within ±0.12 mm. As the astigmatism aberration in the tangential direction shown in FIG. 35(c), the focus variation with respect to the three wavelengths in the whole field falls within ±0.1 mm. As shown in FIG. 35(d), the variation of the distortion aberration may be within about ±5%. Compared with the first embodiment, the astigmatism aberration in the tangential direction may be less. According to the value of the aberrations, it is shown that the optical imaging lens system 8 of the present embodiment, with the length as short as about 5.370 mm and Fno as low as about 2.385, may be capable of providing good imaging quality as well as good optical characteristics.

Figure 38:
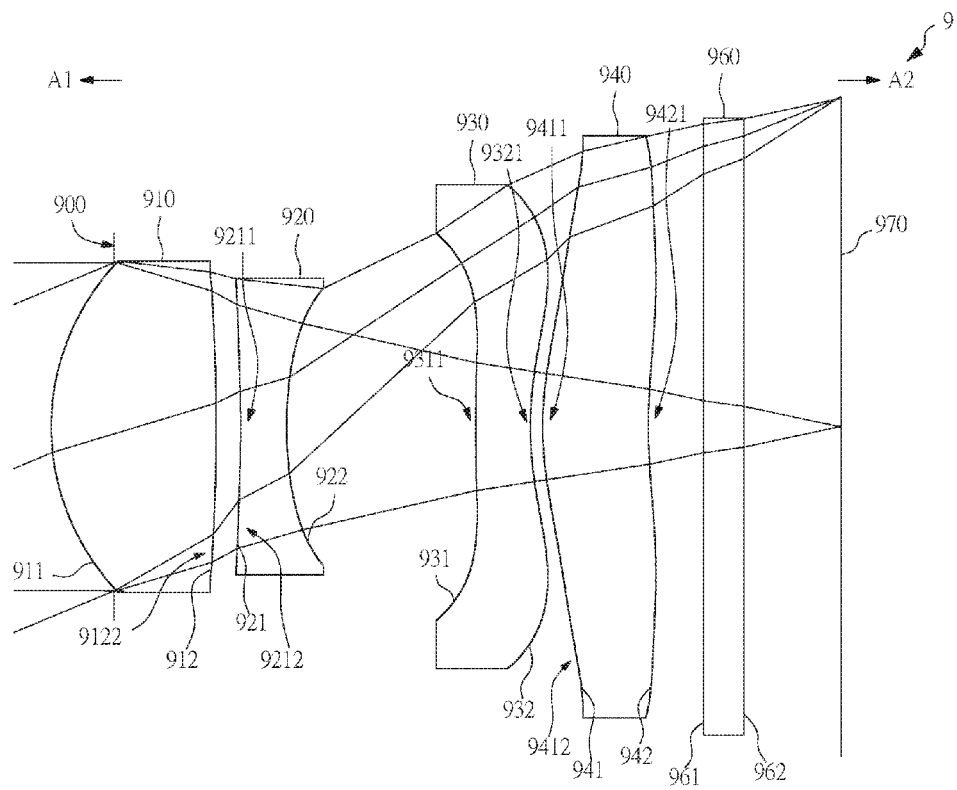
FIG. 38 is a cross-sectional view of a ninth embodiment of an optical imaging lens system having four lens elements according to the present disclosure.
Figure 39:
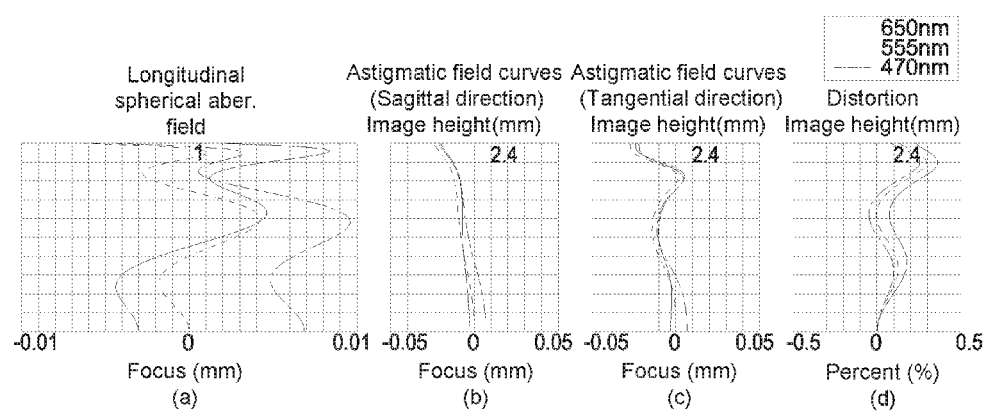
FIG. 39 is a chart of longitudinal spherical aberration and other kinds of optical aberrations of a ninth embodiment of the optical imaging lens system according to the present disclosure.

Reference is now made to FIGS. 38-41. FIG. 38 illustrates an example cross-sectional view of an optical imaging lens system 9 having four lens elements of the optical imaging lens system according to a ninth example embodiment. FIG. 39 shows example charts of longitudinal spherical aberration and other kinds of optical aberrations of the optical imaging lens system 9 according to the ninth example embodiment. FIG. 40 shows an example table of optical data of each lens element of the optical imaging lens system 9 according to the ninth example embodiment. FIG. 41 shows an example table of aspherical data of the optical imaging lens system 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens system 9 of the present embodiment, in an order from an object side A1 to an image side A2 along an optical axis, may comprise an aperture stop 900, a first lens element 910, a second lens element 920, a third lens element 930 and a fourth lens element 940.

The differences between the present embodiment and the first embodiment are the radius of curvature, thickness of each lens element, the distance of each air gap, aspherical data, related optical parameters, such as back focal length, and the configuration of the concave/convex shape of the object-side surface 911 and the image-side surface 922, but the configuration of the concave/convex shape of surfaces, comprising the object-side surfaces 921, 931, 941 facing to the object side A1 and the image-side surfaces 912, 932, 942 facing to the image side A2, are similar to those in the first embodiment. Here, for clearly showing the drawings of the present embodiment, only the surface shapes which are different from that in the first embodiment are labeled. Specifically, the image-side surface 912 may be a convex surface comprising a convex portion 9122 in a vicinity of a periphery of the first lens element 910, the object-side surface 921 may be a concave surface comprising a concave portion 9211 in a vicinity of the optical axis and a concave portion 9212 in a vicinity of a periphery of the second lens element 920, the third lens element 930 has negative refracting power, the object-side surface 931 may comprise a convex portion 9311 in a vicinity of the optical axis, the image-side surface 932 may comprise a concave portion 9321 in a vicinity of the optical axis, the fourth lens element 940 has positive refracting power, the object-side surface 941 may be a convex surface comprising a convex portion 9411 in a vicinity of the optical axis and a convex portion 9412 in a vicinity of a periphery of the fourth lens element 940, and the image-side surface 942 may comprise a concave portion 9421 in a vicinity of the optical axis.

Please refer to FIG. 40 for the optical data of each lens element, FIG. 41 for the aspherical data in the optical imaging lens system 9, and FIG. 98B for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 911 of the first lens element 910 to the image plane 970 along the optical axis may be about 4.097 mm, EFL may be about 4.090 mm, the image height may be about 2.400 mm, HFOV may be about 22.660, and Fno may be about 2.394. Compared with the first embodiment, here both the length and EFL are shorter, and HFOV may be greater.

As the longitudinal spherical aberration shown in FIG. 39(a), the offset of the off-axis light relative to the image point may be within about ±0.01 mm. As the astigmatism aberration in the sagittal direction shown in FIG. 39(b), the focus variation with respect to the three wavelengths in the whole field may fall within about ±0.03 mm. As the astigmatism aberration in the tangential direction shown in FIG. 39(c), the focus variation with respect to the three wavelengths in the whole field may fall within about ±0.03 mm. As shown in FIG. 39(d), the variation of the distortion aberration may be within about ±0.4%. Compared with the first embodiment, the longitudinal spherical aberration, astigmatism aberration and distortion aberration are less. According to the value of the aberrations, it is shown that the optical imaging lens system 9 of the present embodiment, with the length as short as about 4.097 mm and Fno as low as about 2.394, may be capable of providing good imaging quality as well as good optical characteristics.

Figure 42:
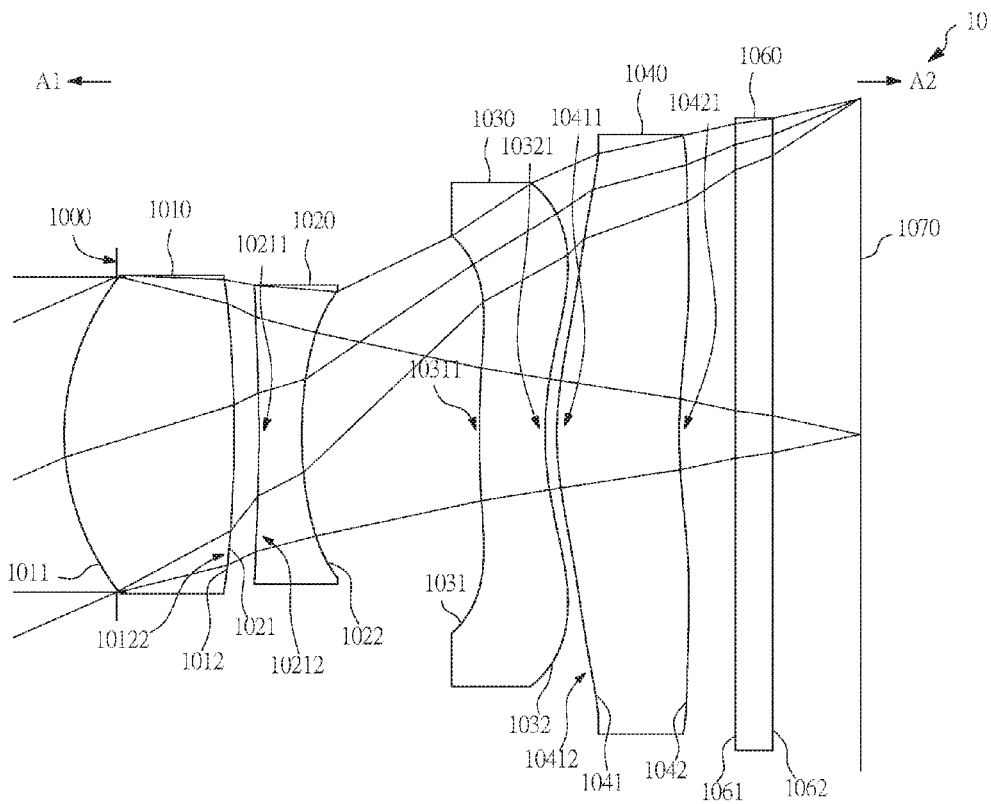
FIG. 42 is a cross-sectional view of a tenth embodiment of an optical imaging lens system having four lens elements according to the present disclosure.
Figure 43:
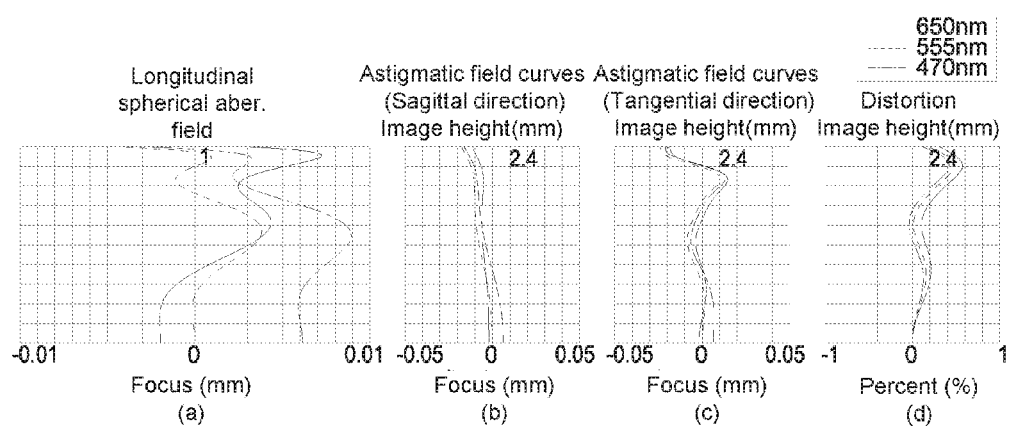
FIG. 43 is a chart of longitudinal spherical aberration and other kinds of optical aberrations of a tenth embodiment of the optical imaging lens system according to the present disclosure.

Reference is now made to FIGS. 42-45. FIG. 42 illustrates an example cross-sectional view of an optical imaging lens system 10 having four lens elements of the optical imaging lens system according to a tenth example embodiment. FIG. 43 shows example charts of longitudinal spherical aberration and other kinds of optical aberrations of the optical imaging lens system 10 according to the tenth example embodiment. FIG. 44 shows an example table of optical data of each lens element of the optical imaging lens system 10 according to the tenth example embodiment. FIG. 45 shows an example table of aspherical data of the optical imaging lens system 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens system 10 of the present embodiment, in an order from an object side A1 to an image side A2 along an optical axis, may comprise an aperture stop 1000, a first lens element 1010, a second lens element 1020, a third lens element 1030 and a fourth lens element 1040.

The differences between the present embodiment and the first embodiment are the radius of curvature, thickness of each lens element, the distance of each air gap, aspherical data, related optical parameters, such as back focal length, and the configuration of the concave/convex shape of the object-side surface 1011 and the image-side surface 1022, but the configuration of the concave/convex shape of surfaces, comprising the object-side surfaces 1021, 1031, 1041 facing to the object side A1 and the image-side surfaces 1012, 1032, 1042 facing to the image side A2, are similar to those in the first embodiment. Here, for clearly showing the drawings of the present embodiment, only the surface shapes which are different from that in the first embodiment are labeled. Specifically, the image-side surface 1012 may be a convex surface comprising a convex portion 10122 in a vicinity of a periphery of the first lens element 1010, the object-side surface 1021 may be a concave surface comprising a concave portion 10211 in a vicinity of the optical axis and a concave portion 10212 in a vicinity of a periphery of the second lens element 1020, the third lens element 1030 has negative refracting power, the object-side surface 1031 may comprise a convex portion 10311 in a vicinity of the optical axis, the image-side surface 1032 may comprise a concave portion 10321 in a vicinity of the optical axis, the fourth lens element 1040 has positive refracting power, the object-side surface 1041 may be a convex surface comprising a convex portion 10411 in a vicinity of the optical axis and a convex portion 10412 in a vicinity of a periphery of the fourth lens element 1040, and the image-side surface 1042 may comprise a concave portion 10421 in a vicinity of the optical axis.

Please refer to FIG. 44 for the optical data of each lens element, FIG. 45 for the aspherical data in the optical imaging lens system 10, and FIG. 98B for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1011 of the first lens element 1010 to the image plane 1070 along the optical axis may be about 4.448 mm, EFL may be about 4.237 mm, the image height may be about 2.400 mm, HFOV may be about 23.899, and Fno may be about 2.401. Compared with the first embodiment, here both the length and EFL are shorter, and HFOV may be greater.

As the longitudinal spherical aberration shown in FIG. 43(a), the offset of the off-axis light relative to the image point may be within about ±0.01 mm. As the astigmatism aberration in the sagittal direction shown in FIG. 43(b), the focus variation with respect to the three wavelengths in the whole field falls within ±0.02 mm. As the astigmatism aberration in the tangential direction shown in FIG. 43(c), the focus variation with respect to the three wavelengths in the whole field falls within ±0.03 mm. As shown in FIG. 43(d), the variation of the distortion aberration may be within about ±1%. Compared with the first embodiment, the longitudinal spherical aberration and astigmatism aberration may be less. According to the value of the aberrations, it is shown that the optical imaging lens system 10 of the present embodiment, with the length as short as about 4.448 mm and Fno as low as about 2.401, may be capable of providing good imaging quality as well as good optical characteristics.

Figure 46:
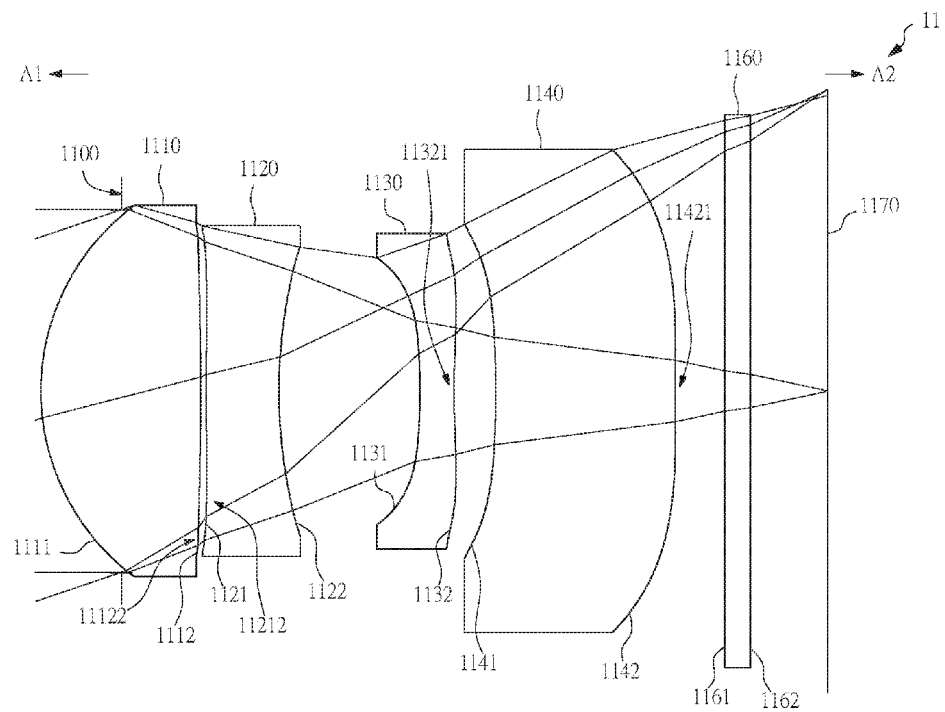
FIG. 46 is a cross-sectional view of a eleventh embodiment of an optical imaging lens system having four lens elements according to the present disclosure.
Figure 47:
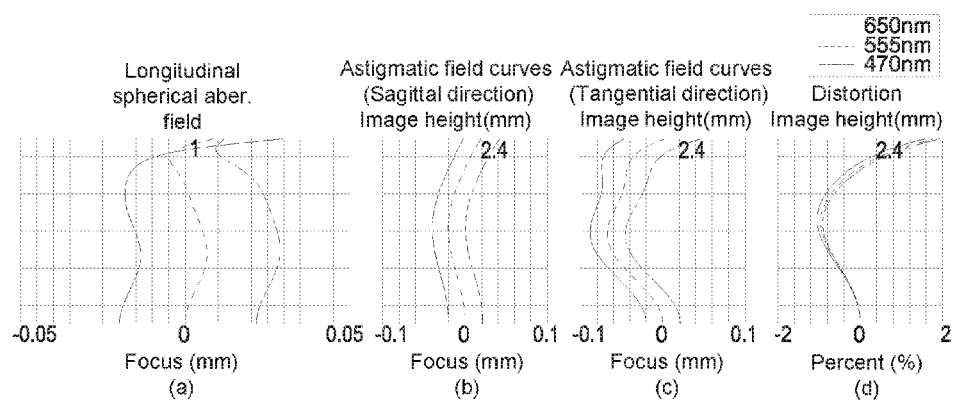
FIG. 47 is a chart of longitudinal spherical aberration and other kinds of optical aberrations of a eleventh embodiment of the optical imaging lens system according to the present disclosure.

Reference is now made to FIGS. 46-49. FIG. 46 illustrates an example cross-sectional view of an optical imaging lens system 11 having four lens elements of the optical imaging lens system according to a eleventh example embodiment. FIG. 47 shows example charts of longitudinal spherical aberration and other kinds of optical aberrations of the optical imaging lens system 11 according to the eleventh example embodiment. FIG. 48 shows an example table of optical data of each lens element of the optical imaging lens system 11 according to the eleventh example embodiment. FIG. 49 shows an example table of aspherical data of the optical imaging lens system 11 according to the eleventh example embodiment. The reference numbers labeled in the present embodiment are similar to those in the first embodiment for the similar elements, but here the reference numbers are initialed with 11, for example, reference number 1131 for labeling the object-side surface of the third lens element 1130, reference number 1132 for labeling the image-side surface of the third lens element 1130, etc.

As shown in FIG. 46, the optical imaging lens system 11 of the present embodiment, in an order from an object side A1 to an image side A2 along an optical axis, may comprise an aperture stop 1100, a first lens element 1110, a second lens element 1120, a third lens element 1130 and a fourth lens element 1140.

The differences between the present embodiment and the first embodiment are the radius of curvature, thickness of each lens element, the distance of each air gap, aspherical data, related optical parameters, such as back focal length, and the configuration of the concave/convex shape of the object-side surfaces 1111, 1131, 1141 and the image-side surface 1122, but the configuration of the concave/convex shape of surfaces, comprising the object-side surface 1121, facing to the object side A1 and the image-side surfaces 1112, 1132, 1142 facing to the image side A2, are similar to those in the first embodiment. Here, for clearly showing the drawings of the present embodiment, only the surface shapes which are different from that in the first embodiment are labeled. Specifically, the image-side surface 1112 may be a convex surface comprising a convex portion 11122 in a vicinity of a periphery of the first lens element 1110, the object-side surface 1121 may comprise a concave portion 11212 in a vicinity of a periphery of the second lens element 1120, the third lens element 1130 has negative refracting power, the image-side surface 1132 may comprise a concave portion 11321 in a vicinity of the optical axis, and the image-side surface 1142 may comprise a concave portion 11421 in a vicinity of the optical axis.

Please refer to FIG. 48 for the optical data of each lens element, FIG. 49 for the aspherical data in the optical imaging lens system 11, and FIG. 98B for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1111 of the first lens element 1110 to the image plane 1170 along the optical axis may be about 6.384 mm, EFL may be about 7.070 mm, the image height may be about 2.400 mm, HFOV may be about 18.484, and Fno may be about 2.397. Compared with the first embodiment, the optical imaging lens system 11 may be easier to manufacture.

As the longitudinal spherical aberration shown in FIG. 47(a), the offset of the off-axis light relative to the image point may be within about ±0.04 mm. As the astigmatism aberration in the sagittal direction shown in FIG. 47(b), the focus variation with respect to the three wavelengths in the whole field may fall within about ±0.08 mm. As the astigmatism aberration in the tangential direction shown in FIG. 47(c), the focus variation with respect to the three wavelengths in the whole field may fall within about ±0.1 mm. As shown in FIG. 47(d), the variation of the distortion aberration may be within about ±2%. Compared with the first embodiment, the astigmatism aberration in the tangential direction may be less. According to the value of the aberrations, it is shown that the optical imaging lens system 11 of the present embodiment, with the length as short as about 6.384 mm and Fno as low as about 2.397, may be capable of providing good imaging quality as well as good optical characteristics.

Figure 50:
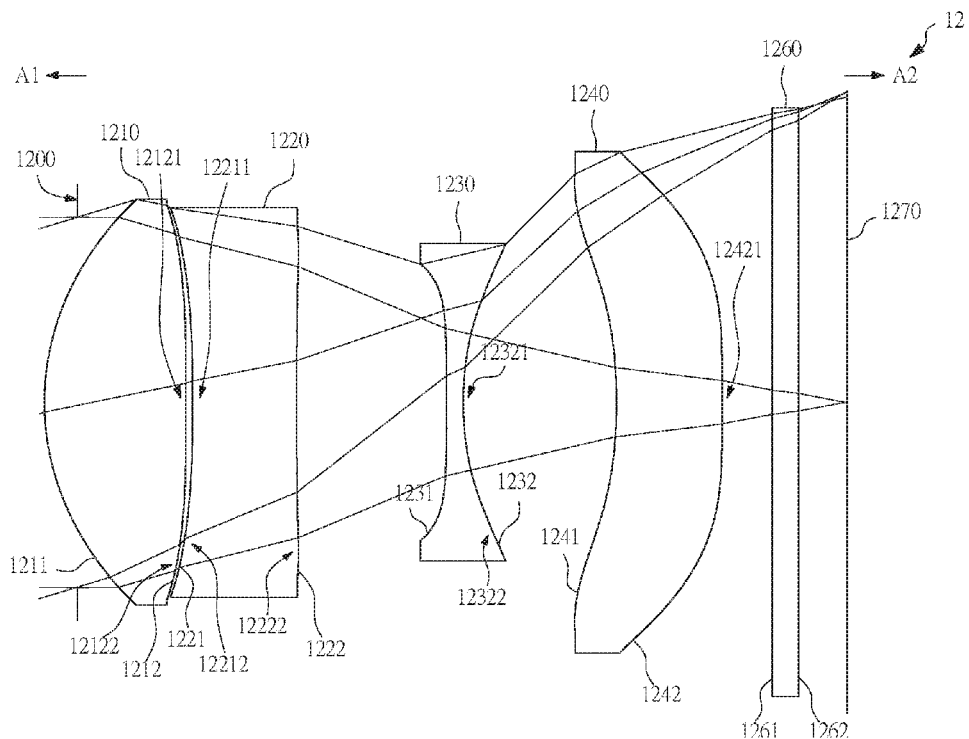
FIG. 50 is a cross-sectional view of a twelfth embodiment of an optical imaging lens system having four lens elements according to the present disclosure.
Figure 51:
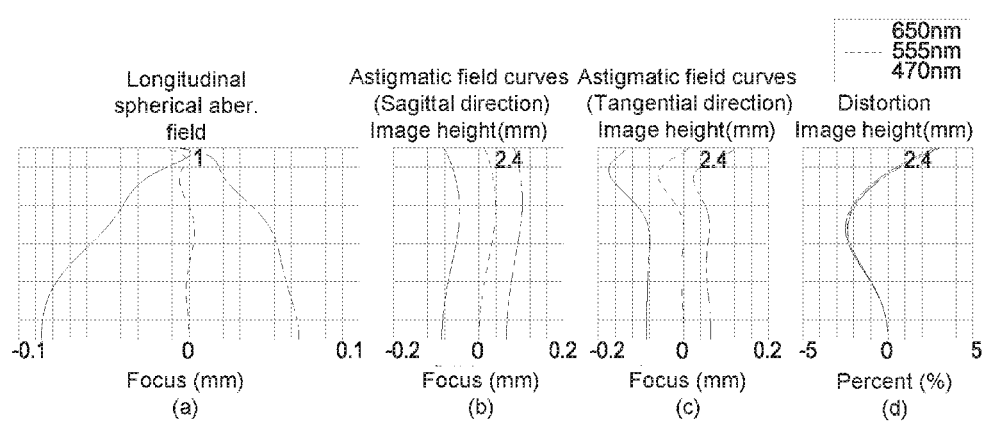
FIG. 51 is a chart of longitudinal spherical aberration and other kinds of optical aberrations of a twelfth embodiment of the optical imaging lens system according to the present disclosure.

Reference is now made to FIGS. 50-53. FIG. 50 illustrates an example cross-sectional view of an optical imaging lens system 12 having four lens elements of the optical imaging lens system according to a twelfth example embodiment. FIG. 51 shows example charts of longitudinal spherical aberration and other kinds of optical aberrations of the optical imaging lens system 12 according to the twelfth example embodiment. FIG. 52 shows an example table of optical data of each lens element of the optical imaging lens system 12 according to the twelfth example embodiment. FIG. 53 shows an example table of aspherical data of the optical imaging lens system 12 according to the twelfth example embodiment. The reference numbers labeled in the present embodiment are similar to those in the first embodiment for the similar elements, but here the reference numbers are initialed with 12, for example, reference number 1231 for labeling the object-side surface of the third lens element 1230, reference number 1232 for labeling the image-side surface of the third lens element 1230, etc.

As shown in FIG. 50, the optical imaging lens system 12 of the present embodiment, in an order from an object side A1 to an image side A2 along an optical axis, may comprise an aperture stop 1200, a first lens element 1210, a second lens element 1220, a third lens element 1230 and a fourth lens element 1240.

The differences between the present embodiment and the first embodiment are the radius of curvature, thickness of each lens element, the distance of each air gap, aspherical data, related optical parameters, such as back focal length, and the configuration of the concave/convex shape of the object-side surfaces 1211, 1231, 1241, but the configuration of the concave/convex shape of surfaces, comprising the object-side surface 1221, facing to the object side A1 and the image-side surfaces 1212, 1222, 1232, 1242 facing to the image side A2, are similar to those in the first embodiment. Here, for clearly showing the drawings of the present embodiment, only the surface shapes which are different from that in the first embodiment are labeled. Specifically, the image-side surface 1212 may comprise a concave portion 12121 in a vicinity of the optical axis and a convex portion 12122 in a vicinity of a periphery of the first lens element 1210, the object-side surface 1221 may be a concave surface comprising a concave portion 12211 in a vicinity of the optical axis and a concave portion 12212 in a vicinity of a periphery of the second lens element 1220, the image-side surface 1222 may comprise a convex portion 12222 in a vicinity of the periphery of the second lens element 1220, the third lens element 1230 has negative refracting power, the image-side surface 1232 may be a concave surface comprising a concave portion 12321 in a vicinity of the optical axis and a concave surface 12322 in a vicinity of a periphery of the third lens element 1230, and the image-side surface 1242 may comprise a concave portion 12421 in a vicinity of the optical axis.

Please refer to FIG. 52 for the optical data of each lens element, FIG. 53 for the aspherical data in the optical imaging lens system 12, and FIG. 98B for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1211 of the first lens element 1210 to the image plane 1270 along the optical axis may be about 6.396 mm, EFL may be about 7.952 mm, the image height may be about 2.400 mm, HFOV may be about 16.424, and Fno may be about 2.689. Compared with the first embodiment, the optical imaging lens system 12 may be easier to manufacture.

As the longitudinal spherical aberration shown in FIG. 51(a), the offset of the off-axis light relative to the image point may be within about ±0.1 mm. As the astigmatism aberration in the sagittal direction shown in FIG. 51(b), the focus variation with respect to the three wavelengths in the whole field falls within ±0.12 mm. As the astigmatism aberration in the tangential direction shown in FIG. 51(c), the focus variation with respect to the three wavelengths in the whole field falls within ±0.2 mm. As shown in FIG. 51(d), the variation of the distortion aberration may be within about ±4%. According to the value of the aberrations, it is shown that the optical imaging lens system 12 of the present embodiment, with the length as short as about 6.396 mm and Fno as low as about 2.689, may be capable of providing good imaging quality as well as good optical characteristics.

Figure 54:
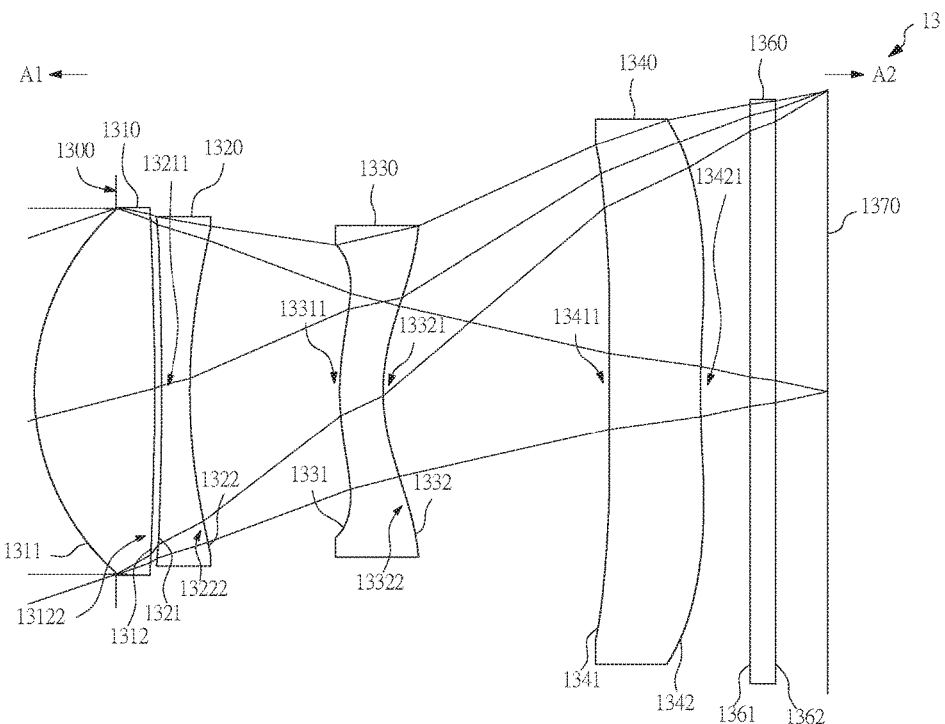
FIG. 54 is a cross-sectional view of a thirteenth embodiment of an optical imaging lens system having four lens elements according to the present disclosure.
Figure 55:
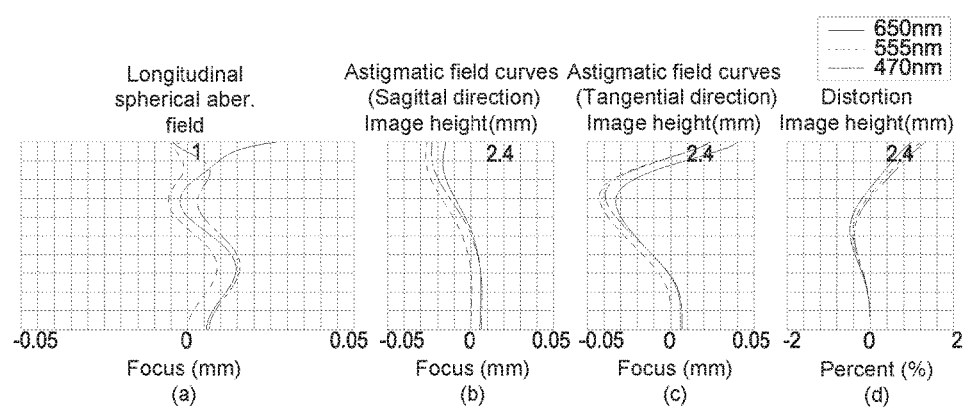
FIG. 55 is a chart of longitudinal spherical aberration and other kinds of optical aberrations of a thirteenth embodiment of the optical imaging lens system according to the present disclosure.

Reference is now made to FIGS. 54-57. FIG. 54 illustrates an example cross-sectional view of an optical imaging lens system 13 having four lens elements of the optical imaging lens system according to a thirteenth example embodiment. FIG. 55 shows example charts of longitudinal spherical aberration and other kinds of optical aberrations of the optical imaging lens system 13 according to the thirteenth example embodiment. FIG. 56 shows an example table of optical data of each lens element of the optical imaging lens system 13 according to the thirteenth example embodiment. FIG. 57 shows an example table of aspherical data of the optical imaging lens system 13 according to the thirteenth example embodiment. The reference numbers labeled in the present embodiment are similar to those in the first embodiment for the similar elements, but here the reference numbers are initialed with 13, for example, reference number 1331 for labeling the object-side surface of the third lens element 1330, reference number 1332 for labeling the image-side surface of the third lens element 1330, etc.

As shown in FIG. 54, the optical imaging lens system 13 of the present embodiment, in an order from an object side A1 to an image side A2 along an optical axis, may comprise an aperture stop 1300, a first lens element 1310, a second lens element 1320, a third lens element 1330 and a fourth lens element 1340.

The differences between the present embodiment and the first embodiment are the radius of curvature, thickness of each lens element, the distance of each air gap, aspherical data, related optical parameters, such as back focal length, and the configuration of the concave/convex shape of the object-side surface 1311, but the configuration of the concave/convex shape of surfaces, comprising the object-side surfaces 1321, 1331, 1341, facing to the object side A1 and the image-side surfaces 1312, 1322, 1332, 1342 facing to the image side A2, are similar to those in the first embodiment. Here, for clearly showing the drawings of the present embodiment, only the surface shapes which are different from that in the first embodiment are labeled. Specifically, the image-side surface 1312 may be a convex surface comprising a convex portion 13122 in a vicinity of a periphery of the first lens element 1310, the object-side surface 1321 may be a concave surface comprising a concave portion 13211 in a vicinity of the optical axis, the image-side surface 1322 may be a concave surface comprising a concave portion 13222 in a vicinity of the periphery of the second lens element 1320, the third lens element 1330 has negative refracting power, the object-side surface 1331 may comprise a convex portion 13311 in a vicinity of the optical axis, the image-side surface 1332 may be a concave surface comprising a concave portion 13321 in a vicinity of the optical axis and a concave surface 13322 in a vicinity of a periphery of the third lens element 1330, the object-side surface 1341 may comprise a convex portion 13411 in a vicinity of the optical axis, and the image-side surface 1342 may comprise a concave portion 13421 in a vicinity of the optical axis.

Please refer to FIG. 56 for the optical data of each lens element, FIG. 57 for the aspherical data in the optical imaging lens system 13, and FIG. 98B for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1311 of the first lens element 1310 to the image plane 1370 along the optical axis may be about 6.380 mm, EFL may be about 7.070 mm, the image height may be about 2.400 mm, HFOV may be about 18.553, and Fno may be about 2.396. Compared with the first embodiment, the optical imaging lens system 13 may be easier to manufacture.

As the longitudinal spherical aberration shown in FIG. 55(a), the offset of the off-axis light relative to the image point may be within about ±0.03 mm. As the astigmatism aberration in the sagittal direction shown in FIG. 55(b), the focus variation with respect to the three wavelengths in the whole field may fall within about ±0.03 mm. As the astigmatism aberration in the tangential direction shown in FIG. 55(c), the focus variation with respect to the three wavelengths in the whole field may fall within about ±0.05 mm. As shown in FIG. 55(d), the variation of the distortion aberration may be within about ±2%. Compared with the first embodiment, the astigmatism aberration is less. According to the value of the aberrations, it is shown that the optical imaging lens system 13 of the present embodiment, with the length as short as about 6.380 mm and Fno as low as about 2.396, may be capable of providing good imaging quality as well as good optical characteristics.

Figure 58:
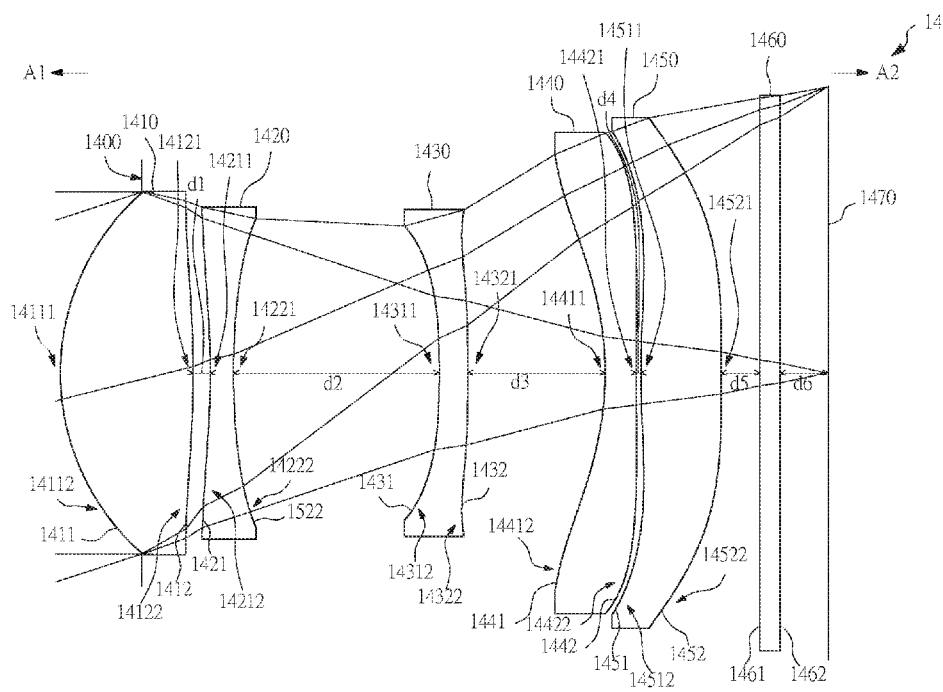
FIG. 58 is a cross-sectional view of a fourteenth embodiment of an optical imaging lens system having five lens elements according to the present disclosure.
Figure 59:
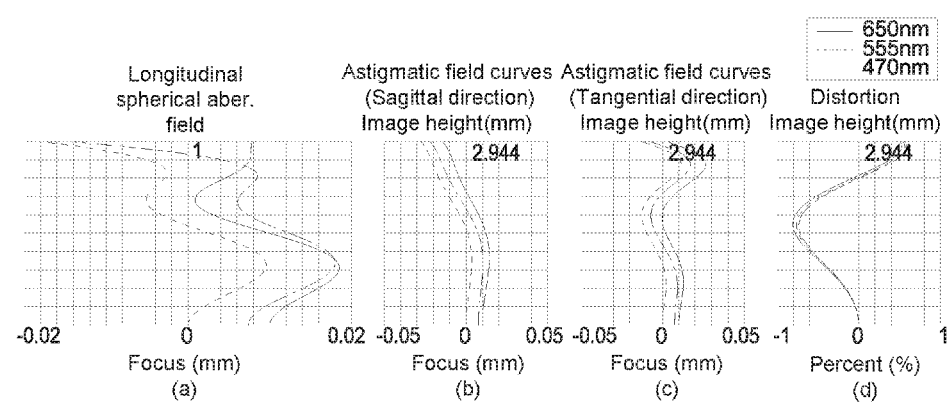
FIG. 59 is a chart of longitudinal spherical aberration and other kinds of optical aberrations of a fourteenth embodiment of the optical imaging lens system according to the present disclosure.

Reference is now made to FIGS. 58-61. FIG. 58 illustrates an example cross-sectional view of an optical imaging lens system 14 having five lens elements of the optical imaging lens system according to a fourteenth example embodiment. FIG. 59 shows example charts of longitudinal spherical aberration and other kinds of optical aberrations of the optical imaging lens system 14 according to the fourteenth example embodiment. FIG. 60 shows an example table of optical data of each lens element of the optical imaging lens system 14 according to the fourteenth example embodiment. FIG. 61 shows an example table of aspherical data of the optical imaging lens system 14 according to the fourteenth example embodiment. The reference numbers labeled in the present embodiment are similar to those in the first embodiment for the similar elements, but here the reference numbers are initialed with 14, for example, reference number 1431 for labeling the object-side surface of the third lens element 1430, reference number 1432 for labeling the image-side surface of the third lens element 1430, etc.

As shown in FIG. 58, the optical imaging lens system 14 of the present embodiment, in an order from an object side A1 to an image side A2 along an optical axis, may comprise an aperture stop 1400, a first lens element 1410, a second lens element 1420, a third lens element 1430, a fourth lens element 1440 and a fifth lens element 1450.

The differences between the present embodiment and the first embodiment are the radius of curvature, thickness of each lens element, the distance of each air gap, aspherical data, related optical parameters, such as back focal length, and the configuration of the concave/convex shape of the object-side surfaces 1411, 1431, 1441, and the image-side surface 1422, and a further fifth lens element 1450, but the configuration of the concave/convex shape of surfaces, comprising the object-side surfaces 1421, facing to the object side A1 and the image-side surfaces 1412, 1432, 1442 facing to the image side A2, are similar to those in the first embodiment. Here, for clearly showing the drawings of the present embodiment, only the surface shapes which are different from that in the first embodiment are labeled. Specifically, the object-side surface 1411 may be a convex surface comprising a convex portion 14111 in a vicinity of the optical axis and a convex portion 14112 in a vicinity of a periphery of the first lens element 1410, the image-side surface 1412 may be a convex surface comprising a convex portion 14121 in a vicinity of the optical axis and a convex portion 14122 in a vicinity of the periphery of the first lens element 1410; the object-side surface 1421 may be a concave surface comprising a concave portion 14211 in a vicinity of the optical axis and a concave portion 14212 in a vicinity of a periphery of the second lens element 1420, the image-side surface 1422 may be a concave surface comprising a concave portion 14221 in a vicinity of the optical axis and a concave portion 14222 in a vicinity of the periphery of the second lens element 1420; the third lens element 1430 has negative refracting power, the object-side surface 1431 may be a concave surface comprising a concave portion 14311 in a vicinity of the optical axis and a concave portion 14312 in a vicinity of the periphery of the third lens element 1430, the image-side surface 1432 may comprise a convex portion 14321 in a vicinity of the optical axis and a concave surface 14322 in a vicinity of a periphery of the third lens element 1430; the object-side surface 1441 may be a concave surface comprising a concave portion 14411 in a vicinity of the optical axis and a concave surface 14412 in a vicinity of a periphery of the fourth lens element 1440, the image-side surface 1442 may comprise a concave portion 14421 in a vicinity of the optical axis and a convex surface 14422 in a vicinity of a periphery of the fourth lens element 1440; and the object-side surface 1451 may comprise a convex portion 14511 in a vicinity of the optical axis and a concave surface 14512 in a vicinity of a periphery of the fifth lens element 1450, the image-side surface 1452 may be a convex surface comprising a convex portion 14521 in a vicinity of the optical axis and a convex surface 14522 in a vicinity of a periphery of the fifth lens element 1450.

Please refer to FIG. 60 for the optical data of each lens element.

The aspherical surfaces, including the object-side surface 1411 and the image-side surface 1412 of the first lens element 1410, the object-side surface 1421 and the image-side surface 1422 of the second lens element 1420, the object-side surface 1431 and the image-side surface 1432 of the third lens element 1430, the object-side surface 1441 and the image-side surface 1442 of the fourth lens element 1440, and the object-side surface 1451 and the image-side surface 1452 of the fifth lens element 1450, are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and a, represents an aspherical coefficient of $i^{th}$ level. The values of each aspherical parameter are shown in FIG. 61.

In example embodiments, air gaps exist between the lens elements 1410, 1420, 1430, 1440, 1450, the filtering unit 1460 and the image plane 1470 of the image sensor. For example, FIG. 58 illustrates the air gap d1 existing between the first lens element 1410 and the second lens element 1420, the air gap d2 existing between the second lens element 1420 and the third lens element 1430, the air gap d3 existing between the third lens element 1430 and the fourth lens element 1440, the air gap d4 existing between the fourth lens element 1440 and the filtering unit 1460 and the air gap d5 existing between the filtering unit 1460 and the image plane 1470 of the image sensor. However, in other embodiments, any of the aforementioned air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G45, and the sum of d1, d2, d3 and d4 is denoted by Gaa.

Please refer to FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1411 of the first lens element 1410 to the image plane 1470 along the optical axis may be about 7.952 mm, EFL may be about 9.000 mm, the image height may be about 2.944 mm, HFOV may be about 18.172, and Fno may be about 2.391. Compared with the first embodiment, the optical imaging lens system 14 may be easier to manufacture.

As the longitudinal spherical aberration shown in FIG. 59(a), the offset of the off-axis light relative to the image point may be within about ±0.02 mm. As the astigmatism aberration in the sagittal direction shown in FIG. 59(b), the focus variation with respect to the three wavelengths in the whole field may fall within about ±0.03 mm. As the astigmatism aberration in the tangential direction shown in FIG. 59(c), the focus variation with respect to the three wavelengths in the whole field may fall within about ±0.03 mm. As shown in FIG. 59(d), the variation of the distortion aberration may be within about ±1%. Compared with the first embodiment, the astigmatism aberration may be less. According to the value of the aberrations, it is shown that the optical imaging lens system 14 of the present embodiment, with the length as short as about 7.952 mm and Fno as low as about 2.391, may be capable of providing good imaging quality as well as good optical characteristics.

Figure 62:
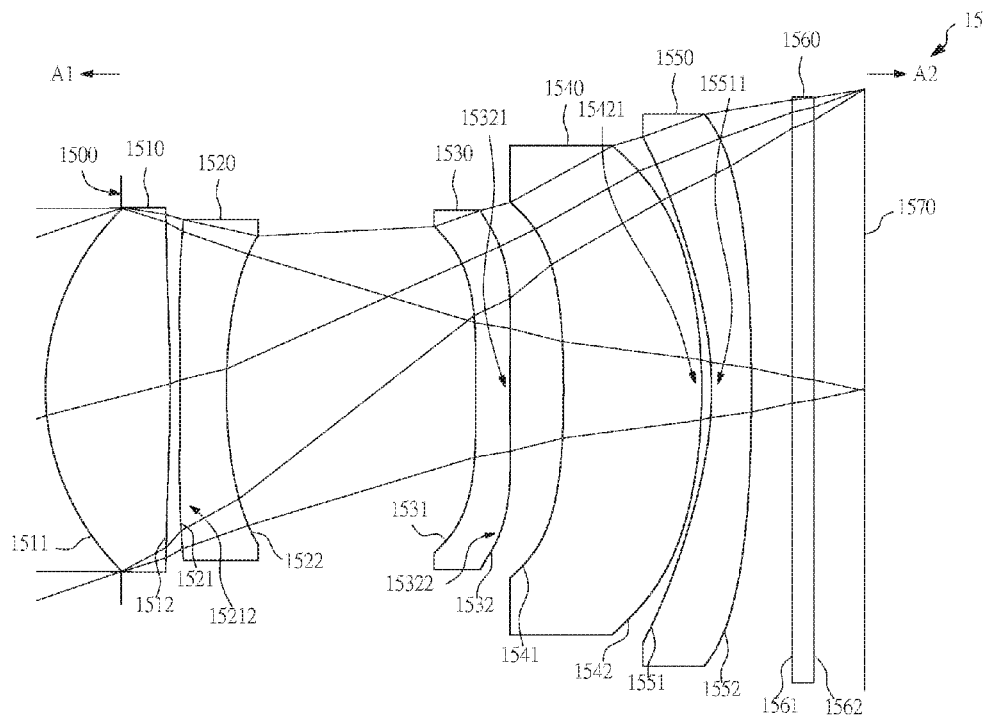
FIG. 62 is a cross-sectional view of a fifteenth embodiment of an optical imaging lens system having five lens elements according to the present disclosure.
Figure 63:
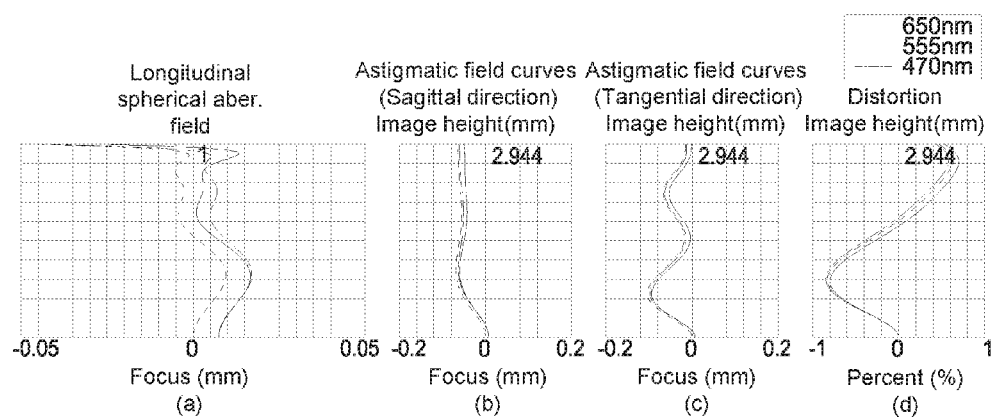
FIG. 63 is a chart of longitudinal spherical aberration and other kinds of optical aberrations of a fifteenth embodiment of the optical imaging lens system according to the present disclosure.

Reference is now made to FIGS. 62-65. FIG. 62 illustrates an example cross-sectional view of an optical imaging lens system 15 having five lens elements of the optical imaging lens system according to a fifteenth example embodiment. FIG. 63 shows example charts of longitudinal spherical aberration and other kinds of optical aberrations of the optical imaging lens system 15 according to the fifteenth example embodiment. FIG. 64 shows an example table of optical data of each lens element of the optical imaging lens system 15 according to the fifteenth example embodiment. FIG. 65 shows an example table of aspherical data of the optical imaging lens system 15 according to the fifteenth example embodiment. The reference numbers labeled in the present embodiment are similar to those in the first embodiment for the similar elements, but here the reference numbers are initialed with 15, for example, reference number 1531 for labeling the object-side surface of the third lens element 1530, reference number 1532 for labeling the image-side surface of the third lens element 1530, etc.

As shown in FIG. 62, the optical imaging lens system 15 of the present embodiment, in an order from an object side A1 to an image side A2 along an optical axis, may comprise an aperture stop 1500, a first lens element 1510, a second lens element 1520, a third lens element 1530, a fourth lens element 1540 and a fifth lens element 1550.

The differences between the present embodiment and the fourteenth embodiment are the radius of curvature, thickness of each lens element, the distance of each air gap, aspherical data, related optical parameters, such as back focal length, and the configuration of the concave/convex shape of the object-side surfaces 1511, 1531, 1541, and the image-side surfaces 1512, 1522, 1552, but the configuration of the concave/convex shape of surfaces, comprising the object-side surfaces 1521, 1551, facing to the object side A1 and the image-side surfaces 1532, 1542 facing to the image side A2, are similar to those in the fourteenth embodiment. Here, for clearly showing the drawings of the present embodiment, only the surface shapes which are different from that in the fourteenth embodiment are labeled. Specifically, the object-side surface 1521 may comprise a convex portion 15212 in a vicinity of a periphery of the second lens element 1520, the image-side surface 1532 may comprise a concave portion 15321 in a vicinity of the optical axis and a convex surface 15322 in a vicinity of a periphery of the third lens element 1530, the fourth lens element 1540 has positive refracting power, the image-side surface 1542 may be a convex surface comprising a convex portion 15421 in a vicinity of the optical axis, the fifth lens element 1550 has negative refracting power, and the object-side surface 1551 may comprise a concave portion 15511 in a vicinity of the optical axis.

Please refer to FIG. 64 for the optical data of each lens element, FIG. 65 for the aspherical data in the optical imaging lens system 15, and FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1511 of the first lens element 1510 to the image plane 1570 along the optical axis may be about 8.000 mm, EFL may be about 8.518 mm, the image height may be about 2.944 mm, HFOV may be about 18.985, and Fno may be about 2.343. Compared with the fourteenth embodiment, here the Fno may be lower.

As the longitudinal spherical aberration shown in FIG. 63(a), the offset of the off-axis light relative to the image point may be within about ±0.05 mm. As the astigmatism aberration in the sagittal direction shown in FIG. 63(b), the focus variation with respect to the three wavelengths in the whole field may fall within about ±0.08 mm. As the astigmatism aberration in the tangential direction shown in FIG. 63(c), the focus variation with respect to the three wavelengths in the whole field may fall within about ±0.12 mm. As shown in FIG. 63(d), the variation of the distortion aberration may be within about ±1%. Compared with the fourteenth embodiment, the astigmatism aberration may be less. According to the value of the aberrations, it is shown that the optical imaging lens system 15 of the present embodiment, with the length as short as about 8.000 mm and Fno as low as about 2.343, may be capable of providing good imaging quality as well as good optical characteristics.

Figure 66:
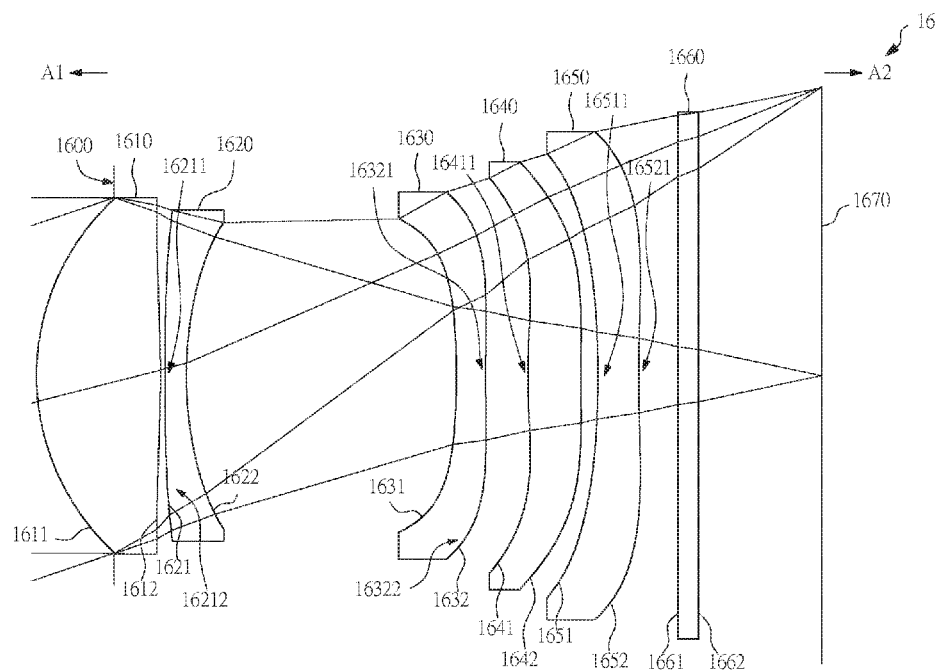
FIG. 66 is a cross-sectional view of a sixteenth embodiment of an optical imaging lens system having five lens elements according to the present disclosure.
Figure 67:
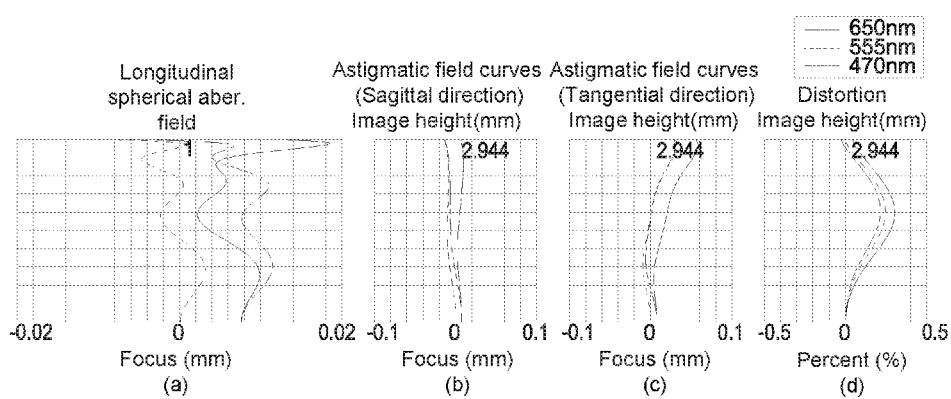
FIG. 67 is a chart of longitudinal spherical aberration and other kinds of optical aberrations of a sixteenth embodiment of the optical imaging lens system according to the present disclosure.

Reference is now made to FIGS. 66-69. FIG. 66 illustrates an example cross-sectional view of an optical imaging lens system 16 having five lens elements of the optical imaging lens system according to a sixteenth example embodiment. FIG. 67 shows example charts of longitudinal spherical aberration and other kinds of optical aberrations of the optical imaging lens system 16 according to the sixteenth example embodiment. FIG. 68 shows an example table of optical data of each lens element of the optical imaging lens system 16 according to the sixteenth example embodiment. FIG. 69 shows an example table of aspherical data of the optical imaging lens system 16 according to the sixteenth example embodiment. The reference numbers labeled in the present embodiment are similar to those in the first embodiment for the similar elements, but here the reference numbers are initialed with 16, for example, reference number 1631 for labeling the object-side surface of the third lens element 1630, reference number 1632 for labeling the image-side surface of the third lens element 1630, etc.

As shown in FIG. 66, the optical imaging lens system 16 of the present embodiment, in an order from an object side A1 to an image side A2 along an optical axis, may comprise an aperture stop 1600, a first lens element 1610, a second lens element 1620, a third lens element 1630, a fourth lens element 1640 and a fifth lens element 1650.

The differences between the present embodiment and the fourteenth embodiment are the radius of curvature, thickness of each lens element, the distance of each air gap, aspherical data, related optical parameters, such as back focal length, and the configuration of the concave/convex shape of the object-side surfaces 1611, 1631, and the image-side surfaces 1612, 1622, 1642, but the configuration of the concave/convex shape of surfaces, comprising the object-side surfaces 1621, 1641, 1651, facing to the object side A1 and the image-side surfaces 1632, 1652 facing to the image side A2, are similar to those in the fourteenth embodiment. Here, for clearly showing the drawings of the present embodiment, only the surface shapes which are different from that in the fourteenth embodiment are labeled. Specifically, the object-side surface 1621 is a convex surface comprising a convex portion 16211 in a vicinity of the optical axis and a convex portion 16212 in a vicinity of a periphery of the second lens element 1620, the image-side surface 1632 may comprise a concave portion 16321 in a vicinity of the optical axis and a convex surface 16322 in a vicinity of a periphery of the third lens element 1630, the fourth lens element 1640 has positive refracting power, the object-side surface 1641 may comprise a convex portion 16411 in a vicinity of the optical axis, the fifth lens element 1650 has negative refracting power, the object-side surface 1651 may comprise a concave portion 16511 in a vicinity of the optical axis, and the image-side surface 1652 may comprise a concave portion 16521 in a vicinity of the optical axis.

Please refer to FIG. 68 for the optical data of each lens element, FIG. 69 for the aspherical data in the optical imaging lens system 16, and FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1611 of the first lens element 1610 to the image plane 1670 along the optical axis may be about 8.000 mm, EFL may be about 8.698 mm, the image height may be about 2.944 mm, HFOV may be about 18.701, and Fno may be about 2.392. Compared with the fourteenth embodiment, here the HFOV may be greater.

As the longitudinal spherical aberration shown in FIG. 67(a), the offset of the off-axis light relative to the image point may be within about ±0.02 mm. As the astigmatism aberration in the sagittal direction shown in FIG. 67(b), the focus variation with respect to the three wavelengths in the whole field falls within ±0.02 mm. As the astigmatism aberration in the tangential direction shown in FIG. 67(c), the focus variation with respect to the three wavelengths in the whole field falls within ±0.06 mm. As shown in FIG. 67(d), the variation of the distortion aberration may be within about ±0.4%. Compared with the fourteenth embodiment, the distortion aberration may be less. According to the value of the aberrations, it is shown that the optical imaging lens system 16 of the present embodiment, with the length as short as about 8.000 mm and Fno as low as about 2.392, may be capable of providing good imaging quality as well as good optical characteristics.

Figure 70:
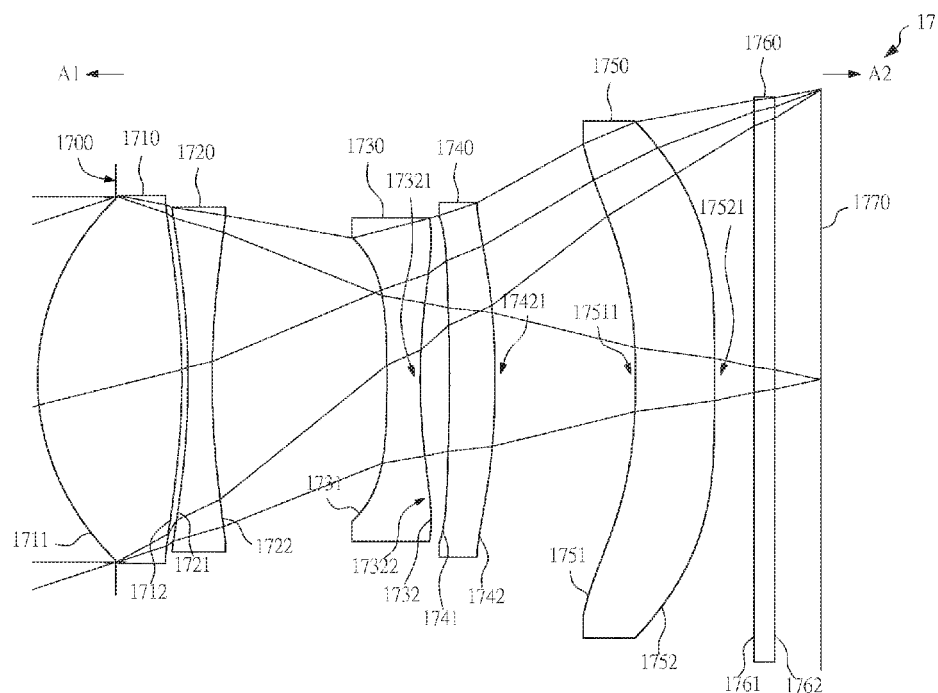
FIG. 70 is a cross-sectional view of a seventeenth embodiment of an optical imaging lens system having five lens elements according to the present disclosure.
Figure 71:
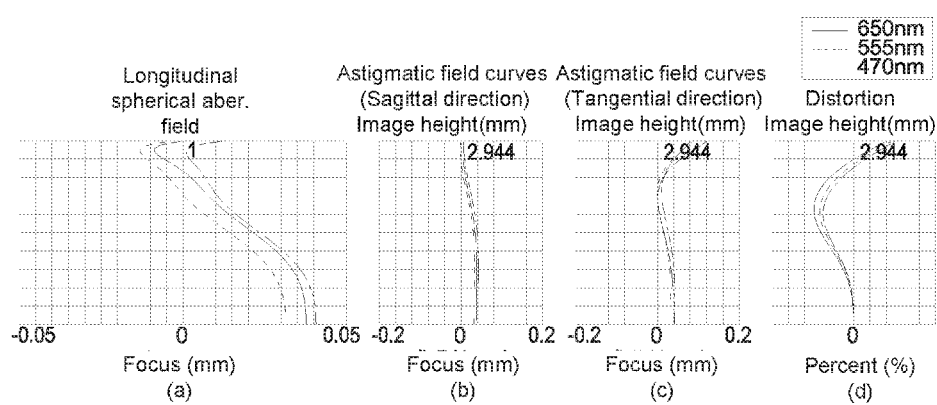
FIG. 71 is a chart of longitudinal spherical aberration and other kinds of optical aberrations of a seventeenth embodiment of the optical imaging lens system according to the present disclosure.

Reference is now made to FIGS. 70-73. FIG. 70 illustrates an example cross-sectional view of an optical imaging lens system 17 having five lens elements of the optical imaging lens system according to a seventeenth example embodiment. FIG. 71 shows example charts of longitudinal spherical aberration and other kinds of optical aberrations of the optical imaging lens system 17 according to the seventeenth example embodiment. FIG. 72 shows an example table of optical data of each lens element of the optical imaging lens system 17 according to the seventeenth example embodiment. FIG. 73 shows an example table of aspherical data of the optical imaging lens system 17 according to the seventeenth example embodiment. The reference numbers labeled in the present embodiment are similar to those in the first embodiment for the similar elements, but here the reference numbers are initialed with 17, for example, reference number 1731 for labeling the object-side surface of the third lens element 1730, reference number 1732 for labeling the image-side surface of the third lens element 1730, etc.

As shown in FIG. 70, the optical imaging lens system 17 of the present embodiment, in an order from an object side A1 to an image side A2 along an optical axis, may comprise an aperture stop 1700, a first lens element 1710, a second lens element 1720, a third lens element 1730, a fourth lens element 1740 and a fifth lens element 1750.

The differences between the present embodiment and the fourteenth embodiment are the radius of curvature, thickness of each lens element, the distance of each air gap, aspherical data, related optical parameters, such as back focal length, and the configuration of the concave/convex shape of the object-side surfaces 1711, 1721, 1731, 1741, and the image-side surfaces 1712, 1722, but the configuration of the concave/convex shape of surfaces, comprising the object-side surface 1751, facing to the object side A1 and the image-side surfaces 1732, 1742, 1752 facing to the image side A2, are similar to those in the fourteenth embodiment. Here, for clearly showing the drawings of the present embodiment, only the surface shapes which are different from that in the fourteenth embodiment are labeled. Specifically, the image-side surface 1732 may comprise a concave portion 17321 in a vicinity of the optical axis and a convex surface 17322 in a vicinity of a periphery of the third lens element 1730, the fourth lens element 1740 has positive refracting power, the image-side surface 1742 may be a convex surface comprising a convex portion 17421 in a vicinity of the optical axis, the fifth lens element 1750 has negative refracting power, the object-side surface 1751 may be a concave surface comprising a concave portion 17511 in a vicinity of the optical axis, and the image-side surface 1752 may comprise a concave portion 17521 in a vicinity of the optical axis.

Please refer to FIG. 72 for the optical data of each lens element, FIG. 73 for the aspherical data in the optical imaging lens system 17, and FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1711 of the first lens element 1710 to the image plane 1770 along the optical axis may be about 7.928 mm, EFL may be about 8.891 mm, the image height may be about 2.944 mm, HFOV may be about 18.354, and Fno may be about 2.378. Compared with the fourteenth embodiment, here the length may be shorter, and HFOV may be greater.

As the longitudinal spherical aberration shown in FIG. 71(a), the offset of the off-axis light relative to the image point may be within about ±0.05 mm. As the astigmatism aberration in the sagittal direction shown in FIG. 71(b), the focus variation with respect to the three wavelengths in the whole field falls within ±0.06 mm. As the astigmatism aberration in the tangential direction shown in FIG. 71(c), the focus variation with respect to the three wavelengths in the whole field falls within ±0.14 mm. As shown in FIG. 71(d), the variation of the distortion aberration may be within about ±0.6%. Compared with the fourteenth embodiment, the astigmatism aberration may be less. According to the value of the aberrations, it is shown that the optical imaging lens system 17 of the present embodiment, with the length as short as about 7.928 mm and Fno as low as about 2.378, may be capable of providing good imaging quality as well as good optical characteristics.

Figure 74:
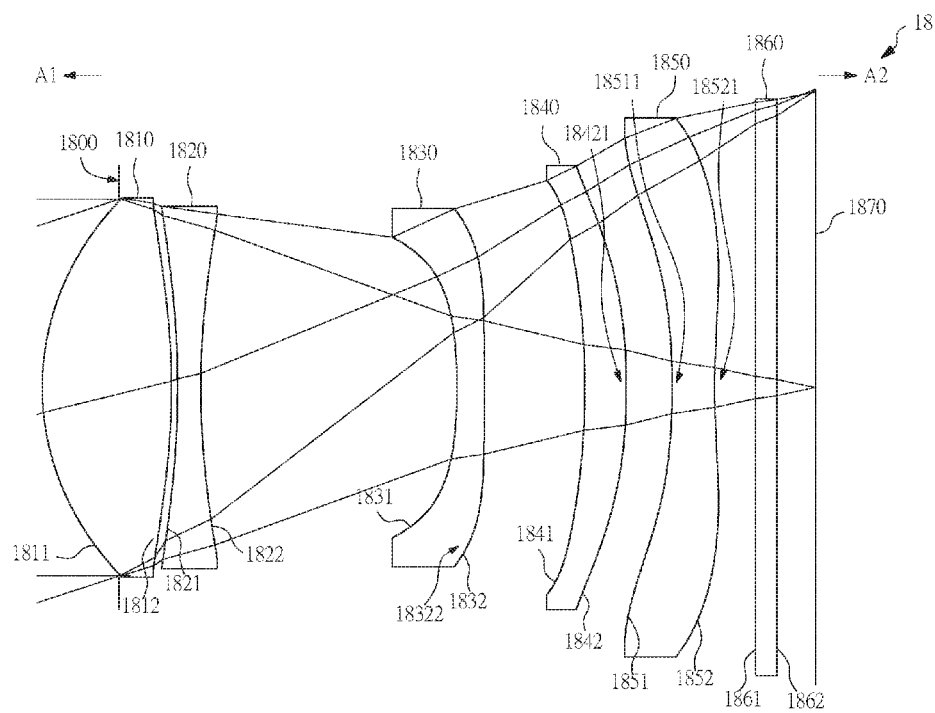
FIG. 74 is a cross-sectional view of a eighteenth embodiment of an optical imaging lens system having five lens elements according to the present disclosure.
Figure 75:
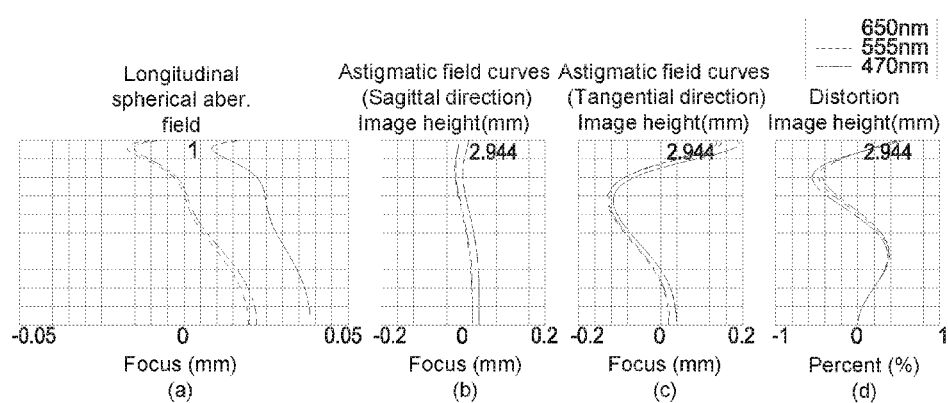
FIG. 75 is a chart of longitudinal spherical aberration and other kinds of optical aberrations of a eighteenth embodiment of the optical imaging lens system according to the present disclosure.

Reference is now made to FIGS. 74-77. FIG. 74 illustrates an example cross-sectional view of an optical imaging lens system 18 having five lens elements of the optical imaging lens system according to a eighteenth example embodiment. FIG. 75 shows example charts of longitudinal spherical aberration and other kinds of optical aberrations of the optical imaging lens system 18 according to the eighteenth example embodiment. FIG. 76 shows an example table of optical data of each lens element of the optical imaging lens system 18 according to the eighteenth example embodiment. FIG. 77 shows an example table of aspherical data of the optical imaging lens system 18 according to the eighteenth example embodiment. The reference numbers labeled in the present embodiment are similar to those in the first embodiment for the similar elements, but here the reference numbers are initialed with 18, for example, reference number 1831 for labeling the object-side surface of the third lens element 1830, reference number 1832 for labeling the image-side surface of the third lens element 1830, etc.

As shown in FIG. 74, the optical imaging lens system 18 of the present embodiment, in an order from an object side A1 to an image side A2 along an optical axis, may comprise an aperture stop 1800, a first lens element 1810, a second lens element 1820, a third lens element 1830, a fourth lens element 1840 and a fifth lens element 1850.

The differences between the present embodiment and the fourteenth embodiment are the radius of curvature, thickness of each lens element, the distance of each air gap, aspherical data, related optical parameters, such as back focal length, and the configuration of the concave/convex shape of the object-side surfaces 1811, 1821, 1831, 1841, and the image-side surfaces 1812, 1822, but the configuration of the concave/convex shape of surfaces, comprising the object-side surface 1851, facing to the object side A1 and the image-side surfaces 1832, 1842, 1852 facing to the image side A2, are similar to those in the fourteenth embodiment. Here, for clearly showing the drawings of the present embodiment, only the surface shapes which are different from that in the fourteenth embodiment are labeled. Specifically, the image-side surface 1832 may be a convex surface comprising a convex portion 18322 in a vicinity of a periphery of the third lens element 1830, the fourth lens element 1840 has positive refracting power, the image-side surface 1842 may be a convex surface comprising a convex portion 18421 in a vicinity of the optical axis, the fifth lens element 1850 has negative refracting power, the object-side surface 1851 may be a concave surface comprising a concave portion 18511 in a vicinity of the optical axis, and the image-side surface 1852 may comprise a concave portion 18521 in a vicinity of the optical axis.

Please refer to FIG. 76 for the optical data of each lens element, FIG. 77 for the aspherical data in the optical imaging lens system 18, and FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1811 of the first lens element 1810 to the image plane 1870 along the optical axis may be about 7.618 mm, EFL may be about 8.921 mm, the image height may be about 2.944 mm, HFOV may be about 18.264, and Fno may be about 2.377. Compared with the fourteenth embodiment, here both the length and EFL are shorter, HFOV may be greater, and Fno may be lower.

As the longitudinal spherical aberration shown in FIG. 75(a), the offset of the off-axis light relative to the image point may be within about ±0.04 mm. As the astigmatism aberration in the sagittal direction shown in FIG. 75(b), the focus variation with respect to the three wavelengths in the whole field may fall within about ±0.04 mm. As the astigmatism aberration in the tangential direction shown in FIG. 75(c), the focus variation with respect to the three wavelengths in the whole field may fall within about ±0.2 mm. As shown in FIG. 75(d), the variation of the distortion aberration may be within about ±0.6%. Compared with the fourteenth embodiment, the distortion aberration may be less. According to the value of the aberrations, it is shown that the optical imaging lens system 18 of the present embodiment, with the length as short as about 7.618 mm and Fno as low as about 2.377, may be capable of providing good imaging quality as well as good optical characteristics.

Figure 78:
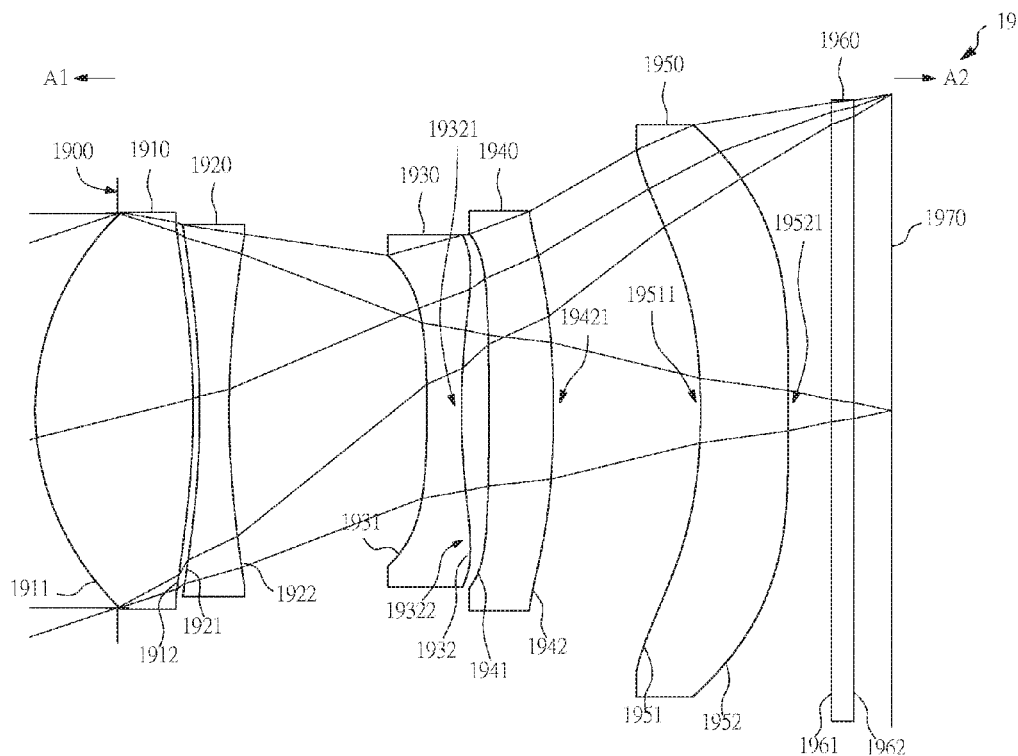
FIG. 78 is a cross-sectional view of a nineteenth embodiment of an optical imaging lens system having five lens elements according to the present disclosure.
Figure 79:
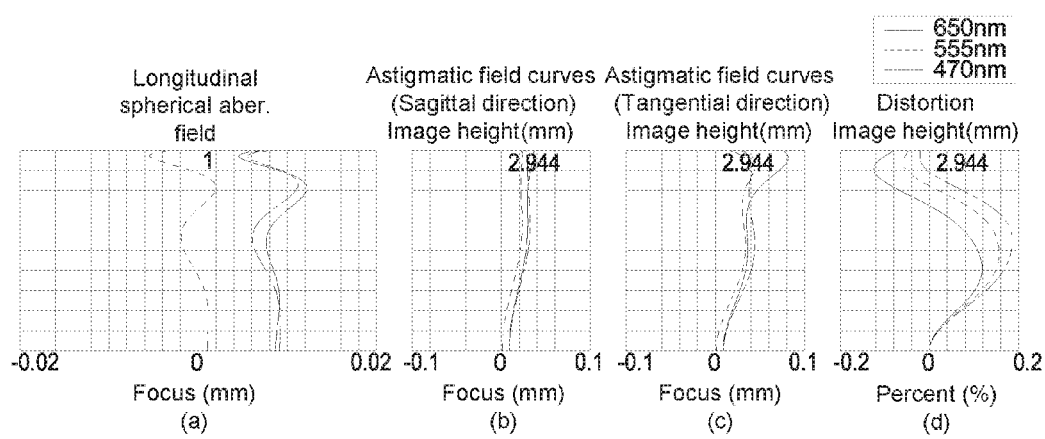
FIG. 79 is a chart of longitudinal spherical aberration and other kinds of optical aberrations of a nineteenth embodiment of the optical imaging lens system according to the present disclosure.

Reference is now made to FIGS. 78-81. FIG. 78 illustrates an example cross-sectional view of an optical imaging lens system 19 having five lens elements of the optical imaging lens system according to a nineteenth example embodiment. FIG. 79 shows example charts of longitudinal spherical aberration and other kinds of optical aberrations of the optical imaging lens system 19 according to the nineteenth example embodiment. FIG. 80 shows an example table of optical data of each lens element of the optical imaging lens system 19 according to the nineteenth example embodiment. FIG. 81 shows an example table of aspherical data of the optical imaging lens system 19 according to the nineteenth example embodiment. The reference numbers labeled in the present embodiment are similar to those in the first embodiment for the similar elements, but here the reference numbers are initialed with 19, for example, reference number 1931 for labeling the object-side surface of the third lens element 1930, reference number 1932 for labeling the image-side surface of the third lens element 1930, etc.

As shown in FIG. 78, the optical imaging lens system 19 of the present embodiment, in an order from an object side A1 to an image side A2 along an optical axis, may comprise an aperture stop 1900, a first lens element 1910, a second lens element 1920, a third lens element 1930, a fourth lens element 1940 and a fifth lens element 1950.

The differences between the present embodiment and the fourteenth embodiment are the radius of curvature, thickness of each lens element, the distance of each air gap, aspherical data, related optical parameters, such as back focal length, and the configuration of the concave/convex shape of the object-side surfaces 1911, 1921, 1931, 1941, and the image-side surfaces 1912, 1922, but the configuration of the concave/convex shape of surfaces, comprising the object-side surface 1951, facing to the object side A1 and the image-side surfaces 1932, 1942, 1952 facing to the image side A2, are similar to those in the fourteenth embodiment. Here, for clearly showing the drawings of the present embodiment, only the surface shapes which are different from that in the fourteenth embodiment are labeled. Specifically, the image-side surface 1932 may comprise a concave portion 19321 in a vicinity of the optical axis and a convex portion 19322 in a vicinity of a periphery of the third lens element 1930, the fourth lens element 1940 has positive refracting power, the image-side surface 1942 may be a convex surface comprising a convex portion 19421 in a vicinity of the optical axis, the fifth lens element 1950 has negative refracting power, the object-side surface 1951 may be a concave surface comprising a concave portion 19511 in a vicinity of the optical axis, and the image-side surface 1952 may comprise a concave portion 19521 in a vicinity of the optical axis.

Please refer to FIG. 80 for the optical data of each lens element, FIG. 81 for the aspherical data in the optical imaging lens system 19, and FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 1911 of the first lens element 1910 to the image plane 1970 along the optical axis may be about 7.949 mm, EFL may be about 8.780 mm, the image height may be about 2.944 mm, HFOV may be about 18.548, and Fno may be about 2.400. Compared with the fourteenth embodiment, here both the length and EFL are shorter, and HFOV may be greater.

As the longitudinal spherical aberration shown in FIG. 79(a), the offset of the off-axis light relative to the image point may be within about ±0.014 mm. As the astigmatism aberration in the sagittal direction shown in FIG. 79(b), the focus variation with respect to the three wavelengths in the whole field may fall within about ±0.04 mm. As the astigmatism aberration in the tangential direction shown in FIG. 79(c), the focus variation with respect to the three wavelengths in the whole field may fall within about ±0.09 mm. As shown in FIG. 79(d), the variation of the distortion aberration may be within about ±0.2%. Compared with the fourteenth embodiment, both the longitudinal spherical aberration and distortion aberration are less. According to the value of the aberrations, it is shown that the optical imaging lens system 19 of the present embodiment, with the length as short as about 7.949 mm and Fno as low as about 2.400, may be capable of providing good imaging quality as well as good optical characteristics.

Figure 82:
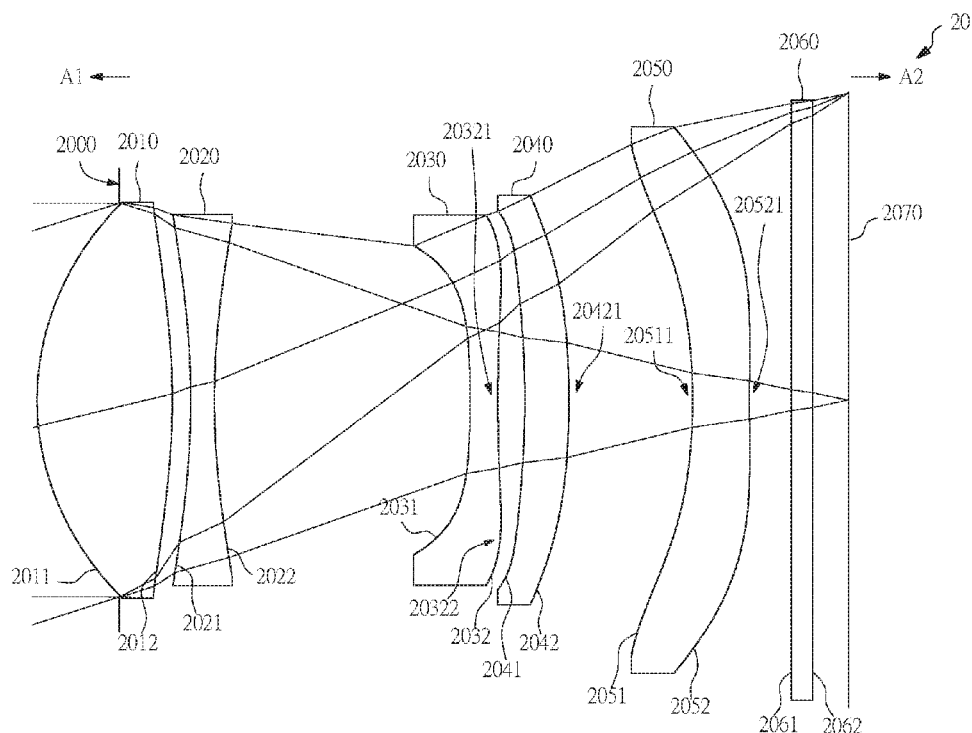
FIG. 82 is a cross-sectional view of a twentieth embodiment of an optical imaging lens system having five lens elements according to the present disclosure.
Figure 83:
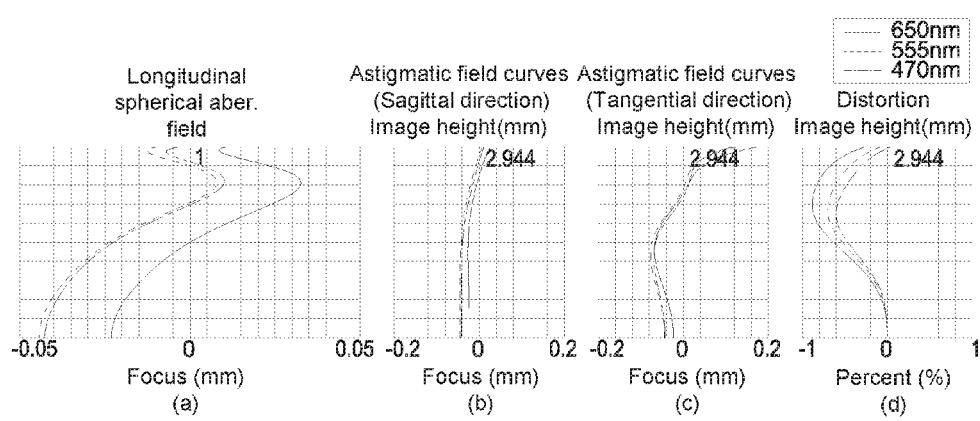
FIG. 83 is a chart of longitudinal spherical aberration and other kinds of optical aberrations of a twentieth embodiment of the optical imaging lens system according to the present disclosure.

Reference is now made to FIGS. 82-85. FIG. 82 illustrates an example cross-sectional view of an optical imaging lens system 20 having five lens elements of the optical imaging lens system according to a twentieth example embodiment. FIG. 83 shows example charts of longitudinal spherical aberration and other kinds of optical aberrations of the optical imaging lens system 20 according to the twentieth example embodiment. FIG. 84 shows an example table of optical data of each lens element of the optical imaging lens system 20 according to the twentieth example embodiment. FIG. 85 shows an example table of aspherical data of the optical imaging lens system 20 according to the twentieth example embodiment. The reference numbers labeled in the present embodiment are similar to those in the first embodiment for the similar elements, but here the reference numbers are initialed with 20, for example, reference number 2031 for labeling the object-side surface of the third lens element 2030, reference number 2032 for labeling the image-side surface of the third lens element 2030, etc.

As shown in FIG. 82, the optical imaging lens system 20 of the present embodiment, in an order from an object side A1 to an image side A2 along an optical axis, may comprise an aperture stop 2000, a first lens element 2010, a second lens element 2020, a third lens element 2030, a fourth lens element 2040 and a fifth lens element 2050.

The differences between the present embodiment and the fourteenth embodiment are the radius of curvature, thickness of each lens element, the distance of each air gap, aspherical data, related optical parameters, such as back focal length, and the configuration of the concave/convex shape of the object-side surfaces 2011, 2021, 2031, 2041, and the image-side surfaces 2012, 2022, but the configuration of the concave/convex shape of surfaces, comprising the object-side surface 2051, facing to the object side A1 and the image-side surfaces 2032, 2042, 2052 facing to the image side A2, are similar to those in the fourteenth embodiment. Here, for clearly showing the drawings of the present embodiment, only the surface shapes which are different from that in the fourteenth embodiment are labeled. Specifically, the image-side surface 2032 may comprise a concave portion 20321 in a vicinity of the optical axis and a convex portion 20322 in a vicinity of a periphery of the third lens element 2030, the fourth lens element 2040 has positive refracting power, the image-side surface 2042 may be a convex surface comprising a convex portion 20421 in a vicinity of the optical axis, the fifth lens element 2050 has negative refracting power, the object-side surface 2051 may be a concave surface comprising a concave portion 20511 in a vicinity of the optical axis, and the image-side surface 2052 may comprise a concave portion 20521 in a vicinity of the optical axis.

Please refer to FIG. 84 for the optical data of each lens element, FIG. 85 for the aspherical data in the optical imaging lens system 20, and FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 2011 of the first lens element 2010 to the image plane 2070 along the optical axis may be about 7.835 mm, EFL may be about 9.144 mm, the image height may be about 2.944 mm, HFOV may be about 17.689, and Fno may be about 2.399. Compared with the fourteenth embodiment, here the length may be shorter.

As the longitudinal spherical aberration shown in FIG. 83(*a*), the offset of the off-axis light relative to the image point may be within about ±0.05 mm. As the astigmatism aberration in the sagittal direction shown in FIG. 83(*b*), the focus variation with respect to the three wavelengths in the whole field may fall within about ±0.06 mm. As the astigmatism aberration in the tangential direction shown in FIG. 83(*c*), the focus variation with respect to the three wavelengths in the whole field may fall within about ±0.18 mm. As shown in FIG. 83(*d*), the variation of the distortion aberration may be within about ±1%. According to the value of the aberrations, it is shown that the optical imaging lens system 20 of the present embodiment, with the length as short as about 7.835 mm and Fno as low as about 2.399, may be capable of providing good imaging quality as well as good optical characteristics.

Figure 86:
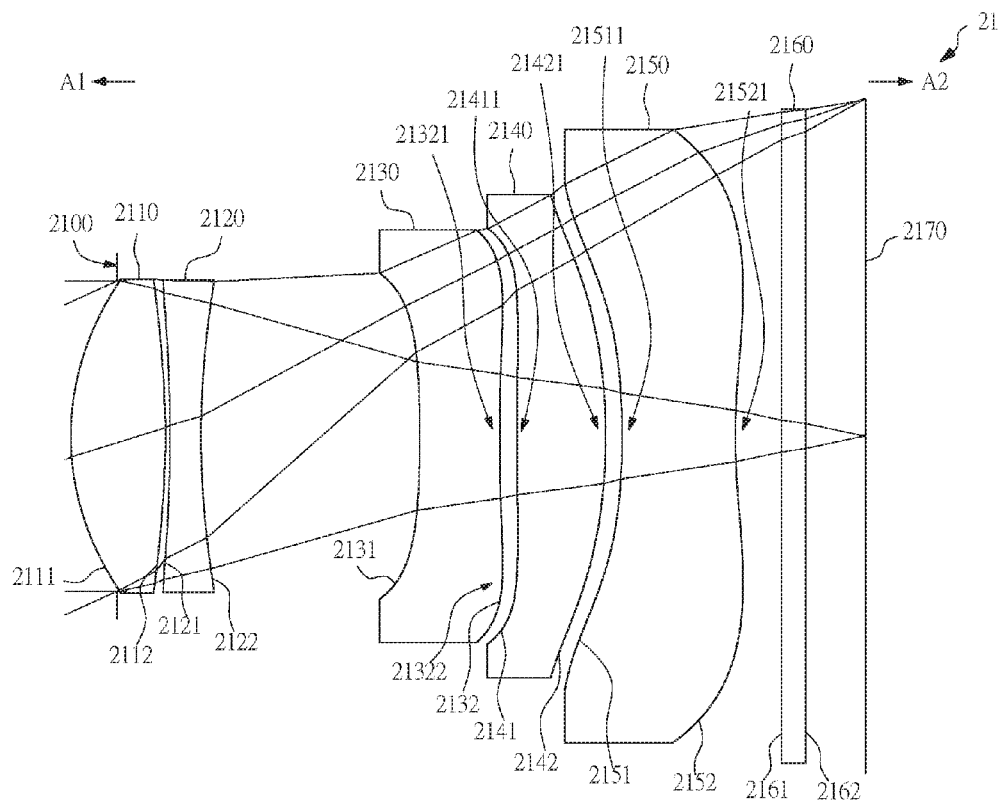
FIG. 86 is a cross-sectional view of a twenty-first embodiment of an optical imaging lens system having five lens elements according to the present disclosure.
Figure 87:
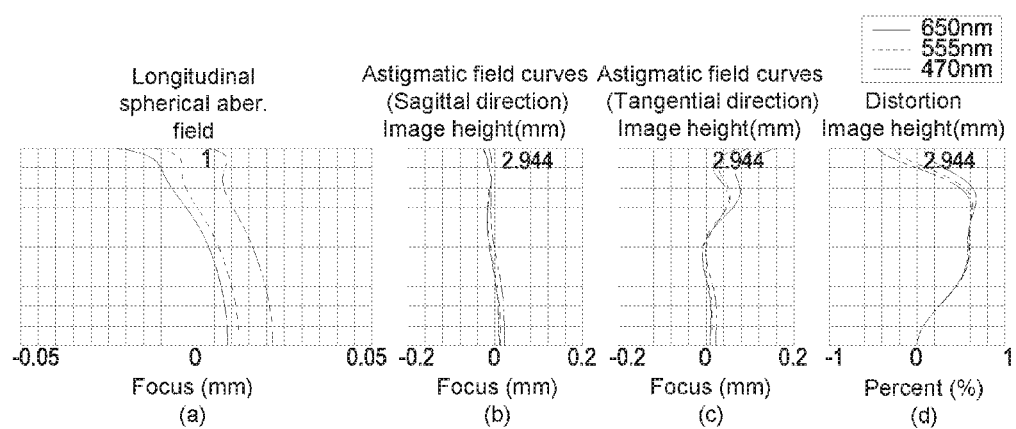
FIG. 87 is a chart of longitudinal spherical aberration and other kinds of optical aberrations of a twenty-first embodiment of the optical imaging lens system according to the present disclosure.

Reference is now made to FIGS. 86-89. FIG. 86 illustrates an example cross-sectional view of an optical imaging lens system 21 having five lens elements of the optical imaging lens system according to a twenty-first example embodiment. FIG. 87 shows example charts of longitudinal spherical aberration and other kinds of optical aberrations of the optical imaging lens system 21 according to the twenty-first example embodiment. FIG. 88 shows an example table of optical data of each lens element of the optical imaging lens system 21 according to the twenty-first example embodiment. FIG. 89 shows an example table of aspherical data of the optical imaging lens system 21 according to the twenty-first example embodiment. The reference numbers labeled in the present embodiment are similar to those in the first embodiment for the similar elements, but here the reference numbers are initialed with 21, for example, reference number 2131 for labeling the object-side surface of the third lens element 2130, reference number 2132 for labeling the image-side surface of the third lens element 2130, etc.

As shown in FIG. 86, the optical imaging lens system 21 of the present embodiment, in an order from an object side A1 to an image side A2 along an optical axis, may comprise an aperture stop 2100, a first lens element 2110, a second lens element 2120, a third lens element 2130, a fourth lens element 2140 and a fifth lens element 2150.

The differences between the present embodiment and the fourteenth embodiment are the radius of curvature, thickness of each lens element, the distance of each air gap, aspherical data, related optical parameters, such as back focal length, and the configuration of the concave/convex shape of the object-side surfaces 2111, 2121, 2131, and the image-side surfaces 2112, 2122, but the configuration of the concave/convex shape of surfaces, comprising the object-side surfaces 2141, 2151, facing to the object side A1 and the image-side surfaces 2132, 2142, 2152 facing to the image side A2, are similar to those in the fourteenth embodiment. Here, for clearly showing the drawings of the present embodiment, only the surface shapes which are different from that in the fourteenth embodiment are labeled. Specifically, the image-side surface 2132 may comprise a concave portion 21321 in a vicinity of the optical axis and a convex portion 21322 in a vicinity of a periphery of the third lens element 2130, the fourth lens element 2140 has positive refracting power, the object-side surface 2141 may comprise a convex portion 21411 in a vicinity of the optical axis, the image-side surface 2142 may be a convex surface comprising a convex portion 21421 in a vicinity of the optical axis, the fifth lens element 2150 has negative refracting power, the object-side surface 2151 may be a concave surface comprising a concave portion 21511 in a vicinity of the optical axis, and the image-side surface 2152 may comprise a concave portion 21521 in a vicinity of the optical axis.

Please refer to FIG. 88 for the optical data of each lens element, FIG. 89 for the aspherical data in the optical imaging lens system 21, and FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 2111 of the first lens element 2110 to the image plane 2170 along the optical axis may be about 6.878 mm, EFL may be about 6.455 mm, the image height may be about 2.944 mm, HFOV may be about 24.636, and Fno may be about 2.389. Compared with the fourteenth embodiment, here both the length and EFL may be shorter, HFOV may be greater, and Fno may be lower.

As the longitudinal spherical aberration shown in FIG. 87(*a*), the offset of the off-axis light relative to the image point may be within about ±0.03 mm. As the astigmatism aberration in the sagittal direction shown in FIG. 87(*b*), the focus variation with respect to the three wavelengths in the whole field falls within ±0.04 mm. As the astigmatism aberration in the tangential direction shown in FIG. 87(*c*), the focus variation with respect to the three wavelengths in the whole field falls within ±0.18 mm. As shown in FIG. 87(*d*), the variation of the distortion aberration may be within about ±0.8%. Compared with the fourteenth embodiment, the distortion aberration may be less. According to the value of the aberrations, it is shown that the optical imaging lens system 21 of the present embodiment, with the length as short as 6.878 about mm and Fno as low as about 2.389, may be capable of providing good imaging quality as well as good optical characteristics.

Figure 90:
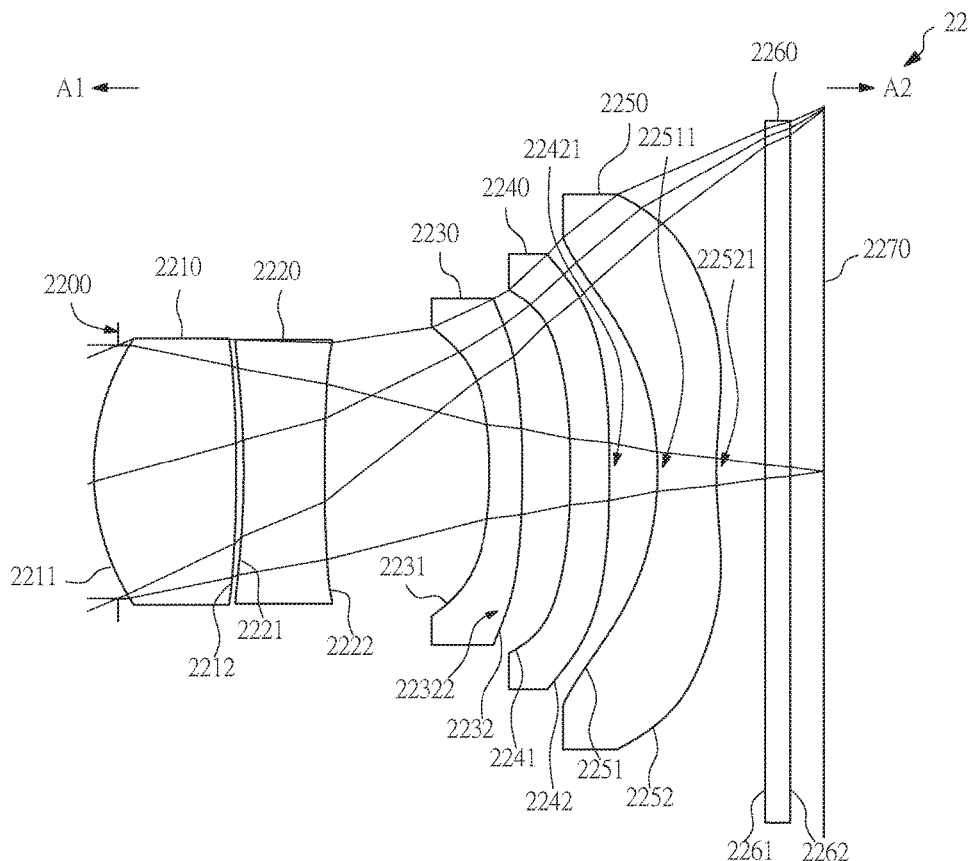
FIG. 90 is a cross-sectional view of a twenty-second embodiment of an optical imaging lens system having five lens elements according to the present disclosure.
Figure 91:
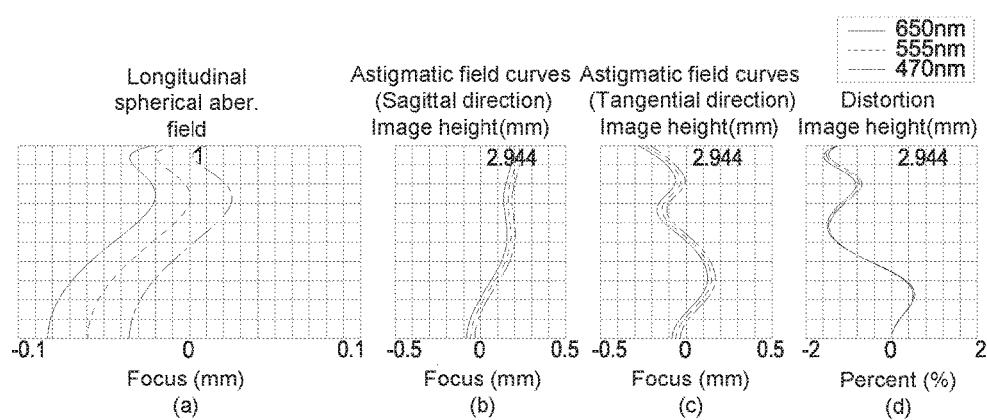
FIG. 91 is a chart of longitudinal spherical aberration and other kinds of optical aberrations of a twenty-second embodiment of the optical imaging lens system according to the present disclosure.

Reference is now made to FIGS. 90-93. FIG. 90 illustrates an example cross-sectional view of an optical imaging lens system 22 having five lens elements of the optical imaging lens system according to a twenty-second example embodiment. FIG. 91 shows example charts of longitudinal spherical aberration and other kinds of optical aberrations of the optical imaging lens system 22 according to the twenty-second example embodiment. FIG. 92 shows an example table of optical data of each lens element of the optical imaging lens system 22 according to the twenty-second example embodiment. FIG. 93 shows an example table of aspherical data of the optical imaging lens system 22 according to the twenty-second example embodiment. The reference numbers labeled in the present embodiment are similar to those in the first embodiment for the similar elements, but here the reference numbers are initialed with 22, for example, reference number 2231 for labeling the object-side surface of the third lens element 2230, reference number 2232 for labeling the image-side surface of the third lens element 2230, etc.

As shown in FIG. 90, the optical imaging lens system 22 of the present embodiment, in an order from an object side A1 to an image side A2 along an optical axis, may comprise an aperture stop 2200, a first lens element 2210, a second lens element 2220, a third lens element 2230, a fourth lens element 2240 and a fifth lens element 2250.

The differences between the present embodiment and the fourteenth embodiment are the radius of curvature, thickness of each lens element, the distance of each air gap, aspherical data, related optical parameters, such as back focal length, and the configuration of the concave/convex shape of the object-side surfaces 2211, 2221, 2231, 2241, and the image-side surfaces 2212, 2222, but the configuration of the concave/convex shape of surfaces, comprising the object-side surface 2251, facing to the object side A1 and the image-side surfaces 2232, 2242, 2252 facing to the image side A2, are similar to those in the fourteenth embodiment. Here, for clearly showing the drawings of the present embodiment, only the surface shapes which are different from that in the fourteenth embodiment are labeled. Specifically, the image-side surface 2232 may be a convex surface comprising a convex portion 22322 in a vicinity of a periphery of the third lens element 2230, the image-side surface 2242 may be a convex surface comprising a convex portion 22421 in a vicinity of the optical axis, the fifth lens element 2250 has negative refracting power, the object-side surface 2251 may be a concave surface comprising a concave portion 22511 in a vicinity of the optical axis, and the image-side surface 2252 may comprise a concave portion 22521 in a vicinity of the optical axis.

Please refer to FIG. 92 for the optical data of each lens element, FIG. 93 for the aspherical data in the optical imaging lens system 22, and FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 2211 of the first lens element 2210 to the image plane 2270 along the optical axis may be about 5.989 mm, EFL may be about 7.064 mm, the image height may be about 2.944 mm, HFOV may be about 22.413, and Fno may be about 3.552. Compared with the fourteenth embodiment, here the Fno may be lower.

As the longitudinal spherical aberration shown in FIG. 91(a), the offset of the off-axis light relative to the image point may be within about ±0.09 mm. As the astigmatism aberration in the sagittal direction shown in FIG. 91(b), the focus variation with respect to the three wavelengths in the whole field may fall within about ±0.3 mm. As the astigmatism aberration in the tangential direction shown in FIG. 91(c), the focus variation with respect to the three wavelengths in the whole field may fall within about ±0.3 mm. As shown in FIG. 91(d), the variation of the distortion aberration may be within about ±1.6%. According to the value of the aberrations, it is shown that the optical imaging lens system 22 of the present embodiment, with the length as short as about 5.989 mm and Fno as low as about 3.552, may be capable of providing good imaging quality as well as good optical characteristics.

Figure 94:
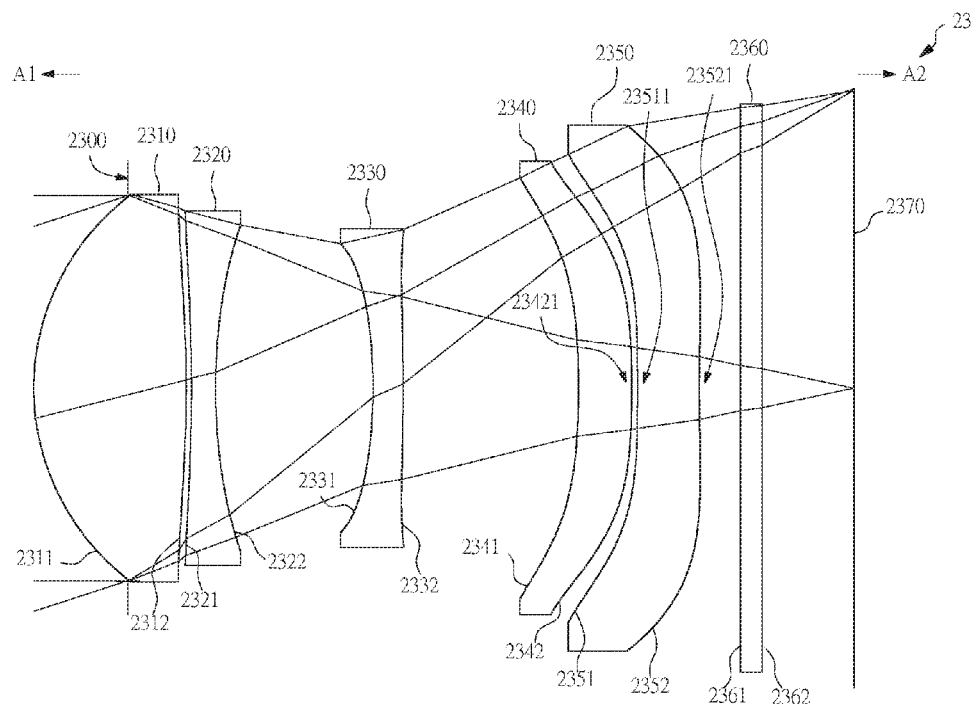
FIG. 94 is a cross-sectional view of a twenty-third embodiment of an optical imaging lens system having five lens elements according to the present disclosure.
Figure 95:
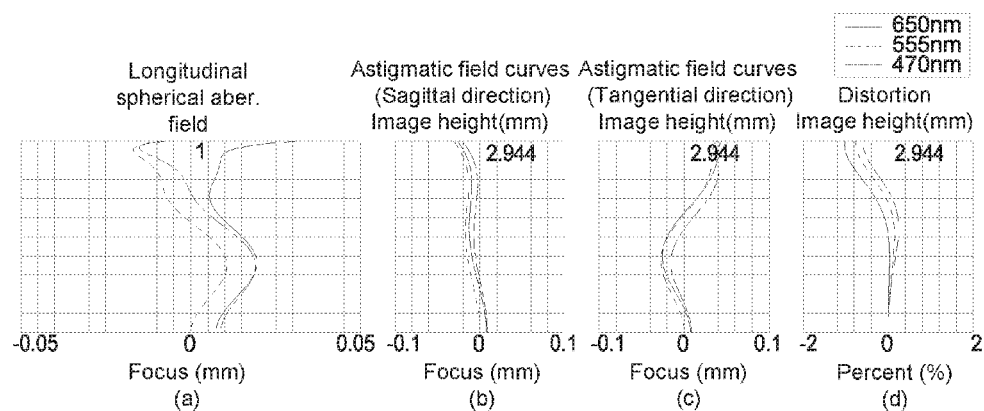
FIG. 95 is a chart of longitudinal spherical aberration and other kinds of optical aberrations of a twenty-third embodiment of the optical imaging lens system according to the present disclosure.

Reference is now made to FIGS. 94-97. FIG. 94 illustrates an example cross-sectional view of an optical imaging lens system 23 having five lens elements of the optical imaging lens system according to a twenty-third example embodiment. FIG. 95 shows example charts of longitudinal spherical aberration and other kinds of optical aberrations of the optical imaging lens system 23 according to the twenty-third example embodiment. FIG. 96 shows an example table of optical data of each lens element of the optical imaging lens system 23 according to the twenty-third example embodiment. FIG. 97 shows an example table of aspherical data of the optical imaging lens system 23 according to the twenty-third example embodiment. The reference numbers labeled in the present embodiment are similar to those in the first embodiment for the similar elements, but here the reference numbers are initialed with 23, for example, reference number 2331 for labeling the object-side surface of the third lens element 2330, reference number 2332 for labeling the image-side surface of the third lens element 2330, etc.

As shown in FIG. 94, the optical imaging lens system 23 of the present embodiment, in an order from an object side A1 to an image side A2 along an optical axis, may comprise an aperture stop 2300, a first lens element 2310, a second lens element 2320, a third lens element 2330, a fourth lens element 2340 and a fifth lens element 2350.

The differences between the present embodiment and the fourteenth embodiment are the radius of curvature, thickness of each lens element, the distance of each air gap, aspherical data, related optical parameters, such as back focal length, and the configuration of the concave/convex shape of the object-side surfaces 2311, 2321, 2331, 2341, and the image-side surfaces 2312, 2322, 2332, but the configuration of the concave/convex shape of surfaces, comprising the object-side surface 2351, facing to the object side A1 and the image-side surfaces 2342, 2352 facing to the image side A2, are similar to those in the fourteenth embodiment. Here, for clearly showing the drawings of the present embodiment, only the surface shapes which are different from that in the fourteenth embodiment are labeled. Specifically, the image-side surface 2342 may be a convex surface comprising a convex portion 23421 in a vicinity of the optical axis, the fifth lens element 2350 has negative refracting power, the object-side surface 2351 may be a concave surface comprising a concave portion 23511 in a vicinity of the optical axis, and the image-side surface 2352 may comprise a concave portion 23521 in a vicinity of the optical axis.

Please refer to FIG. 96 for the optical data of each lens element, FIG. 97 for the aspherical data in the optical imaging lens system 23, and FIG. 99 for the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3).

The distance from the object-side surface 2311 of the first lens element 2310 to the image plane 2370 along the optical axis may be about 7.998 mm, EFL may be about 9.015 mm, the image height may be about 2.944 mm, HFOV may be about 18.214, and Fno may be about 2.389. Compared with the fourteenth embodiment, here the HFOV may be greater, and Fno may be lower.

As the longitudinal spherical aberration shown in FIG. 95(a), the offset of the off-axis light relative to the image point may be within ±0.04 mm. As the astigmatism aberration in the sagittal direction shown in FIG. 95(b), the focus variation with respect to the three wavelengths in the whole field falls within ±0.04 mm. As the astigmatism aberration in the tangential direction shown in FIG. 95(c), the focus variation with respect to the three wavelengths in the whole field falls within ±0.06 mm. As shown in FIG. 95(d), the variation of the distortion aberration may be within ±1.2%. According to the value of the aberrations, it is shown that the optical imaging lens system 23 of the present embodiment, with the length as short as about 7.998 mm and Fno as low as about 2.389, may be capable of providing good imaging quality as well as good optical characteristics.

Please refer to FIGS. 98A, 98B and 99, which shows the values of EFL, Fno, HFOV, T1, G12, T2, G23, T3, G34, T4, G4F, TF, GFP, TTL, TL, TL/G23, Fno/(G12+G34), Fno/G23, Fno/(G12+G23), TTL/(G23+G34), (T1+T2)/(G12+G34), Fno/(T1+G12+T2), Fno/T1, Fno/(T1+T2), G34/(T2+T3), (G12+G34)/(T2+T3), (G12+G23+G34)/Fno, (G23+G34)/Fno, G34/T2, EFL/Fno, G23/T2, (G12+G23)/T2, (T1+T2)/T1, TTL/Fno and EFL/(T2+T3) of all twenty-third embodiments. Optical imaging lens system of the present disclosure may satisfy inequalities (1)~(3) and/or inequalities (4)~(22).

According to above illustration, the longitudinal spherical aberration, astigmatism aberration both in the sagittal direction and tangential direction and distortion aberration in all embodiments are meet user term of a related product in the market. The off-axis light with respect to three different wavelengths (470 nm, 555 nm, 650 nm) may be focused around an image point and the offset of the off-axis light relative to the image point may be well controlled with suppression for the longitudinal spherical aberration, astigmatism aberration both in the sagittal direction and tangential direction and distortion aberration. The curves of different wavelengths are closed to each other, and this represents that the focusing for light having different wavelengths may be good to suppress chromatic dispersion. In summary, lens elements are designed and matched for achieving good imaging quality.

While various embodiments in accordance with the disclosed principles been described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens system, comprising at least first, second, third, and fourth lens elements as four frontmost lens elements having refracting power arranged sequentially in ascending order from an object side to an image side along an optical axis, each of the first, second, third, and fourth lens elements having an object-side surface facing toward the object side and an image-side surface facing toward the image side and a central thickness defined along the optical axis, wherein:

the object-side surface of the first lens element comprises a convex portion in a vicinity of a periphery of the first lens element;

the second lens element has negative refracting power, and the image-side surface of the second lens element comprises a concave portion in a vicinity of the optical axis;

the object-side surface of the third lens element comprises a concave portion in a vicinity of a periphery of the third lens element wherein a collimated ray passing through the concave portion diverges; and the image-side surface of the fourth lens element comprises a convex portion in a vicinity of a periphery of the fourth lens element;

wherein a half field of view angle of the optical imaging lens system is represented by HFOV, a distance between the object-side surface of the first lens element and an image plane along the optical axis is represented by TTL, a distance between the object-side surface of the first lens element and an image-side surface of the forth lens element along the optical axis is represented by TL, an air gap between the second lens element and the third lens element along the optical axis is represented by G23, an air gap between the third lens element and the fourth lens element along the optical axis is represented by G34, the central thickness of the second lens element is represented by T2, the central thickness of the third lens element is represented by T3, and HFOV, TTL, TL, G23, G34, T2 and T3 satisfy:

$HFOV \leq 25°$;

$TTL \leq 8$ mm;

$TL/G \leq 4.5$; and $0.109 \leq G34/(T2+T3)$.

2. The optical imaging lens system according to claim 1, wherein a f-number of the optical imaging lens system is represented by Fno, an air gap between the first lens element and the second lens element along the optical axis is represented by G12, and Fno, G12 and G34 satisfy:

$Fno/(G12+G34) \leq 14.4$.

3. The optical imaging lens system according to claim 1, wherein a f-number of the optical imaging lens system is represented by Fno, and Fno and G23 satisfy:

$Fno/G23$

4. The optical imaging lens system according to claim 1, wherein a f-number of the optical imaging lens system is represented by Fno, an air gap between the first lens element and the second lens element along the optical axis is represented by G12, and Fno, G12 and G23 satisfy:

$$Fno/(G12+G23) \leq 3.2.$$

5. The optical imaging lens system according to claim 1, wherein TTL, G23 and G34 satisfy:

$$TTL/(G23+G34) \leq 4.3.$$

6. The optical imaging lens system according to claim 1, wherein the central thickness of the first lens element is represented by T1, an air gap between the first lens element and the second lens element along the optical axis is represented by G12, and T1, T2, G12 and G34 satisfy:

$$(T1+T2)/(G12+G34) \leq 5.8.$$

7. The optical imaging lens system according to claim 1, wherein a f-number of the optical imaging lens system is represented by Fno, the central thickness of the first lens element is represented by T1, an air gap between the first lens element and the second lens element along the optical axis is represented by G12, and Fno, T1, T2 and G12 satisfy:

$$Fno/(T1+G12+T2) \leq 2.$$

8. The optical imaging lens system according to claim 1, wherein a f-number of the optical imaging lens system is represented by Fno, the central thickness of the first lens element is represented by T1, and Fno and T1 satisfy:

$$Fno/T1 \leq 3.8.$$

9. The optical imaging lens system according to claim 1, wherein a f-number of the optical imaging lens system is represented by Fno, the central thickness of the first lens element is represented by T1, and Fno, T1 and T2 satisfy:

$$Fno/(T1+T2) \leq 2.2.$$

10. The optical imaging lens system according to claim 1, wherein an air gap between the first lens element and the second lens element along the optical axis is represented by G12, and G12, G34, T2 and T3 satisfy:

$$0.2 \leq (G12+G34)/(T2+T3).$$

11. The optical imaging lens system according to claim 1, wherein an air gap between the first lens element and the second lens element along the optical axis is represented by G12, a f-number of the optical imaging lens system is represented by Fno, and G12, G23 G34 and Fno satisfy:

$$0.4 \leq (G12+G23+G34)/Fno.$$

12. The optical imaging lens system according to claim 1, wherein a f-number of the optical imaging lens system is represented by Fno, and G23, G34 and Fno satisfy:

$$0.4 \leq (G23+G34)/Fno.$$

13. The optical imaging lens system according to claim 1, wherein G34 and T2 satisfy the inequality:

$$0.2 \leq G34/T2.$$

14. The optical imaging lens system according to claim 1, wherein an effective focal length of the optical imaging lens system is represented by EFL, a f-number of the optical imaging lens system is represented by Fno, and EFL and Fno satisfy:

$$1.7 \leq EFL/Fno.$$

15. The optical imaging lens system according to claim 1, wherein G23 and T2 satisfy:

$$1.4 \leq G23/T2.$$

16. The optical imaging lens system according to claim 1, wherein an air gap between the first lens element and the second lens element along the optical axis is represented by G12, and G12, G23 and T2 satisfy:

$$1.5 \leq (G12+G23)/T2.$$

17. The optical imaging lens system according to claim 1, wherein the central thickness of the first lens element is represented by T1, and T1 and T2 satisfy:

$$(T1+T2)/T1 \leq 1.8.$$

18. The optical imaging lens system according to claim 1, wherein a f-number of the optical imaging lens system is represented by Fno, and TTL and Fno satisfy:

$$1.7 \leq TTL/Fno.$$

19. The optical imaging lens system according to claim 1, wherein an effective focal length of the optical imaging lens system is represented by EFL, and EFL, T2 and T3 satisfy:

$$3.9 \leq EFL/(T2+T3).$$

* * * * *